US011650868B2

(12) United States Patent
Jha et al.

(10) Patent No.: US 11,650,868 B2
(45) Date of Patent: May 16, 2023

(54) METHODS AND SYSTEMS THAT SAMPLE LOG/EVENT MESSAGES IN A DISTRIBUTED LOG-ANALYTICS SYSTEM

(71) Applicant: VMWARE, INC., Palo Alto, CA (US)

(72) Inventors: Ritesh Jha, Bangalore (IN); Jobin Raju George, Bangalore (IN); Nikhil Jaiswal, Bangalore (IN); Pushkar Patil, Bangalore (IN); Vaidic Joshi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 96 days.

(21) Appl. No.: 17/143,203

(22) Filed: Jan. 7, 2021

(65) Prior Publication Data

US 2022/0121507 A1 Apr. 21, 2022

(51) Int. Cl.
*G06F 9/54* (2006.01)

(52) U.S. Cl.
CPC .............. *G06F 9/546* (2013.01); *G06F 9/542* (2013.01)

(58) Field of Classification Search
CPC ................................ G06F 9/542; G06F 9/546
USPC .................................................. 719/313, 318
See application file for complete search history.

(56) References Cited

U.S. PATENT DOCUMENTS

| | | | | |
|---|---|---|---|---|
| 9,588,504 B2 * | 3/2017 | Hill | .................... | G05B 19/4184 |
| 10,108,522 B1 * | 10/2018 | Jain | ..................... | G06F 11/3604 |
| 2006/0271592 A1 * | 11/2006 | Selkirk | .................. | G06F 9/542 |
| 2019/0171169 A1 * | 6/2019 | Di Pietro | ................ | H04L 41/16 |

* cited by examiner

*Primary Examiner* — Andy Ho

(57) ABSTRACT

The current document is directed to methods and systems that sample log/event messages for downstream processing by log/event-message systems incorporated within distributed computer facilities. The data-collection, data-storage, and data-querying functionalities of log/event-message systems provide a basis for distributed log-analytics systems which, in turn, provide a basis for automated and semi-automated system-administration-and-management systems. By sampling log/event-messages, rather than processing and storing every log/event-message generated within a distributed computer system, a log/event-message system significantly decreases data-storage-capacity, computational-bandwidth, and networking-bandwidth overheads involved in processing and retaining large numbers of log/event messages that do not provide sufficient useful information to justify these costs. Increase in efficiencies of log/event-message systems obtained by sampling translate directly into increases in bandwidths of distributed computer systems, in general, and to increases in time periods during which useful log/event messages can be stored.

20 Claims, 47 Drawing Sheets

1102 1108 1110

⋮

2013-12-02T10:44:24.095Z li-qe-esx5.vmware.com Rhttpproxy: [28959B90 verbose 'Proxy Req 46691'] Connected to localhost:8307 —— 1112         ~ 1106

2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155)

2013-12-02T10:44:24.093Z li-qe-esx5.vmware.com Rhttpproxy: [2889B90 verbose 'Proxy Req 46685'] The client closed the stream, not unexpectedly.

Dec  2 18:48:29 strata-vc 2013-12-02T18:48:30.273Z [7FA3944B8700 info 'commonvpxLro' opID=1947d6E9] [VpxLRO] -- FINISH task-internal-2163522 -- -- vim.SessionManager.logout -

2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback 2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Starting next WaitForUpdates() call to hostd 2013-12-02T18:48:51.395Z strata-esx1.eng.vmware.com Vpxa: [65B5AB90 verbose 'vpxavpxaInvtVm' opID=WFU-ed393333] [VpxaInvtVmChangeListener] Guest DiskInfo Changed 2013-12-02T18:48:51.395Z strata-esx1.eng.vmware.com Vpxa: [65B5AB90 verbose 'halservices' opID=WFU-ed393333] [VpxaHalServices] VMGuestDiskChange Event for vm(6) 59

2013-12-02T18:48:51.395Z strata-esx1.eng.vmware.com Vpxa: [65B5AB90 verbose 'hostdvm' opID=WFU-ed393333] [VpxaHalVmHostagent] 59: GuestInfo changed 'guest.disk'

2013-12-02T18:48:51.395Z strata-esx1.eng.vmware.com Vpxa: [65B5AB90 verbose 'VpxaHalCnxHostagent' opID=WFU-ed393333] [VpxaHalCnxHostagent::ProcessUpdate] Applying updates from 123718 to 123719 (at 123718)

2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Received callback
2013-12-02T18:48:51.360Z li-dev-esx6.eng.vmware.com Hostd: [617C1B90 error 'SoapAdapter.HTTPService'] HTTP Transaction

} 1104

⋮

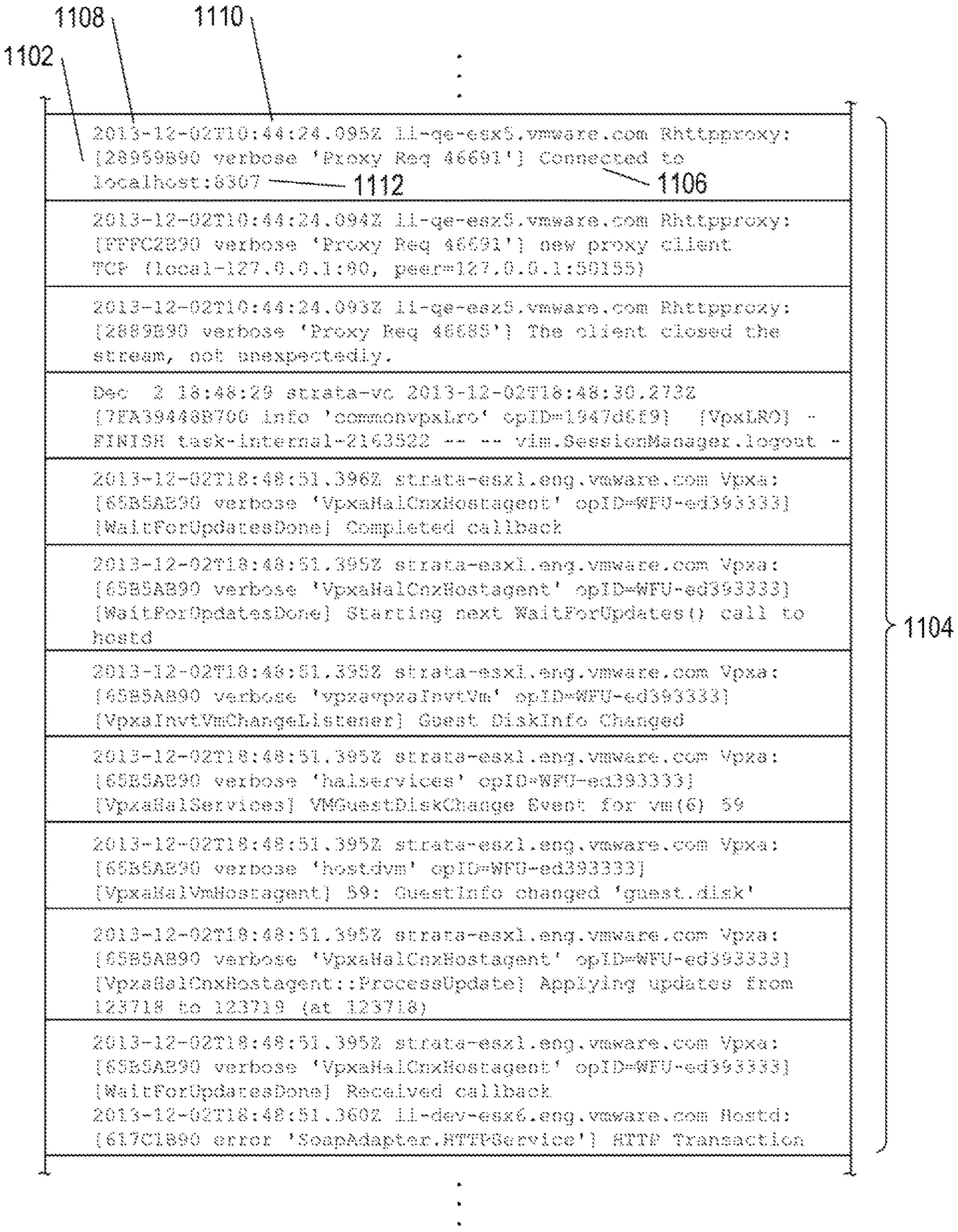

| Timestamp (1703) | Data Center (1704) | Host (1705) | Level (1706) | Description (1707) |
|---|---|---|---|---|
| 20-08-22T 12:10:51 | SEA/WA 1 | H361 | 10 | Transaction_1 |
| 20-08-22T 12:10:51 | CHI/IL 3 | H722 | 9 | T-Denial |
| 20-08-22T 12:10:51 | NYC/NY 16 | H168 | 10 | Transaction_3 |
| 20-08-22T 12:10:52 | SFR/CA 6 | H077 | 9 | T-Denial |
| 20-08-22T 12:10:52 | DEN/CO 2 | H216 | 9 | T-Denial |
| 20-08-22T 12:10:53 | SEA/WA 2 | H603 | 8 | Transaction Failure |
| 20-08-22T 12:10:53 | LAN/CA 10 | H501 | 1 | Server Down |
| 20-08-22T 12:10:54 | ATL/GA 2 | H018 | 7 | App Restart |
| 20-08-22T 12:10:54 | CHI/IL 3 | H166 | 9 | T-Denial |
| 20-08-22T 12:10:54 | DEN/CO 4 | H330 | 10 | Transaction_2 |
| 20-08-22T 12:10:54 | SFR/CA 1 | H187 | 10 | Transaction_1 |
| 20-08-22T 12:10:55 | LAN/CA 7 | H273 | 9 | C-Denial |
| 20-08-22T 12:10:55 | NYC/NY 11 | H051 | 9 | C-Denial |
| 20-08-22T 12:10:55 | DEN/CO 3 | H199 | 10 | Transaction_3 |
| 20-08-22T 12:10:56 | ATL/GA 6 | H608 | 3 | Server Reboot |
| 20-08-22T 12:10:56 | SEA/WA 3 | H192 | 9 | I-Denial |
| 20-08-22T 12:10:56 | NYC/NY 16 | H703 | 10 | Transaction_1 |

FIG. 17A

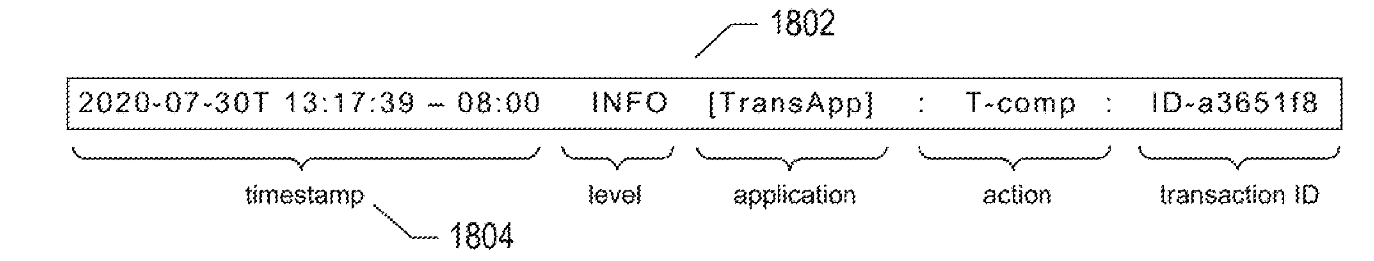

FIG. 18A 1808 1806 1810 1812

```
YEAR  (?>\d\d) {1,2}
MONTHNUM  (?:0?[1-9]|1[0-2])
MONTHDAY  (?:(?:0[1-9])|(?:[12][0-9])|(?:3[01])|[1-9])
HOUR  (?:2[0123]|[01]?[0-9])
MINUTE  (?:[0-5][0-9])
SECOND  (?:(?:[0-5]?[0-9]|60)(?:[:.,][0-9]+)?)
ISO8601_TIMEZONE  (?:Z|[+-]%{HOUR}(?::?%{MINUTE}))
TIMESTAMP_ISO8601%{YEAR}-%{MONTHNUM}-%{MONTHDAY}[T]%{HOUR}:?%{MINUTE}(?::?%{SECOND})?%
                    {ISO8601_TIMEZONE}?

LOGLEVEL ([Aa]lert|ALERT|[Tt]race|TRACE|[Dd]ebug|DEBUG|[Nn]otice|NOTICE|[Ii]nfo|INFO|[Ww]arn?
                    (?:ing)?|WARN?(?:ING)?|[Ee]rr?(?:or)?|ERR?(?:OR)?|[Cc]rit?(?:ical)?|CRIT?(?:ICAL)
                    ?|[Ff]atal|FATAL|[Ss]evere|SEVERE|EMERG(?:ENCY)?|[Ee]merg(?:ency)?)
DATA .*?
```

FIG. 18B

```
int dim;          2602
ink k;            2604

FVs FVS;          2606

FV f1;            2608
FV f2;            2609

FV* curF = f1;    2610
FV* nextf = f2;   2612

clusters *curCS;  }
clusters *nxtCS;  }
                  } 2614
centers *curC;    }
centers *nxtC;    }

samplingCounts sc1;  }
samplingCounts sc2;  }
                     } 2616
samplingRates sr1;   }
samplingRates sr2;   }

curSC = sc1;      }
nxtSC = sc2;      }
                  } 2618
curSR = sr1;      }
nxtSR = sr2;      }
```

FIG. 26

METHODS AND SYSTEMS THAT SAMPLE LOG/EVENT MESSAGES IN A DISTRIBUTED LOG-ANALYTICS SYSTEM

RELATED APPLICATIONS

Benefit is claimed under 35 U.S.C. 119(a)-(d) to Foreign Application Serial No. 202041045940 filed in India entitled "METHODS AND SYSTEMS THAT SAMPLE LOG/EVENT MESSAGES IN A DISTRIBUTED LOG-ANALYTICS SYSTEM", on Oct. 21, 2020, by VMware, Inc., which is herein incorporated in its entirety by reference for all purposes.

TECHNICAL FIELD

The current document is directed to distributed-computer-systems and, in particular, to methods and systems that sample log/event messages for downstream processing by log/event-message systems incorporated within distributed computer facilities.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that sample log/event messages for downstream processing by log/event-message systems incorporated within distributed computer facilities. The data-collection, data-storage, and data-querying functionalities of log/event-message systems provide a basis for distributed log-analytics systems which, in turn, provide a basis for automated and semi-automated system-administration-and-management systems. By sampling log/event-messages, rather than processing and storing every log/event-message generated within a distributed computer system, a log/event-message system significantly decreases data-storage-capacity, computational-bandwidth, and networking-bandwidth overheads involved in processing and retaining large numbers of log/event messages that do not provide sufficient useful information to justify these costs. Increase in efficiencies of log/event-message systems obtained by sampling translate directly into increases in bandwidths of distributed computer systems, in general, and to increases in time periods during which useful log/event messages can be stored.

BRIEF DESCRIPTION OF THE DRAWINGS

FIG. 11 shows a small, 11-entry portion of a log file from a distributed computer system.

FIGS. 17A-C provide several examples of log/event-message-to-BFLM transformations.

FIGS. 18A-C illustrate one approach to extracting fields from a log/event message.

FIG. 26 shows a number of constants and variables used in the control-flow diagrams that follow.

DETAILED DESCRIPTION

Figure 1:
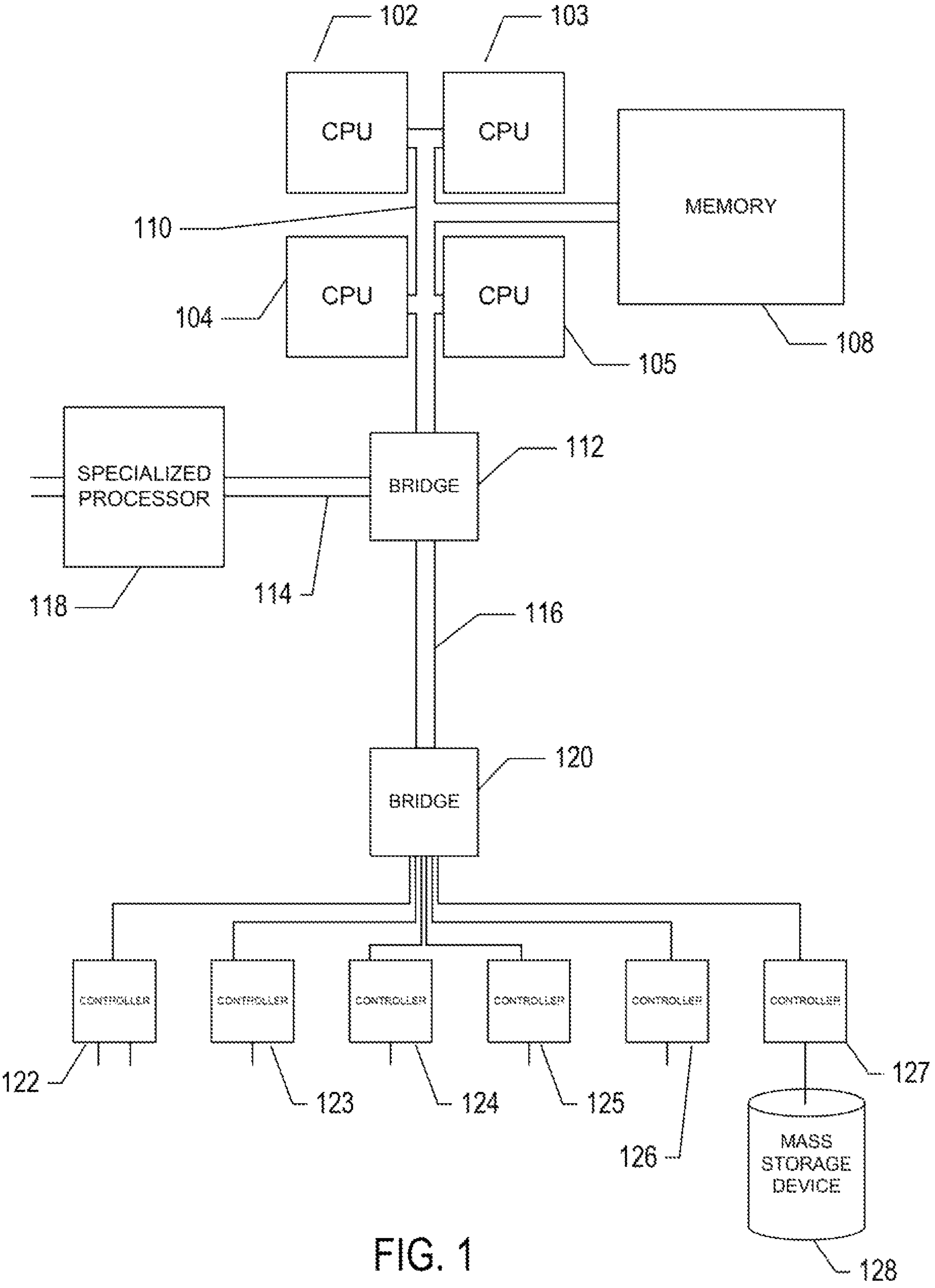
FIG. 1 provides a general architectural diagram for various types of computers.

The current document is directed to methods and systems that that sample log/event messages within distributed computer facilities. In a first subsection, below, a detailed description of computer hardware, complex computational systems, and virtualization is provided with reference to FIGS. 1-10. In a second subsection, the currently disclosed methods and systems are discussed with reference to FIGS. 11-27G.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
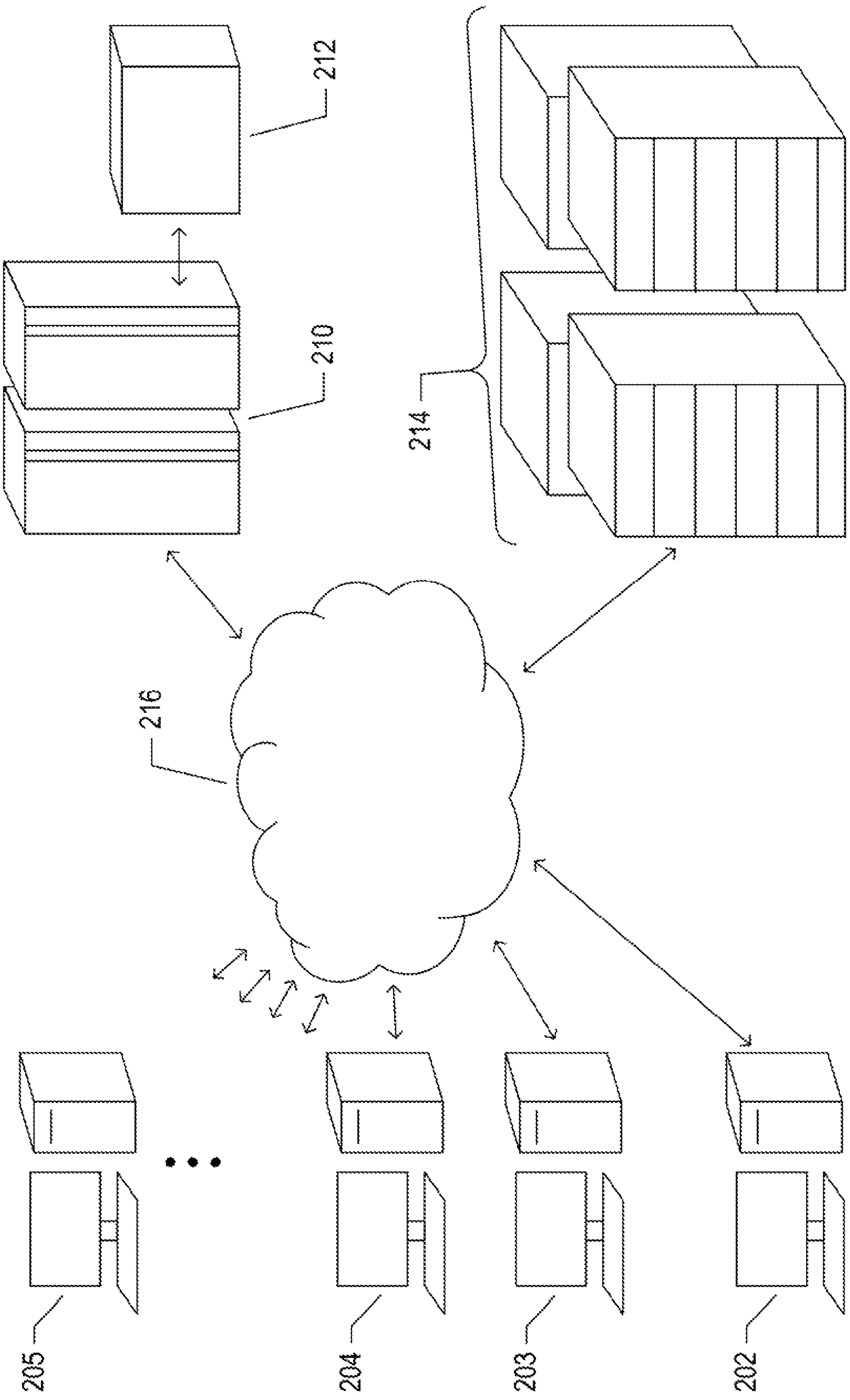
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
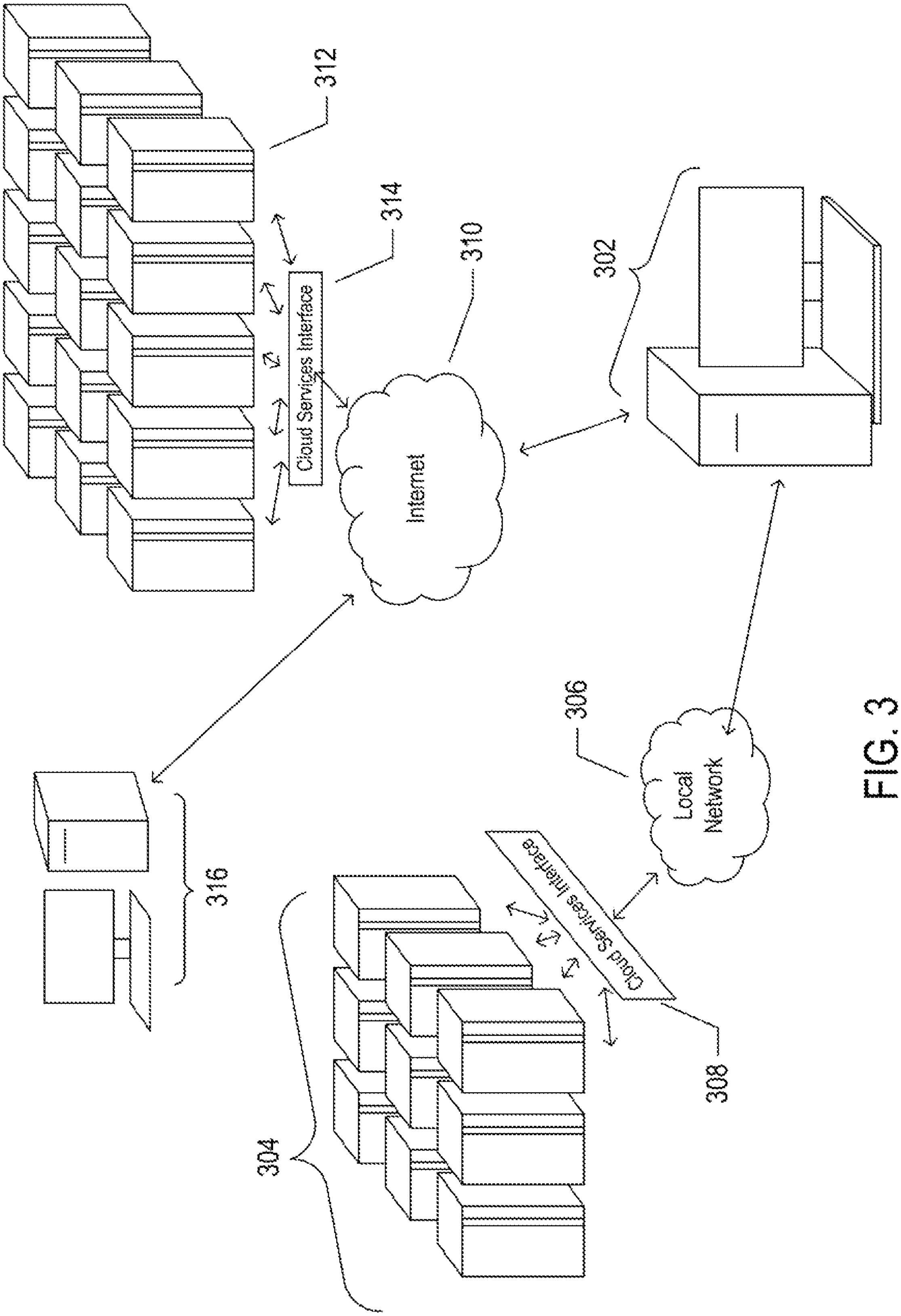
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
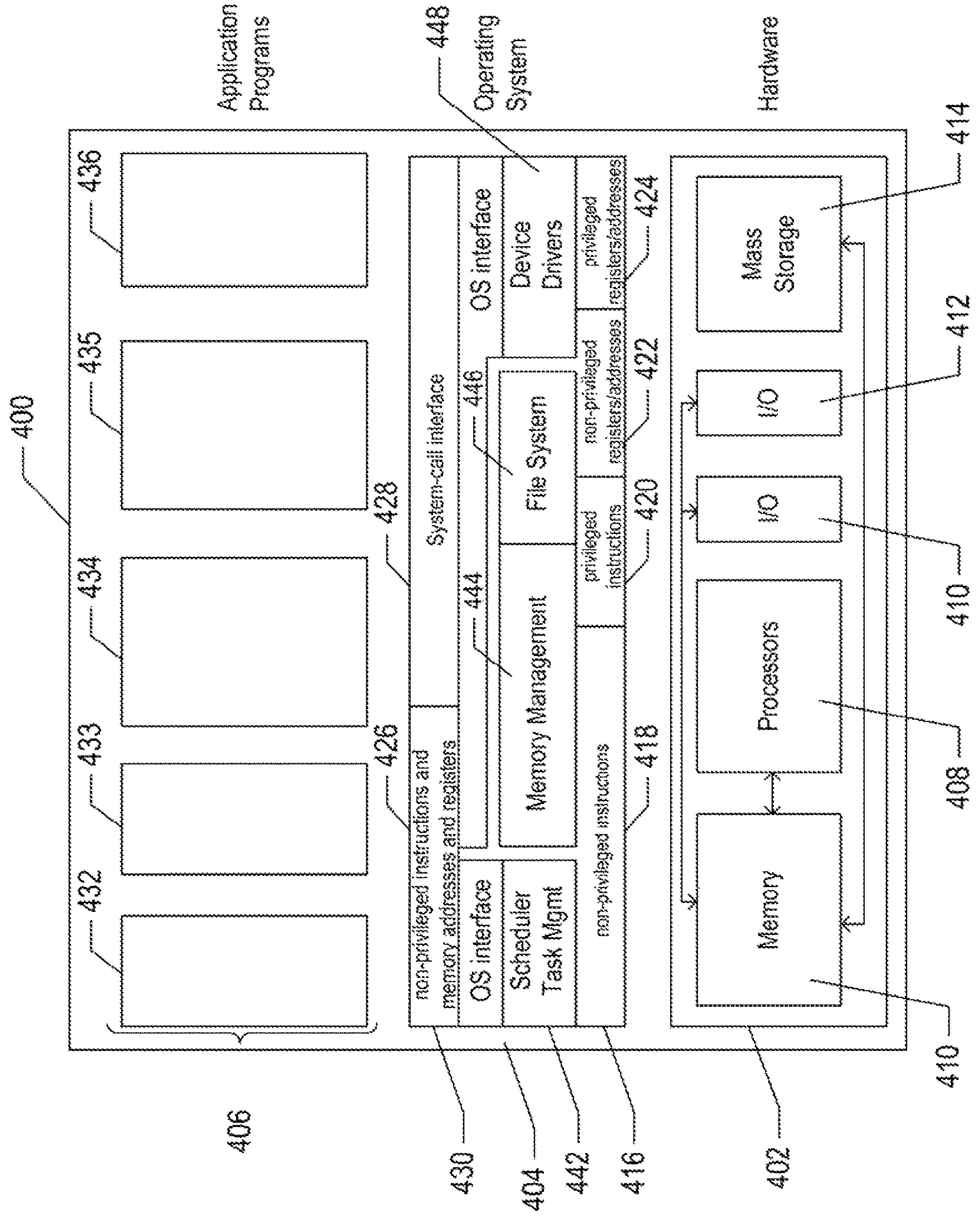
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
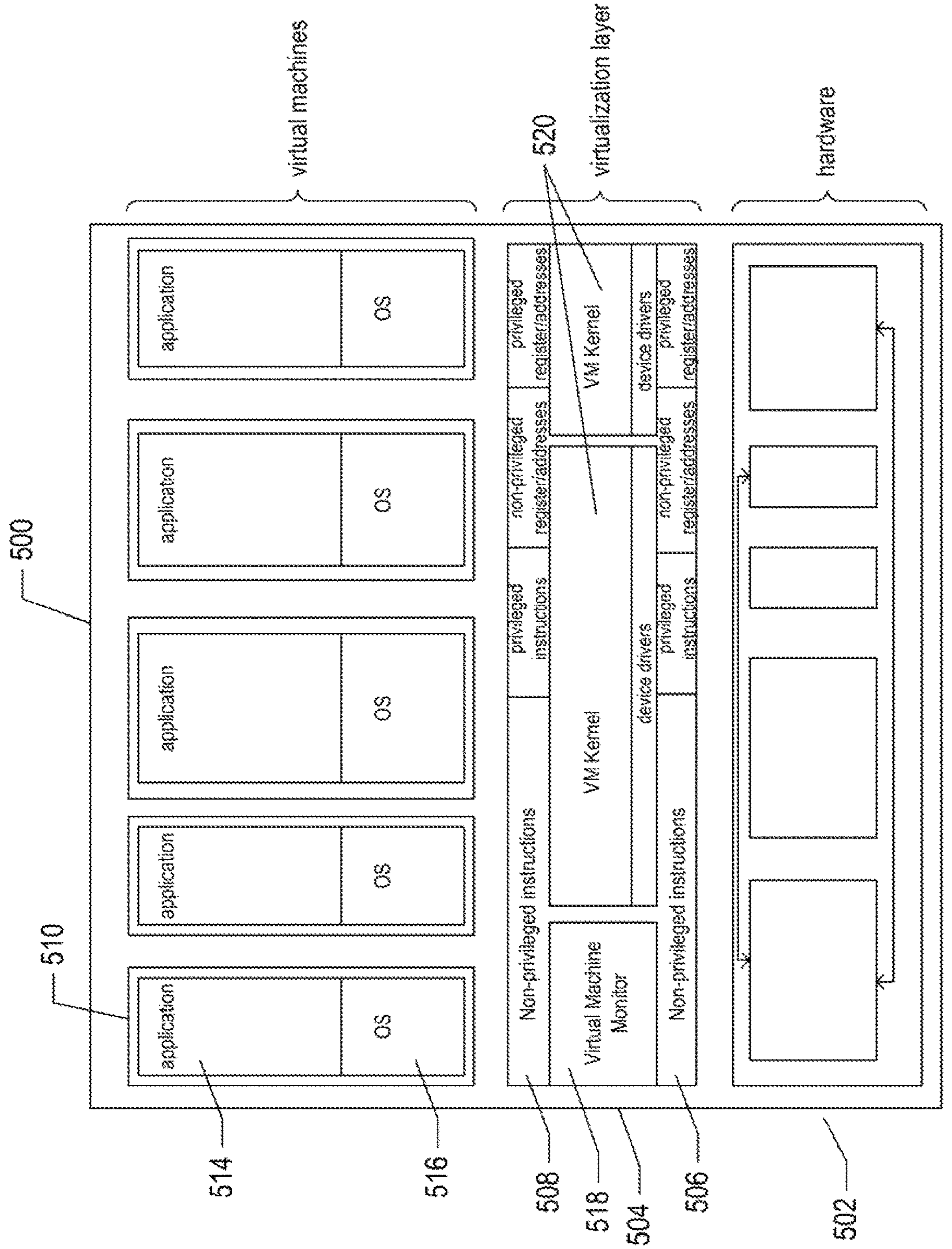
FIGS. 5A-D illustrate two types of virtual machine and virtual-machine execution environments.
Figure 5B:
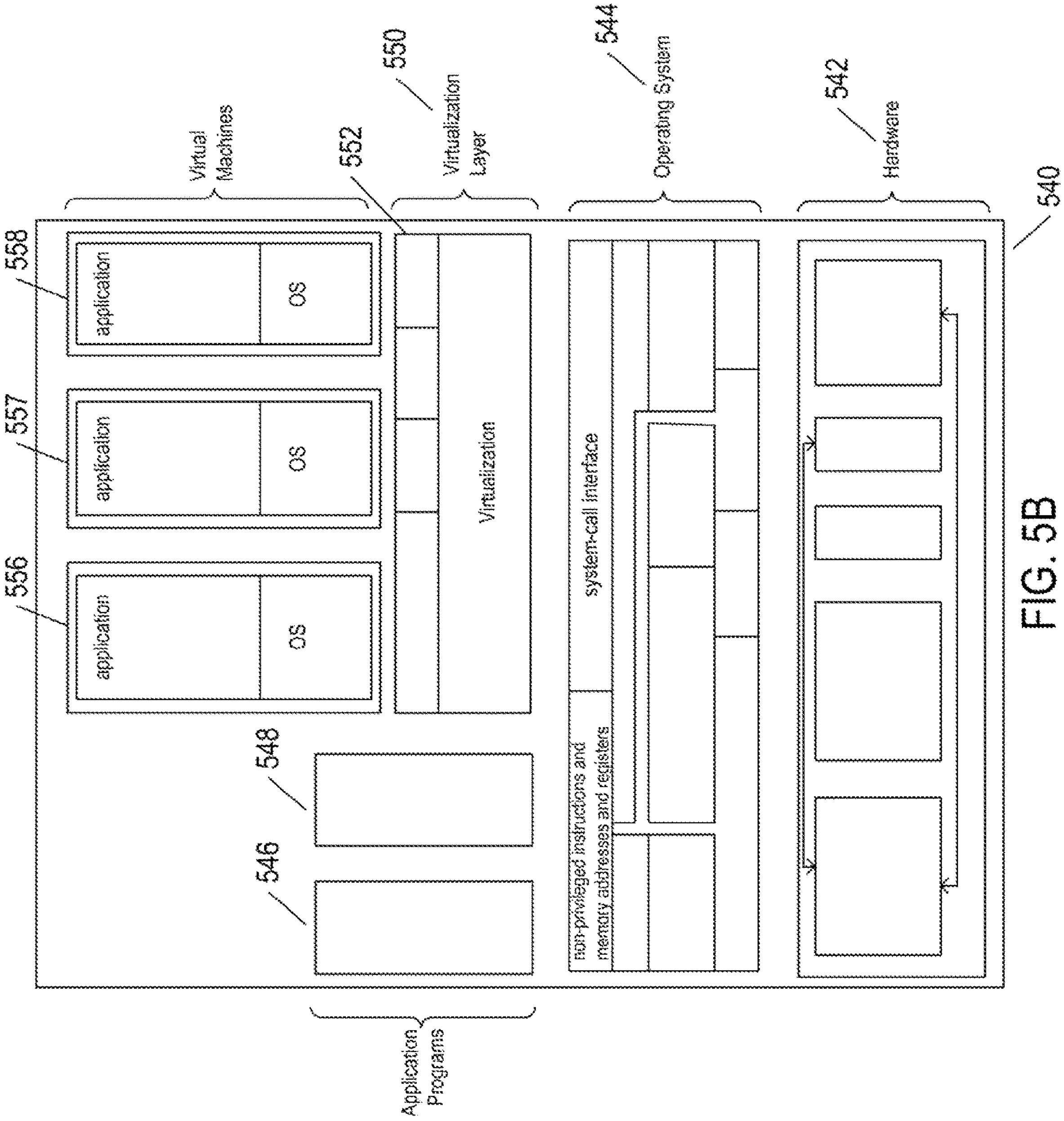

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
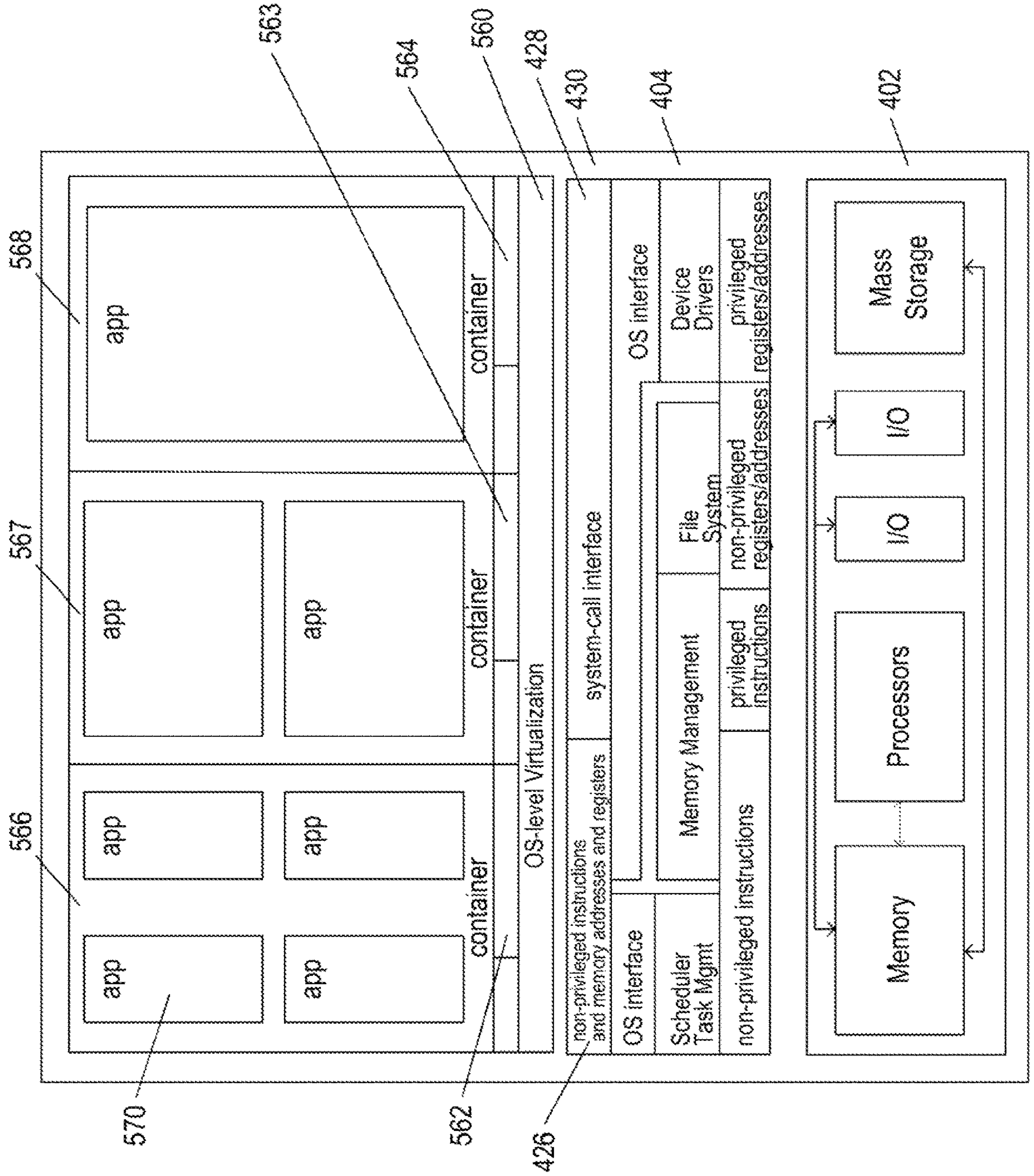

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
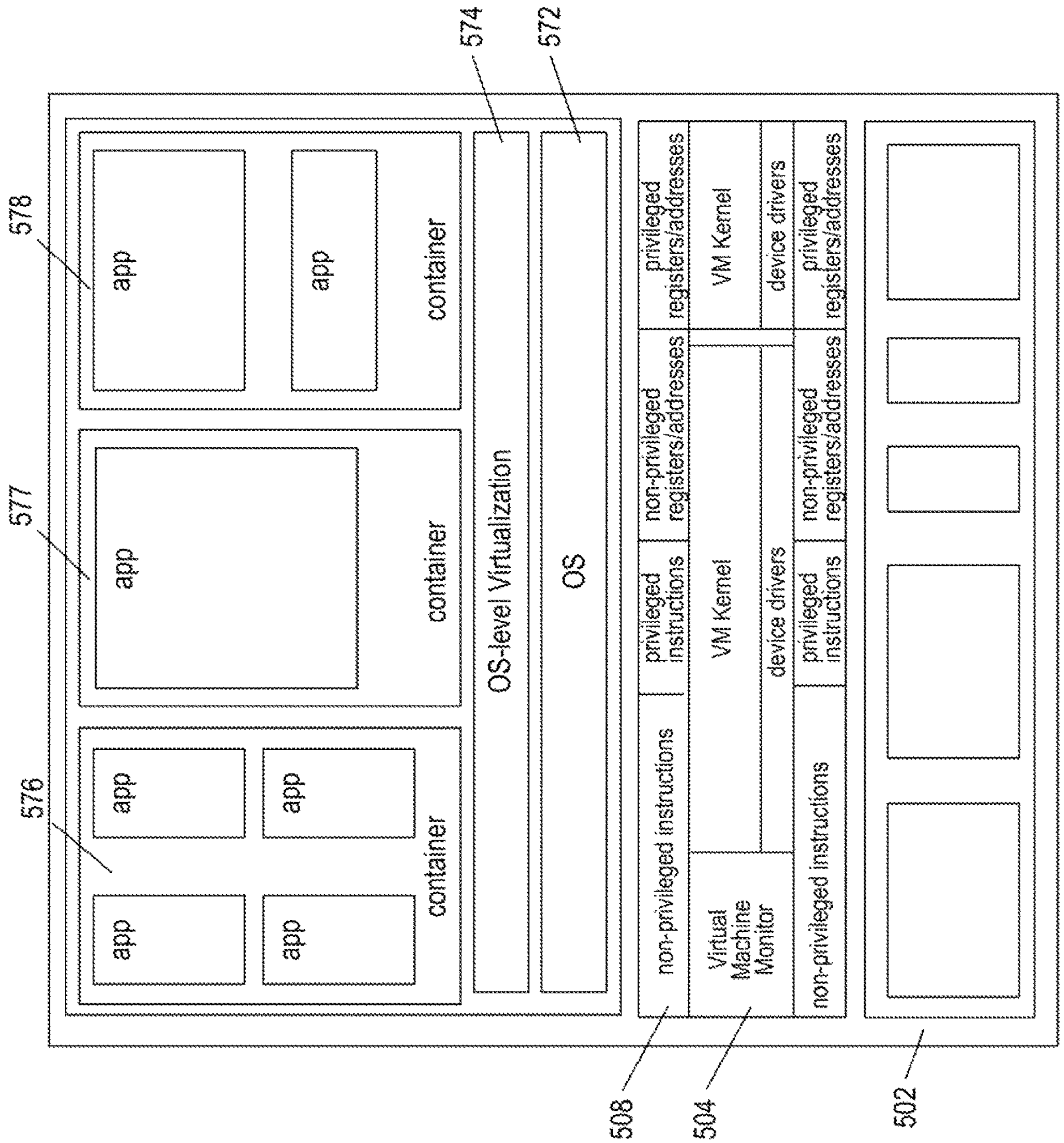

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
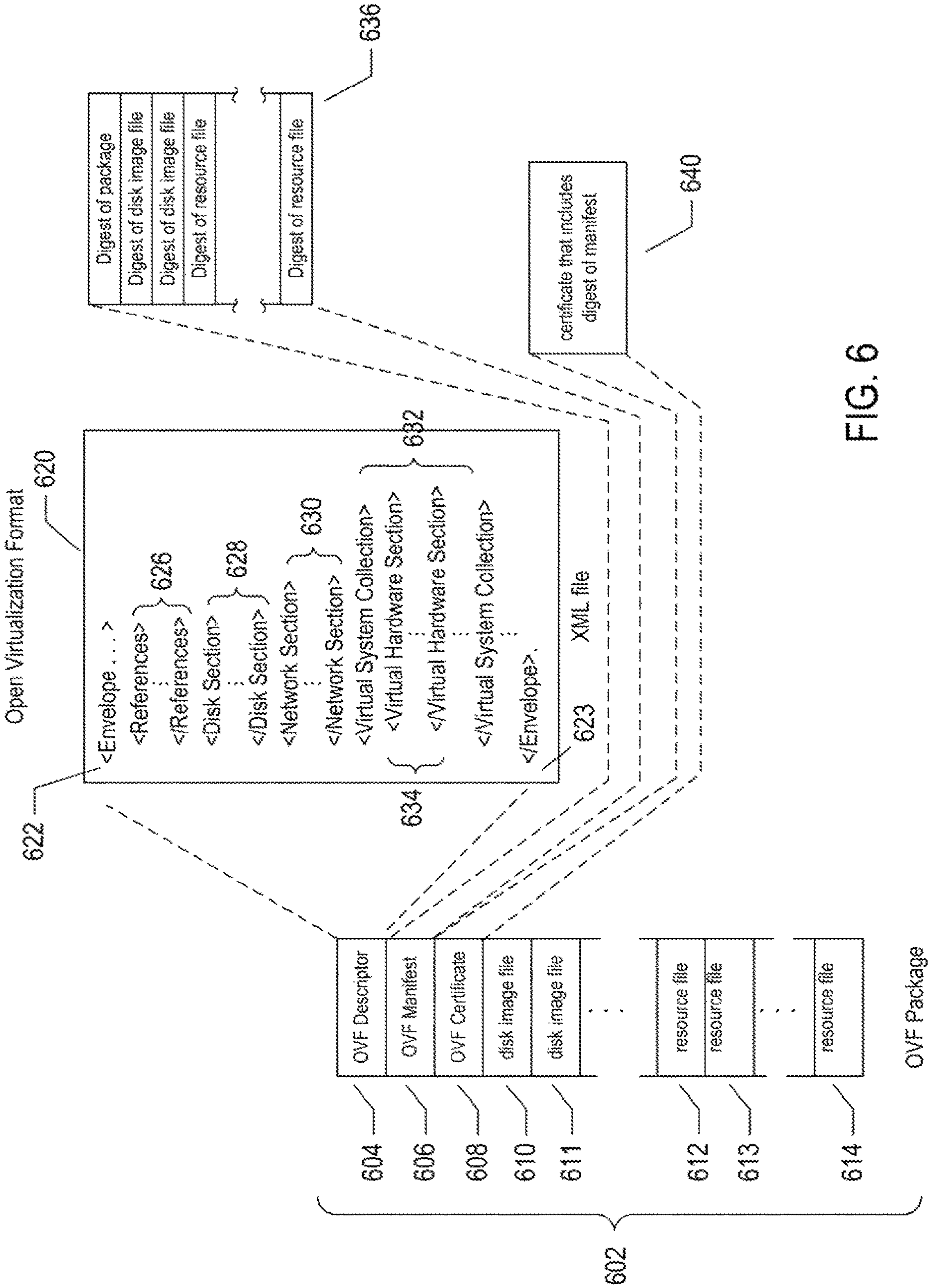
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
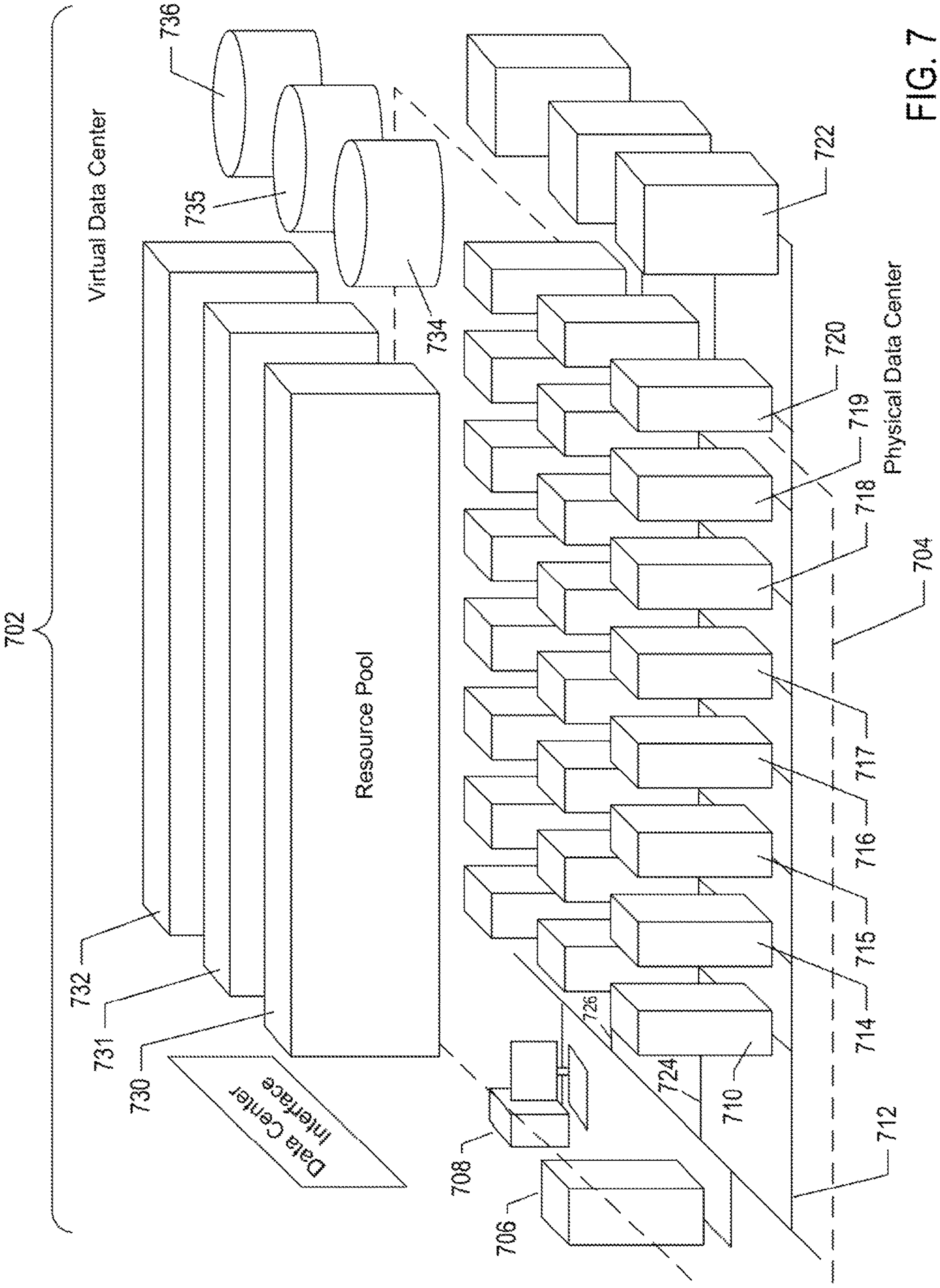
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
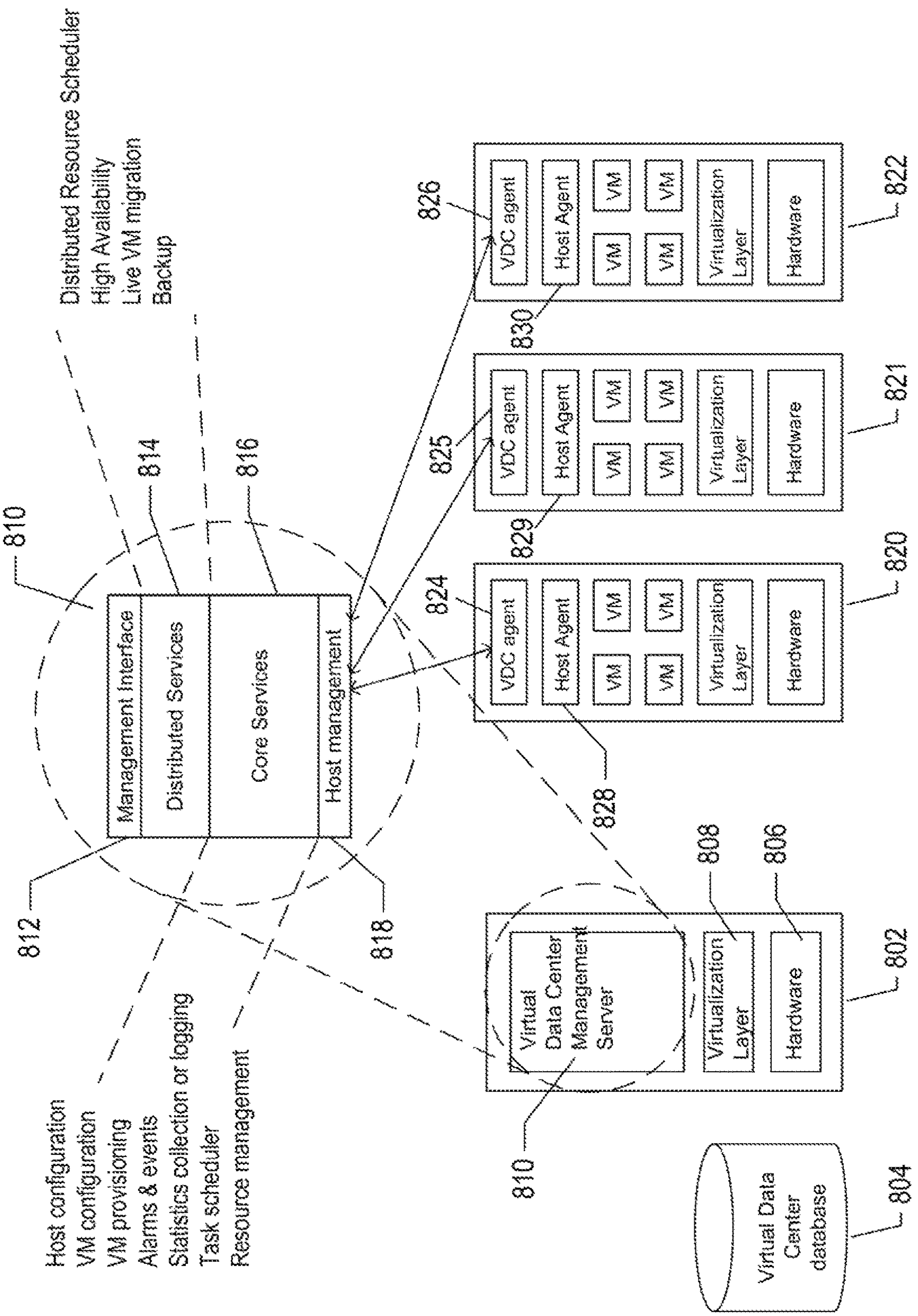
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
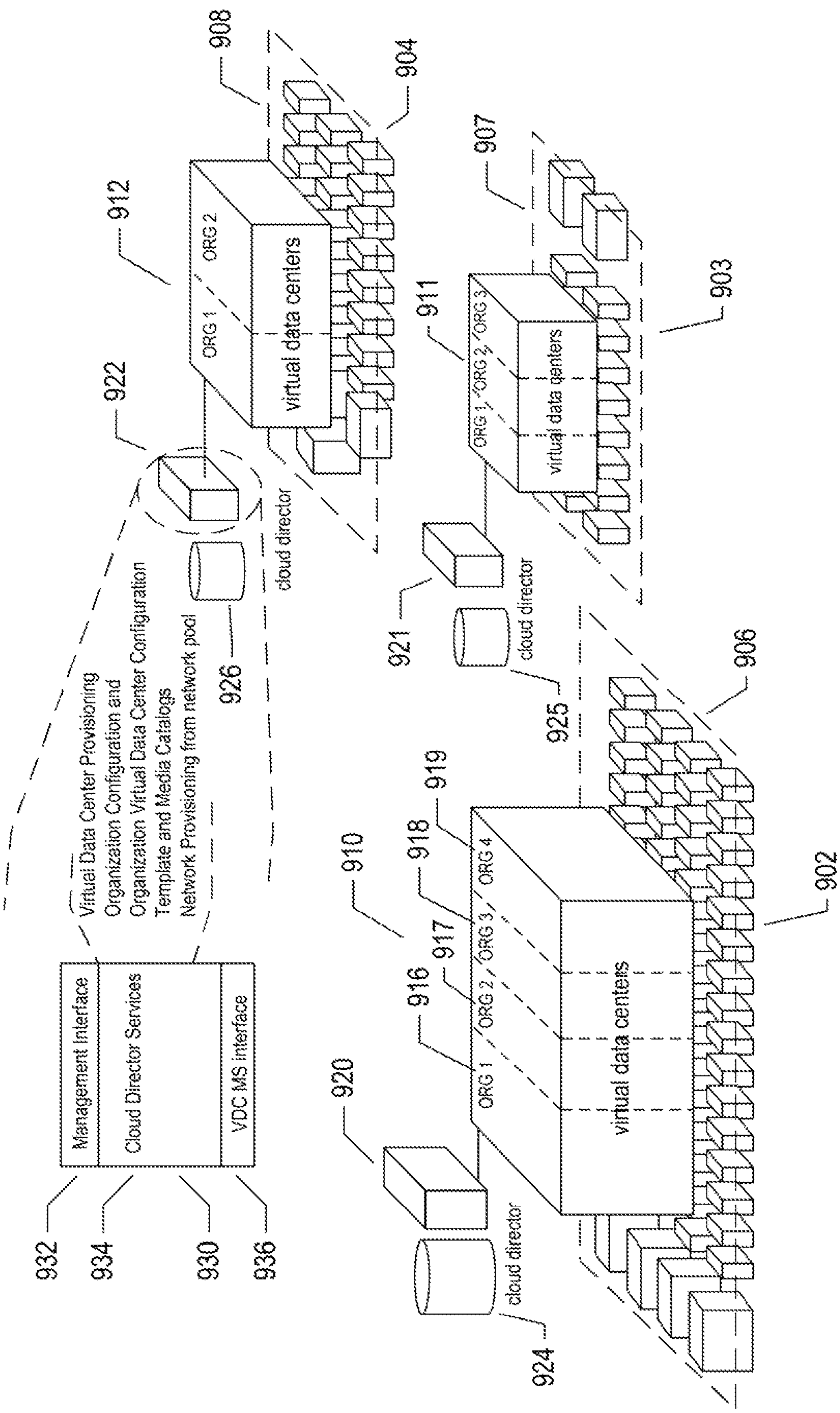
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
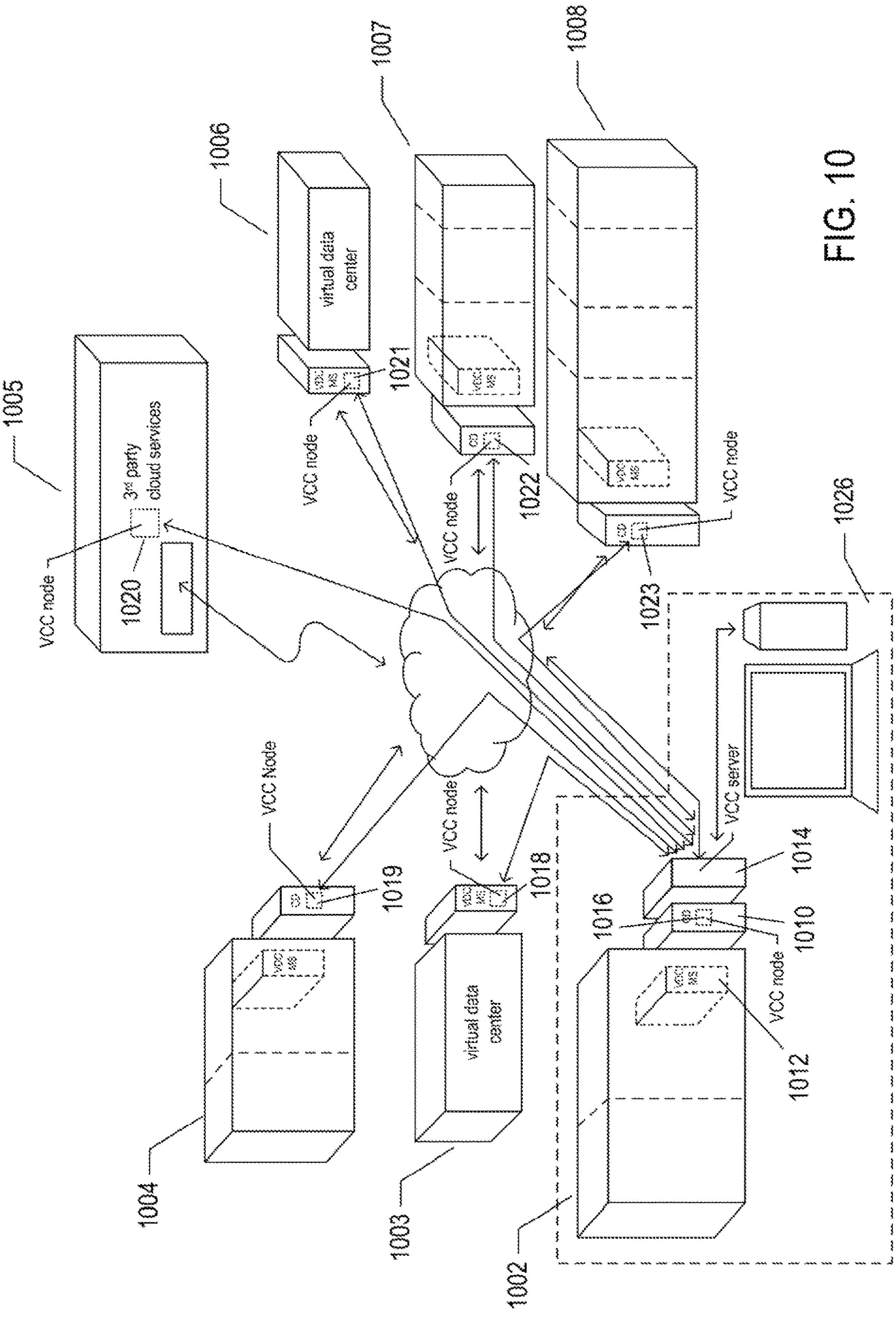
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration and management systems that detect anomalous operating behaviors of various components of the distributed computing systems, collect indications of normal operational behaviors, errors, and anomalies reported by distributed-computing-system components, and use the collected information to monitor and diagnose the operational states of the distributed computing systems in order to automatically undertake corrective and ameliorative actions to address problems as well as to alert human system administrators of potential, incipient, and already occurring problems. Log/event-message reporting, collecting, storing, and querying systems are fundamental components of administration and management subsystems.

The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers. Thus, as with many areas in computing and electronics, there are trade-offs and careful balancing considerations in developing and using log/event-messages subsystems incorporated within distributed computing systems.

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
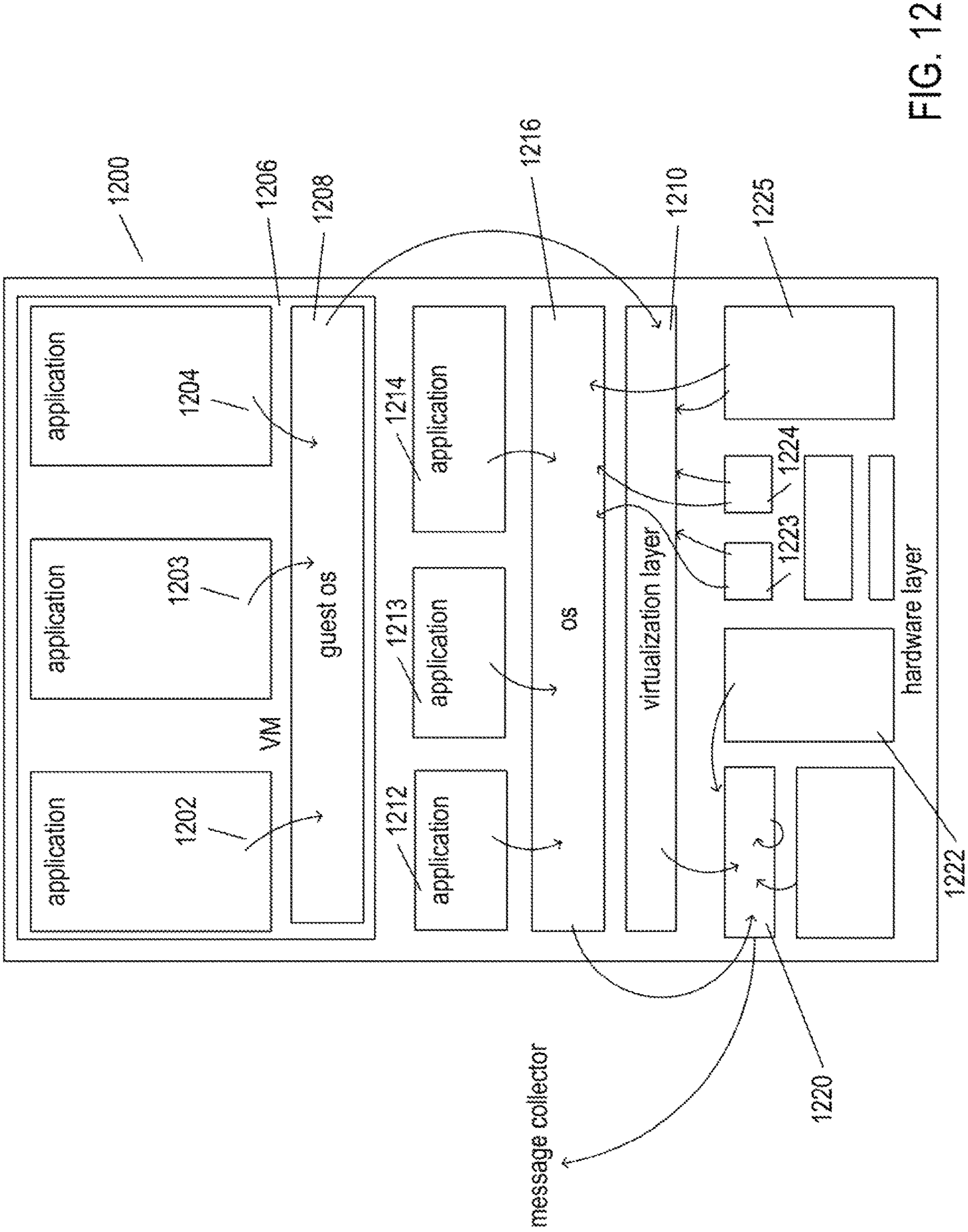
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
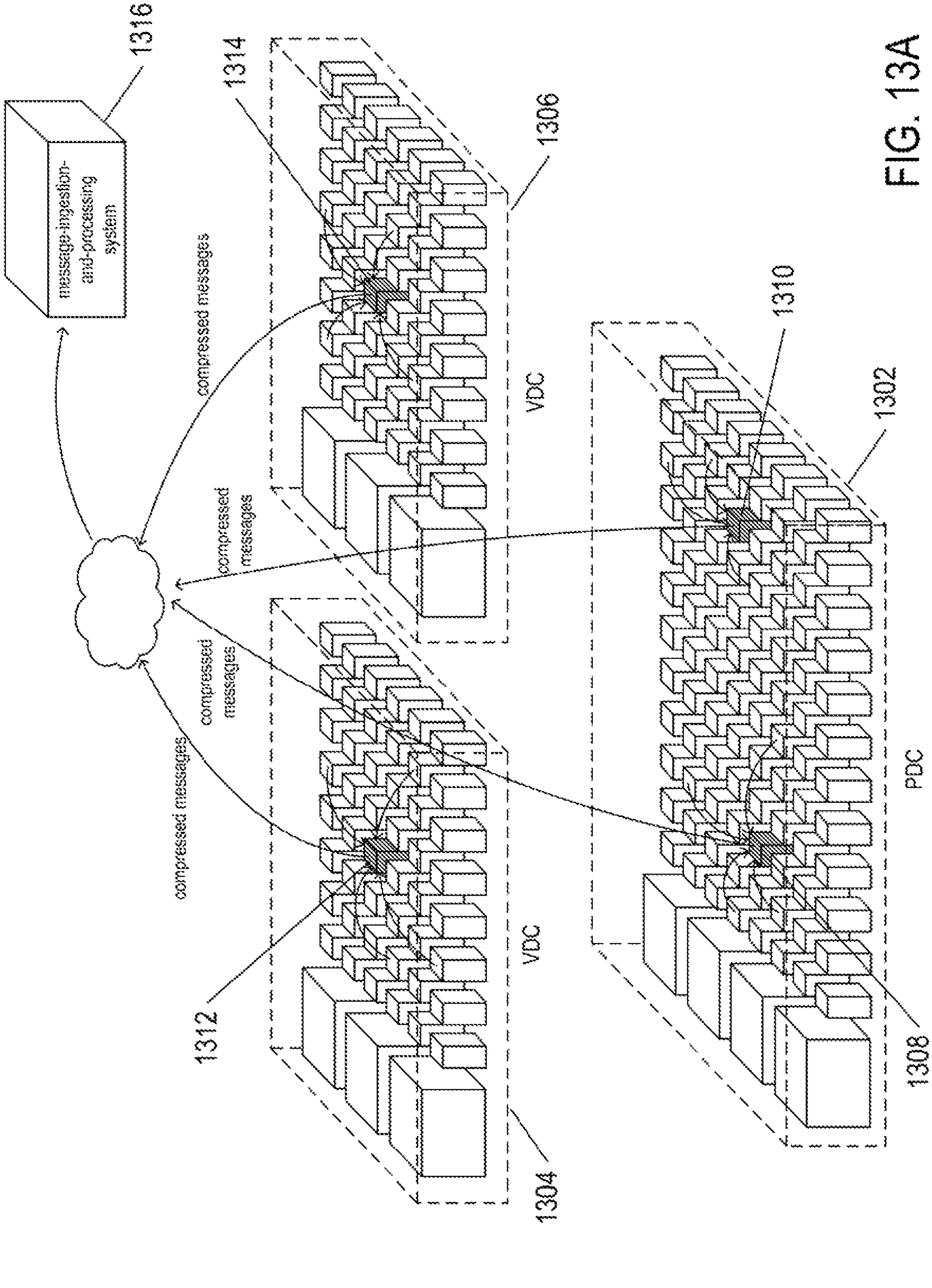
FIGS. 13A-B illustrate two different types of log/event-message collection and forwarding within distributed computer systems.
Figure 13B:
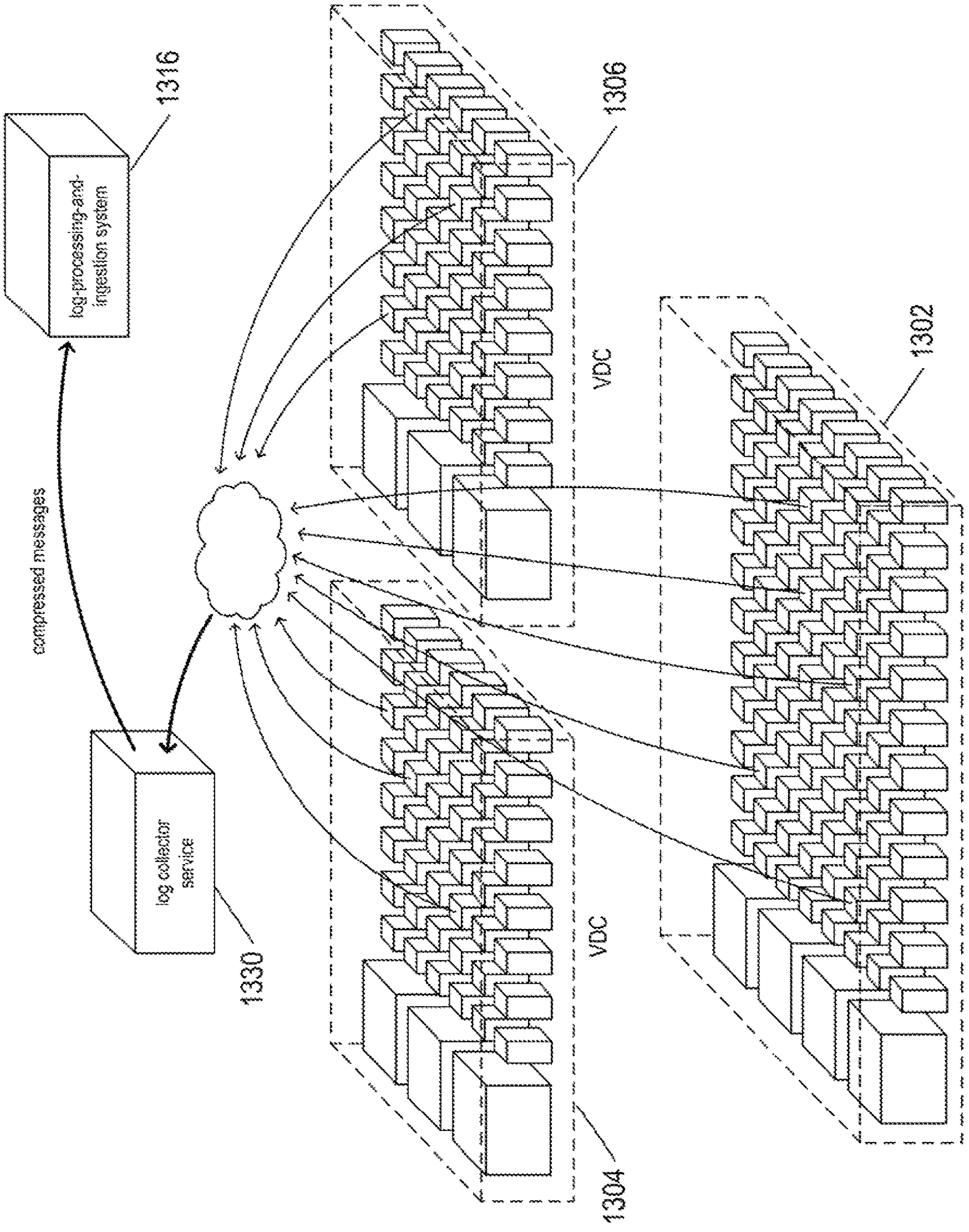

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of collected messages and forward the compressed messages to a message-proces sing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
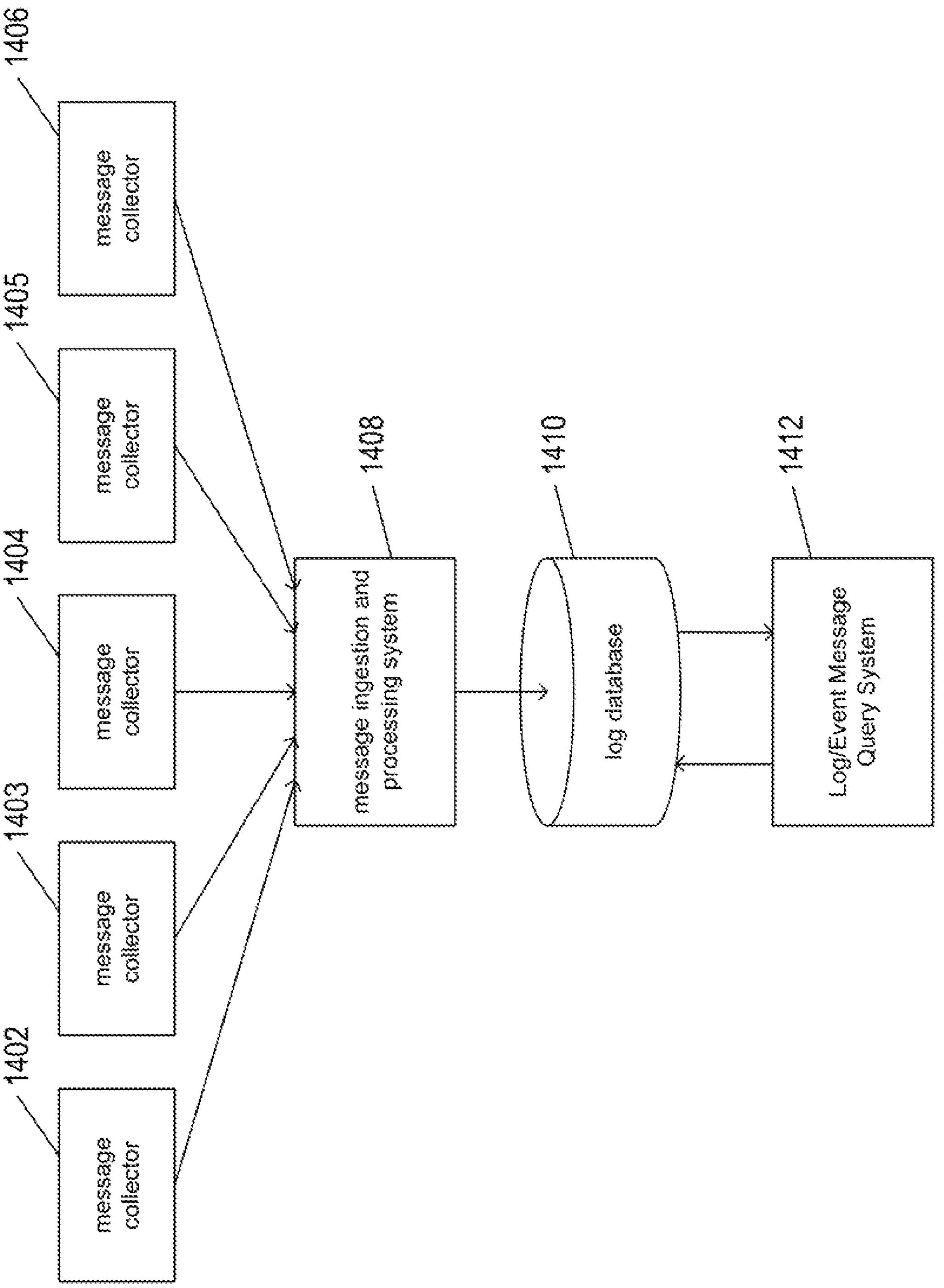
FIG. 14 provides a block diagram of a generalized log/event-message system incorporated within one or more distributed computing systems.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, encrypt the compressed messages, and send the encrypted and compressed batches of log/event messages to a message-ingestion-and-processing system 1408. The message-ingestion-and-processing system decrypts and decompresses received compressed and encrypted batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

As discussed above, enormous volumes of log/event messages are generated within modern distributed computing systems. As a result, message collectors are generally processor-bandwidth bound and network-bandwidth bound. Message-ingestion-and-proces sing systems are associated with similar network-bandwidth and processor-bandwidth overheads, but also use large amounts of data-storage capacities within the computing systems in which they reside. Because of the severe computational, data-storage, and networking burdens associated with collecting and processing log/event messages, when message processing by message-ingestion-and-processing systems slows or is temporarily halted, when network connections between message collectors and message-ingestion-and-processing systems fail, and when the bandwidths of the network connections significantly decrease due to traffic loads and increasing transmission latencies, message collectors are generally incapable of storing incoming log/event messages for more than relatively short periods of time before internal caches are exhausted and either subsequently arriving log/event messages must be discarded and/or the internal caches must overwritten, resulting in previously cached log/event messages being discarded. When log/event messages are discarded, or dropped, potentially important and critical information may be lost, such as sequences of warning and error messages that would otherwise be identified as indicating various types of accelerating system problems and deficiencies that may lead to catastrophic system crashes, data loss and corruption, and other undesirable conditions. The amount of time that a message collector can internally cache log/event messages before internal caches are exhausted depends on various characteristics and parameters of particular message-collector implementations. However, in many distributed computer systems, the time periods during which log/event-message caching can be used to prevent information loss may be on the order of seconds to minutes, while the networking and message-processing problems that result in a need for log/event-message caching may often extend for minutes to hours. Thus, many current distributed computer systems frequently suffer information losses that significantly impair the ability of automated distributed-computing-system management-and-administration systems to detect incipient and already serious problems and to forestall the serious consequences that may ensue when the incipient and already serious problems are not addressed in a timely fashion.

As mentioned above, a fundamental problem with the current log/event-message systems is that even the computational, networking, and data-storage bandwidths and capacities of large distributed computer systems may be seriously taxed due to the extremely large volumes of log/event messages generated during each day of the system operation. This problem is compounded by the fact that, in many cases, a large percentage of the generated log/event messages may contain only informational and warning messages that have relatively little utility for many types of automated-administration-and-management-system monitoring and remediation tasks. Quite often, even error messages may be relatively unimportant, having been generated as a result of reoccurring types of errors that may be automatically address by automated administration-in-management systems within distributed computer systems. Furthermore, due to the volume of log/event messages generated, finding relevant log/event messages for identifying and diagnosing serious errors becomes a needle-in-the-haystack problem for both human administrators and managers as well as automated administration-and-management systems. For all of these reasons, a variety of different approaches for increasing the efficiency of log/event-message systems have been taken.

Figure 15:
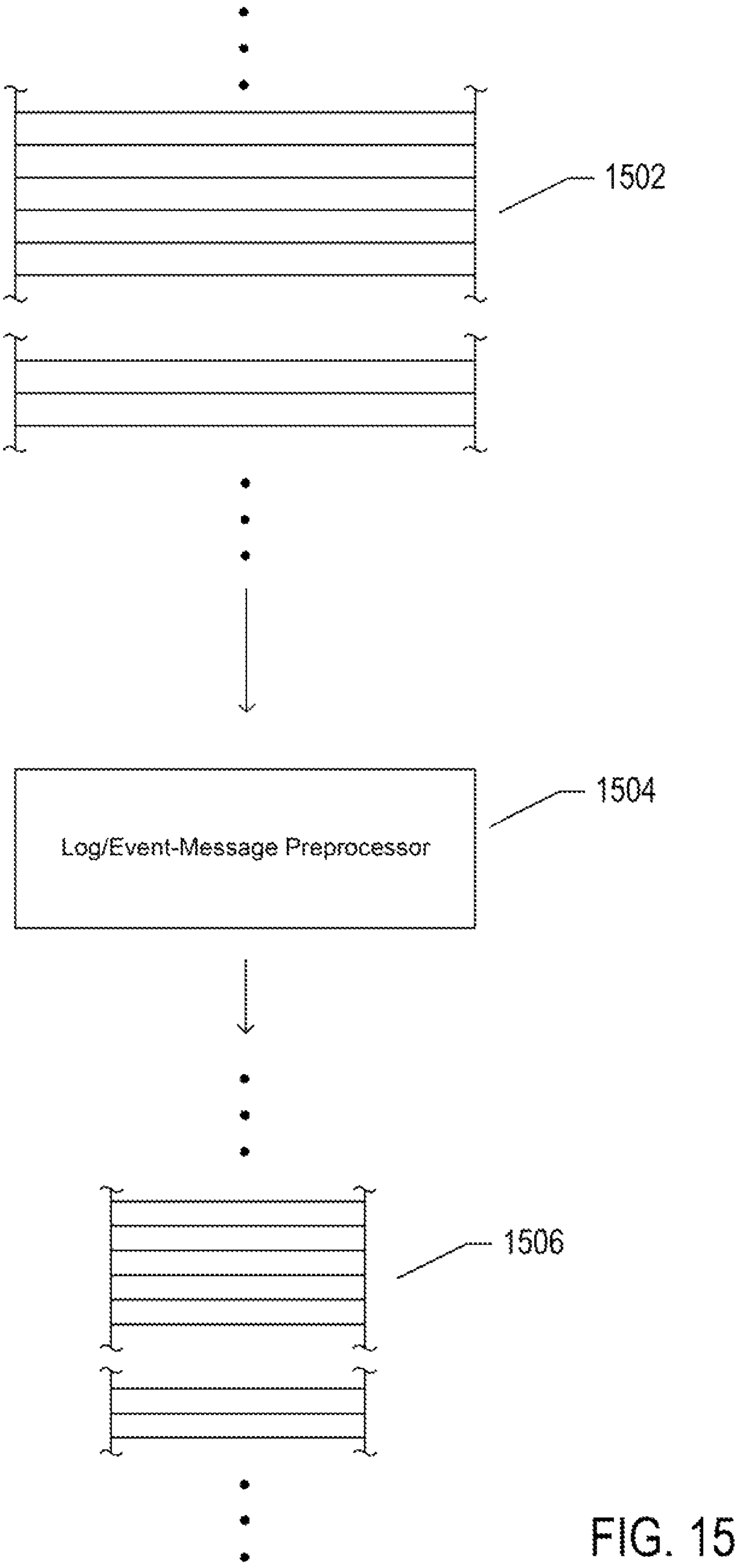
FIG. 15 illustrates log/event-message preprocessing that provides a basis for efficient cached-information compression.

One approach to addressing the above-discussed problems is to attempt to compress log/event messages for storage. Clearly, by compressing log/event messages, the data-storage-capacity related problems and networking-bandwidth problems may be at least partly addressed. FIG. 15 illustrates log/event-message preprocessing that provides a basis for efficient cached-information compression. As shown in FIG. 15, an input stream of log/event messages 1502 is preprocessed by a log/event-message preprocessor 1504 to generate an output stream 1506 of base-form log messages ("BFLMs"). A BFLM is a systematically transformed log/event message. In general, highly variable fields in input log/event messages are abbreviated or removed to produce a corresponding BFLM. However, variability is only one criterion for field removal or abbreviation. In general, the transformations of log/event messages to corresponding BFLMs is designed or obtained by automated methods to minimize the number of unique BFLMs while, at the same time, maximizing subsequent desired information recovery from stored information compiled from collected BFLM statistics. Thus, transformations of log/event messages to corresponding BFLMs are dependent on the types of information extracted from stored information by the log/event message query system. The number of unique BFLMs in the output stream 1506 is generally far less than the number of unique input log/event messages. For example, input log/event messages generally include timestamps, so that only those log/event messages generated within the smallest-granularity time that can represented by a timestamp have any chance of being identical. However, when the timestamp is removed or replaced by a common symbol, then log/event messages generated at any time may be identical. A BFLM can serve as a log/event-message identifier for efficient compression of log/event messages.

Figure 16:
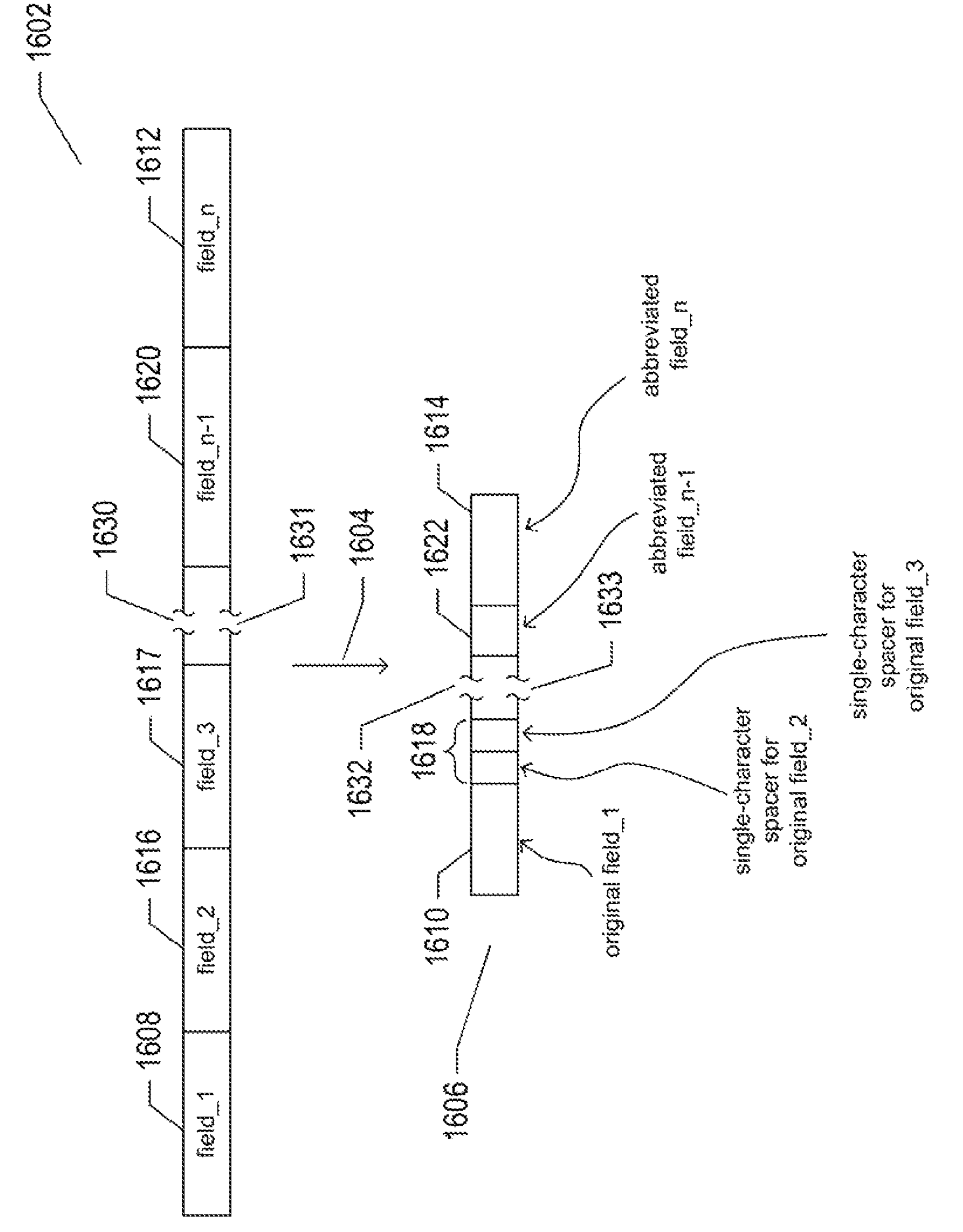
FIG. 16 illustrates log/event-message preprocessing.

FIG. 16 illustrates log/event-message preprocessing. An input log/event message 1602 is represented at the top of the figure. Arrow 1604 represents preprocessing. The result of preprocessing, BFLM 1606, is a generally truncated version of the input log/event message. In this example, the first field 1608 in the input log/event message remains intact 1610 in the BFLM. Similarly, the final field 1612 of the input log/event message remains intact 1614 in the BFLM. However, the second and third fields of the input message 1616-1617 are both abbreviated to single-character spacers 1618 in the BFLM, essentially removing these fields. The second to last field 1620 in the input log/event message is abbreviated 1622 in the output BFLM. Note that, in this figure and subsequent figures, broken lines 1630-1633 indicate the possible presence of additional fields in both representations of log/event messages as well as BFLMs. In general, there are a variety of different transformations that can be carried out on each original field of the input log/event message. The field can be incorporated in the BFLM, truncated and incorporated in the BFLM, abbreviated incorporated in the BFLM, compressed and incorporated in the BFLM, mapped to one of a set of replacement fields, with the replacement field incorporated in the BFLM, and omitted from the BFLM.

There are many different possible ways to generate systematic log/event-message preprocessors. The transformations, such as the transformation shown in FIG. 16, may be hardcoded or specified through a user interface by system administrators and other personnel. Alternatively, machine-learning techniques may be applied to optimize compression by learning which fields to remove or abbreviate to maximize compression while minimizing information loss. Users may employ additional information, including log-content packs provided by application and log-message-system vendors, to rationally determine the types of transformations that provide desired levels of compression without significant information loss.

Figure 17B:
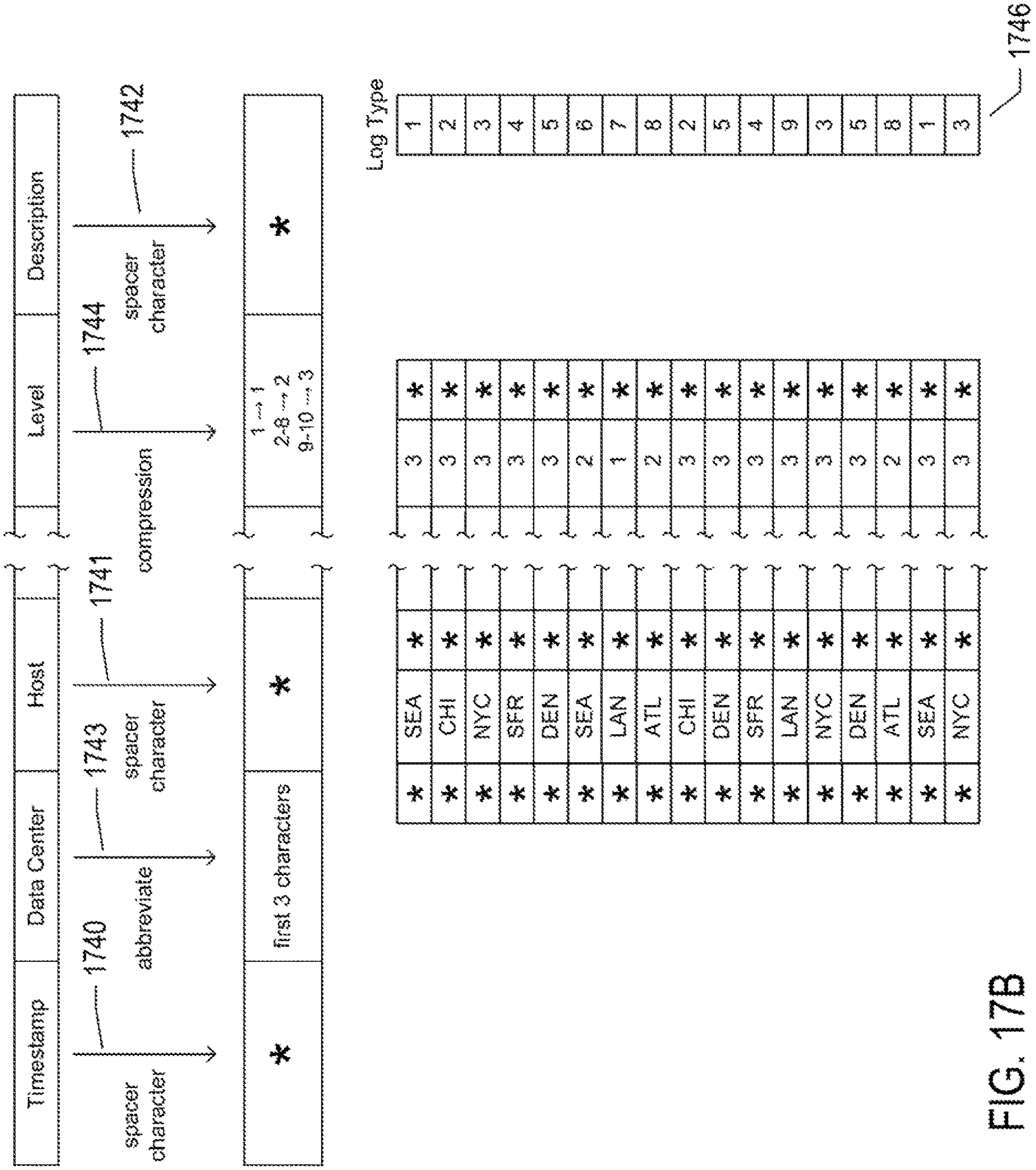
Figure 17C:
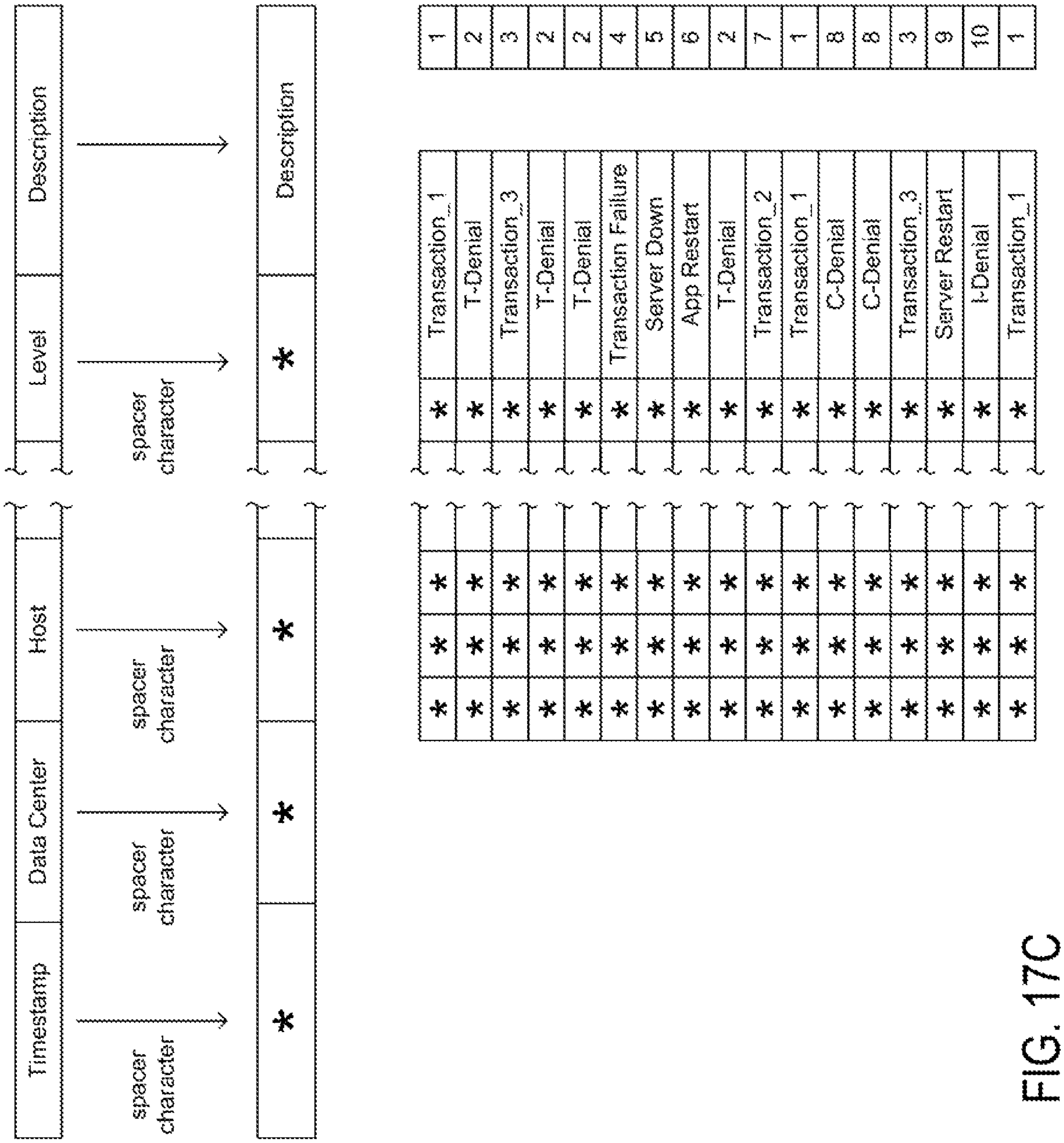

FIGS. 17A-C provide several examples of log/event-message-to-BFLM transformations. FIG. 17A shows a representation 1702 of a log/event message which includes the fields: (1) Timestamp 1703; (2) Data Center 1704; (3) Host 1705; (4) Level 1706; and (5) Description 1707. Table 1708 includes 17 log/event messages, with each row of the table representing a single log/event message. For example, a log/event message query system might store log/event messages in a relational-database table with columns corresponding to the log/event-message fields. FIG. 17B shows a first log/event-message-to-BFLM transformation and a table containing the 17 BFLMs produced by the transformation corresponding to the 17 log/event-messages shown in table 1708 in FIG. 17A. The first log/event-message-to-BFLM transformation substitutes a spacer character for the first, third, and final fields 1740-1742, abbreviates the second field using the first three characters of the original second field 1743, and compresses the second-to-last field 1744 by compressing 100 different possible levels that may be encoded in the Level field to only three levels. As indicated by a log-type column 1746, following transformation, the 17 different log/event messages are transformed into only nine different BFLMs. Of course, in an actual log/event-message system, this type of transformation may lead to compression of literally billions of different log/event messages to only a few tens to hundreds of different types of BFLMs. FIG. 17C illustrates a different, second log/event-message-to-BFLM transformation, using the same illustration conventions as used in FIG. 17B. In this case, the 17 different log/event messages, shown in FIG. 17A, are compressed into 10 different types of BFLM. As with the first log/event-message-to-BFLM transformation, application of the second log/event-message-to-BFLM transformation to a real-world set of billions of log/event messages may result in compression of literally billions of different log/event messages to only a few tens to hundreds of different types of BFLMs. Thus, log/event-message preprocessing is used to produce a modest number of unique BFLMs corresponding to a very large number of different types of log/event messages. In general, the ratio of unique BFLMs to unique log/event-messages is less than 0.001, is frequently less than 0.000001, and can often be significantly smaller. In many cases, a log/event-message system may employ multiple different transformations, each applied to a particular subset of log/event messages. In other words, a particular transformation may be used for each of a number of different fundamental types of log/event messages.

Figure 18C:
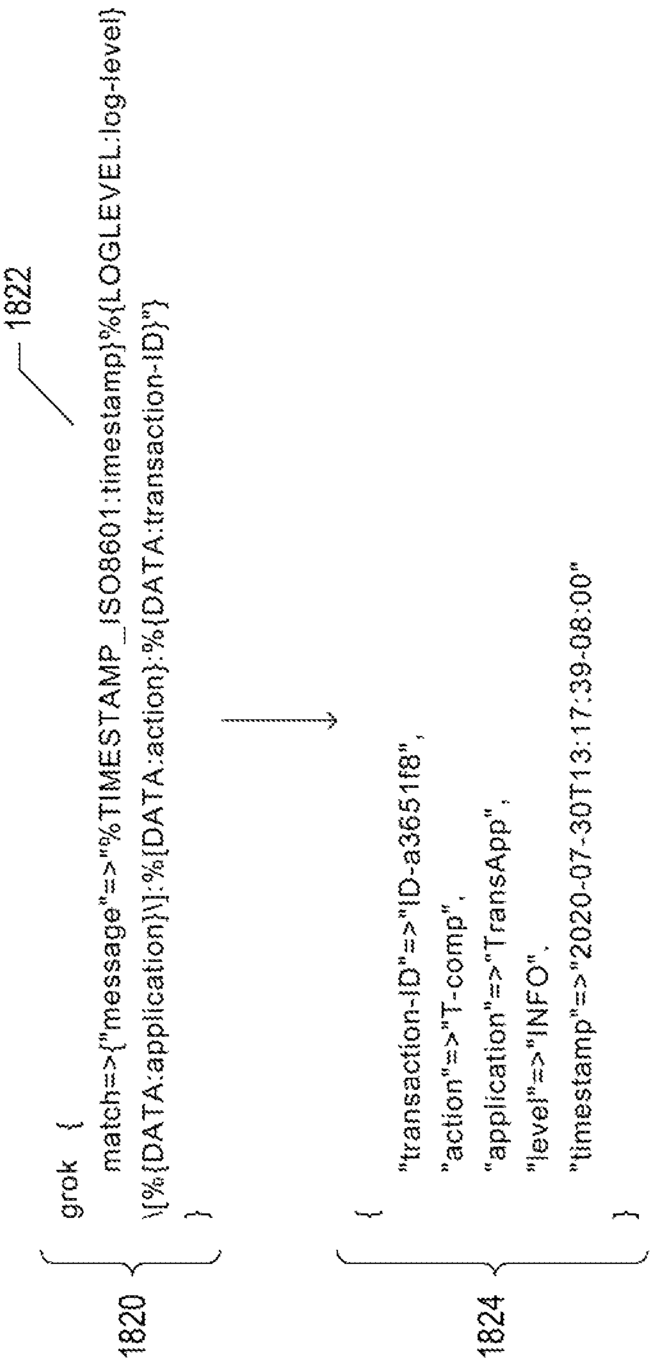

FIGS. 18A-C illustrate one approach to extracting fields from a log/event message. Log/event messages may be understood as containing discrete fields, as in the representations shown in FIGS. 16-17A, but, in practice, they are generally alphanumeric character strings. An example log/event message 1802 is shown at the top of FIG. 18A. The five different fields within the log/event message are indicated by labels, such as the label "timestamp" 1804, shown below the log/event message. FIG. 18B includes a variety of labeled regular expressions that are used, as discussed below with reference to FIG. 18C, to extract the values of the discrete fields in log/event message 1802. For example, regular expression 1806 follows the label YEAR 1808. When this regular expression is applied to a character string, it matches either a four-digit indication of a year, such as "2020," or a two-digit indication of the year, such as "20." The string "\d\d" matches two consecutive digits. The "(?>" and ")" characters surrounding the string "\d\d" indicates an atomic group that prevents unwanted matches to pairs of digits within strings of digits of length greater than two. The string "{1, 2}" indicates that the regular expression matches either one or two occurrences of a pair of digits. A labeled regular expression can be included in a different regular expression using a preceding string "%{" and a following symbol "}," as used to include the labeled regular expression MINUTE (1810 in FIG. 18B) in the labeled regular expression TIMESTAMP_ISO8601(1812 in FIG. 18B). There is extensive documentation available for the various elements of regular expressions.

Grok parsing uses regular expressions to extract fields from log/event messages. The popular Logstash software tool uses grok parsing to extract fields from log/event messages and encode the fields according to various different desired formats. For example, as shown in FIG. 18C, the call to the grok parser 1820 is used to apply the quoted regular-expression pattern 1822 to a log/event message with a format of the log/event message 1802 shown in FIG. 18A, producing a formatted indication of the contents of the fields 1824. Regular-expression patterns for the various different types of log/event messages can be developed to identify and extract fields from the log/event messages input to message collectors. When the grok parser unsuccessfully attempts to apply a regular-expression pattern to a log/event message, an error indication is returned. The Logstash tool also provides functionalities for transforming input log/event messages into BFLMs, as discussed above with reference to FIG. 16-17C. The regular-expression patterns, as mentioned above, can be specified by log/event-message-system users, such as administrative personnel, can be generated by user interfaces manipulated by log/event-message-system users, or may be automatically generated by machine-learning-based systems that automatically develop efficient compression methods based on analysis of log/event-message streams.

Thus, BFLMs may serve as log/event-message type identifiers. There are alternative methods for generating type identifiers for log/event messages. Certain of these alternative methods involve ongoing clustering of log/event messages based on a distance metric that provides an indication of the relatedness of two different log/event messages. A log/event-message type or identifier can be associated with each cluster. In yet additional methods, various types of machine-learning techniques can be employed, such as neural networks, to return a type or identifier for an input log/event message. These various different types of approaches may also be combined. For example, clustering may be used to assign log/event-message types or log/event-message identifiers to groups of BFLMs, effectively mapping BFLMs to a small number of log/event-message types or log/event-message identifiers. Thus, a particular approach to generating a log/event-message types or log/event-message identifier for each log/event message received by the log/event-message system can be selected from a variety of different approaches and combinations of approaches. Once a log/event-message types or log/event-message identifier has been generated for a received log/event message, the log/event message can be initially represented in event-tuple form. Event-tuple form comprises a log/event-message type followed by an ordered list of extracted field values, such as the event-tuple form "106, {'2020-07-30', '13:17:39-08:00', 'INFO', '[TransApp]', 'T-comp', 'ID-a3651f8'}" for the example log/event message 1802 shown at the top of FIG. 18A, where the log/event-message type is 106. Many alternative approaches to generating an event-tuple form of a log/event message are, of course, possible.

Compression of log/event messages, either by generating BFLMs as compressed forms or by generating event-tuple forms of log/event messages, with only particularly relevant field values included in the event-tuple forms, can be used to partially address the problems associated with the volumes of log/event messages generated in distributed computer systems, as discussed above. However, these approaches may be inadequate and do not address the problem of storing many low-useful-information-content log/event messages which, even in compressed form, require significant amounts of data-storage capacity and involve significant processing and network overheads.

Figure 19:
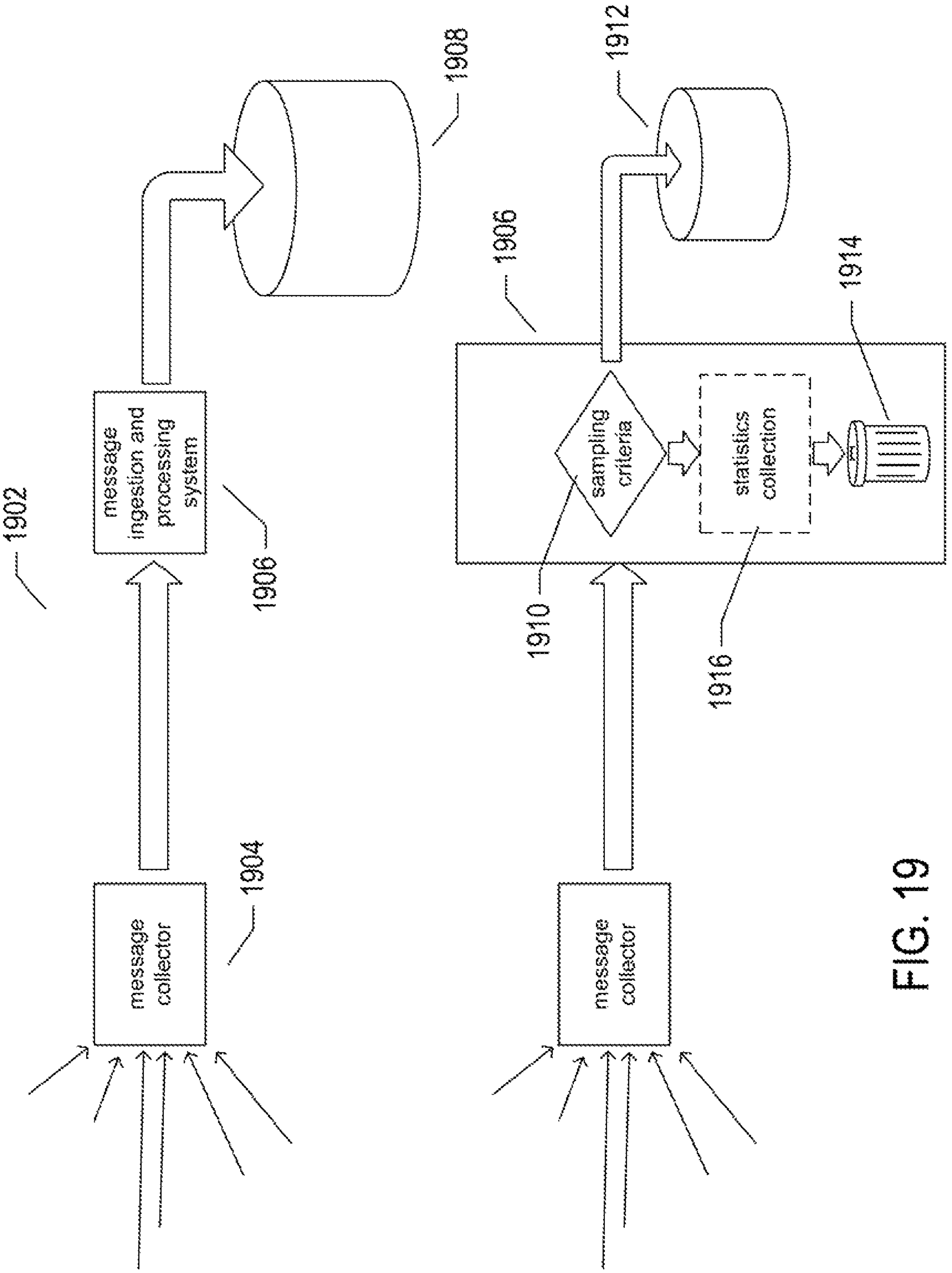
FIG. 19 illustrates another approach to addressing the log/event-message volume problems.

FIG. 19 illustrates another approach to addressing the log/event-message volume problems. A simplified representation 1902 of a log/event-message system is shown at the top of FIG. 19A. A message collector 1904, representing multiple message collectors in a distributed computer system, receives log/event messages from numerous log/event-message sources and forwards the log/event messages to a message-ingestion-and-processing system 1906, representing one or more message-ingestion-and-processing systems, which processes the log/event messages to generate alarms, carry out other types of actions, and store log/event messages in a log/event-message store or database 1908. As discussed above, the log/event messages may be compressed by the message collector or the message-ingestion-in-processing system. As shown in the lower portion of FIG. 19, a sampling approach can be incorporated in the message-ingestion-and-processing system 1906. In this approach, sampling criteria are applied to each received log/event message, as represented by sampling-criteria-application step 1910. A portion of the received log/event messages evaluated by the sampling criteria are selected for downstream processing and/or storage 1912 and the remaining, unselected log/event messages are discarded 1914. As indicated by dashed rectangle 1916, statistics may be collected from the discarded log/event messages in order to maintain additional aggregated information about them. The sampling criteria may include sampling rates for different types of log/event messages. Currently, the sampling rates, and the sampling criteria, in general, are manually specified by administrators and managers. Unfortunately, regardless of how much care is taken by administrators and managers in specifying sampling criteria, it is generally the case that aggressive sampling often inadvertently discards important information contained in discarded log/event messages due to the inability of managers and administrators to foresee those categories and types of log/event messages that may provide information important to diagnosing and ameliorating various types of subsequently occurring system problems and failures. Moreover, since there may be many hundreds, thousands, or more types of log/event messages, depending on how log/event-messages types are defined and generated, it is an difficult and often practically impossible task to consider all of these various different types of log/event messages and specify effective sampling rates for them. For these reasons, currently available log/event-message sampling features tend to be infrequently used within distributed computer systems.

Figure 20A:
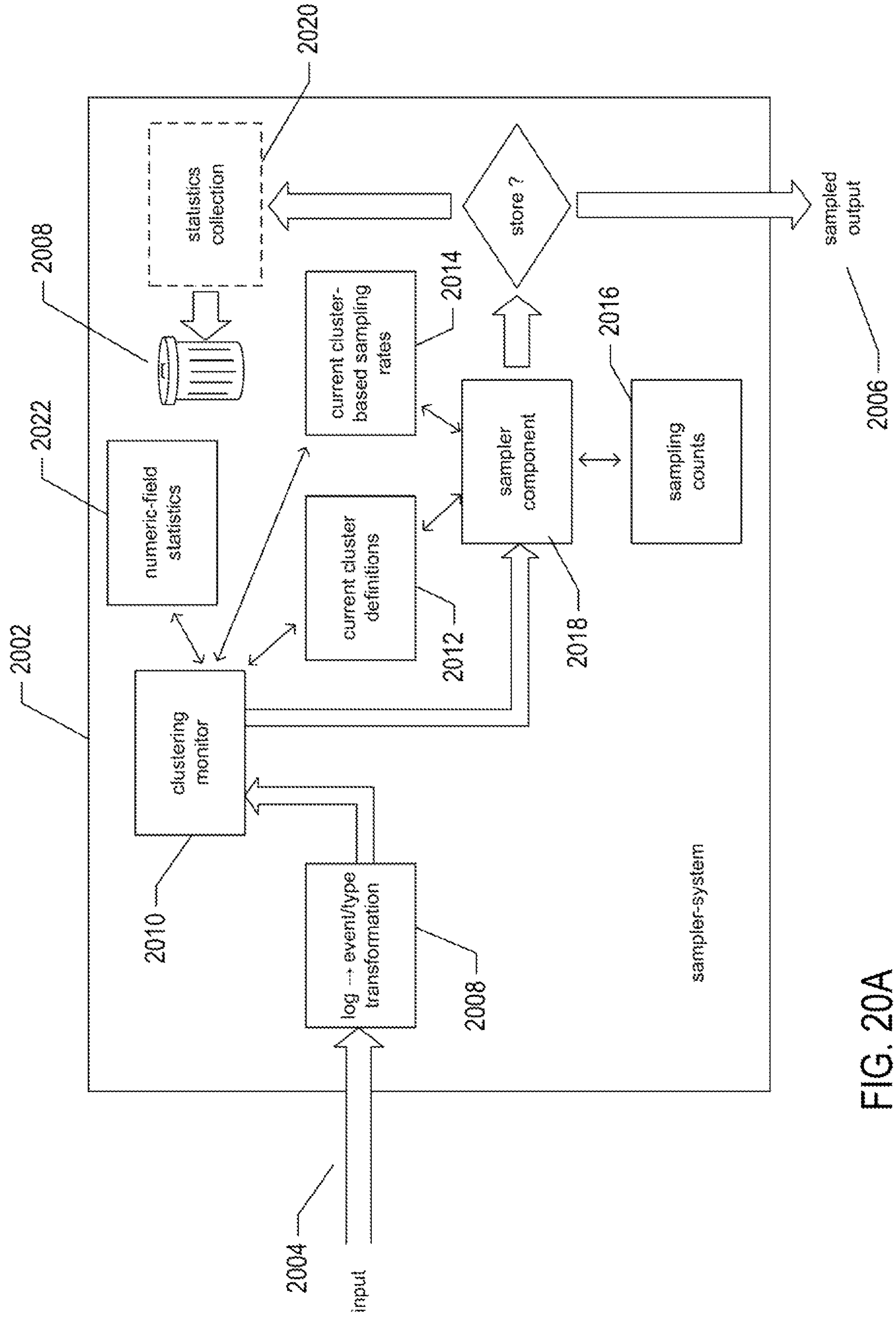
FIGS. 20A-B illustrates, in overview, the currently disclosed methods and systems for sampling log/event messages.
Figure 20B:
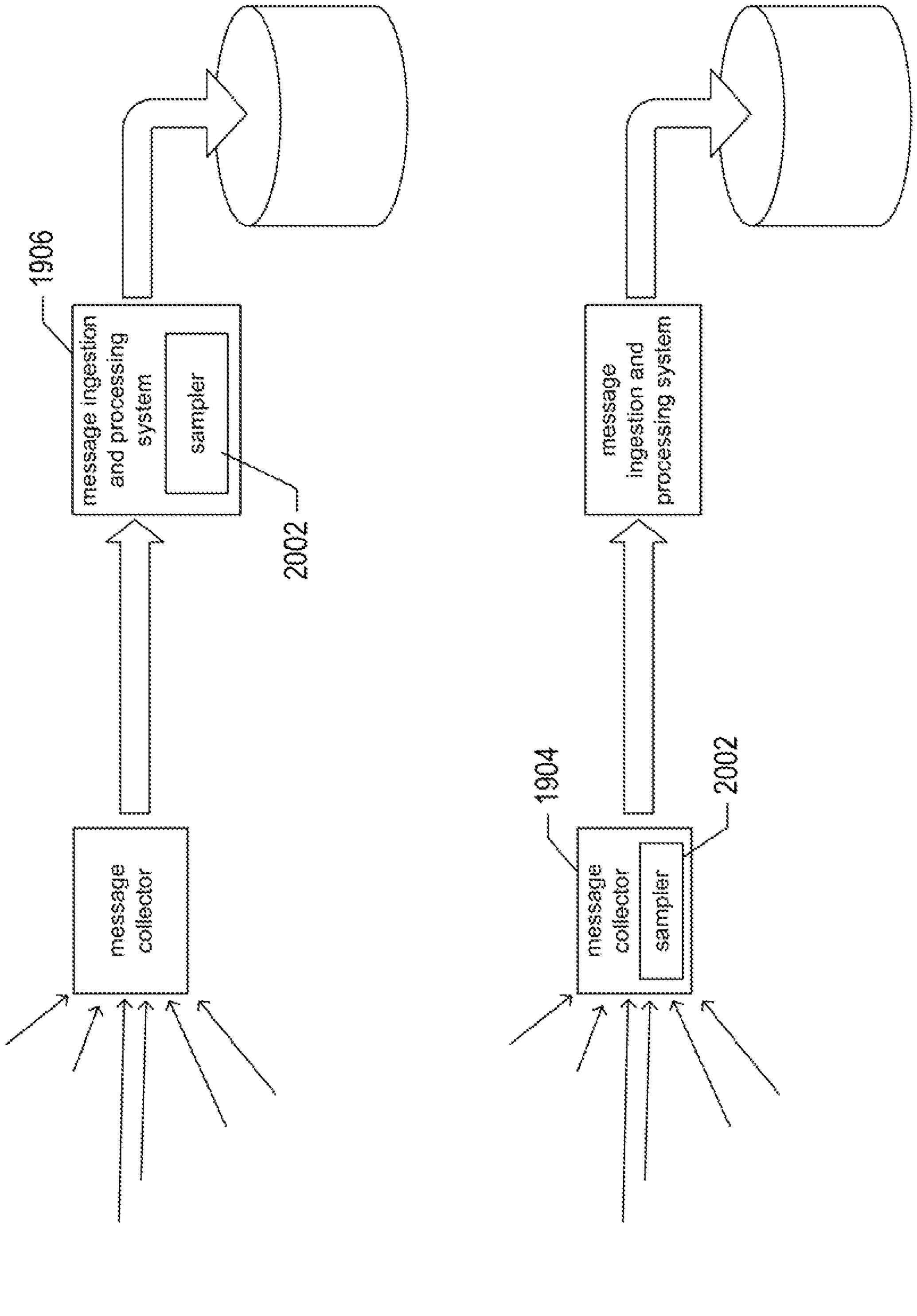

FIGS. 20A-B illustrates, in overview, the currently disclosed methods and systems for sampling log/event messages. The currently disclosed methods and systems automatically determine sampling rates for log/event messages in order to eliminate the need for manual specification of sampling rates and other sampling criteria. Moreover, the currently disclosed methods periodically regenerate sampling rates that are reflective of the current distribution of log/event-message types in the input stream, so that the sampling rates are tuned to current conditions rather than being static. The currently disclosed methods and systems are embodied in the sampler system 2002 shown in FIG. 20A. The sampler system receives a log/event-message input stream 2004 and outputs a sampled log/event-message stream 2006. The sampled log/event-message stream may be additionally processed by the log/event-message-system components in which the sampler is incorporated, such as, for example, by being compressed.

Input log/event messages are first transformed to the event-tuple form by a first transformation component 2008. A clustering-monitor component 2010 records indications of the most recently received log/event messages and periodically clusters the most recently received log/event messages to generate cluster definitions 2012 and cluster sampling rates 2014. These are employed, along with running counts of the types of log/event messages received 2016, by a sampler component 2018, to determine whether an input log/event message is output to the sampled output 2006 or discarded 2008. The dashed rectangle 2020 indicates that statistics may be collected for the discarded log/event messages in order to maintain aggregate information about the discarded messages. The clustering-monitor component additionally maintains numeric-field statistics 2022 that are used during the clustering process. As shown in FIG. 20B, instances of the sampler system 2002 can be incorporated either in the message-ingestion-and-processing systems 1906 of the log/event-message system or, because the sampler system is efficient with respect to computational, networking, and data-storage overheads, in the message collectors 1904 of the log/event-message system. Incorporation of the sampler system in the message collectors is generally preferred, to avoid the networking-bandwidth overheads required to transmit, from the message collectors to the message-ingestion-and-processing systems, log/event messages that will be ultimately discarded. Of course, sampler systems may be incorporated both in the message collectors and in the message-ingestion-and-processing systems, with different sampling rates and sampling criteria employed in the sampler systems incorporated in the message-ingestion-and-processing systems than those employed in the sampler systems incorporated in the message collectors.

Figure 21A:
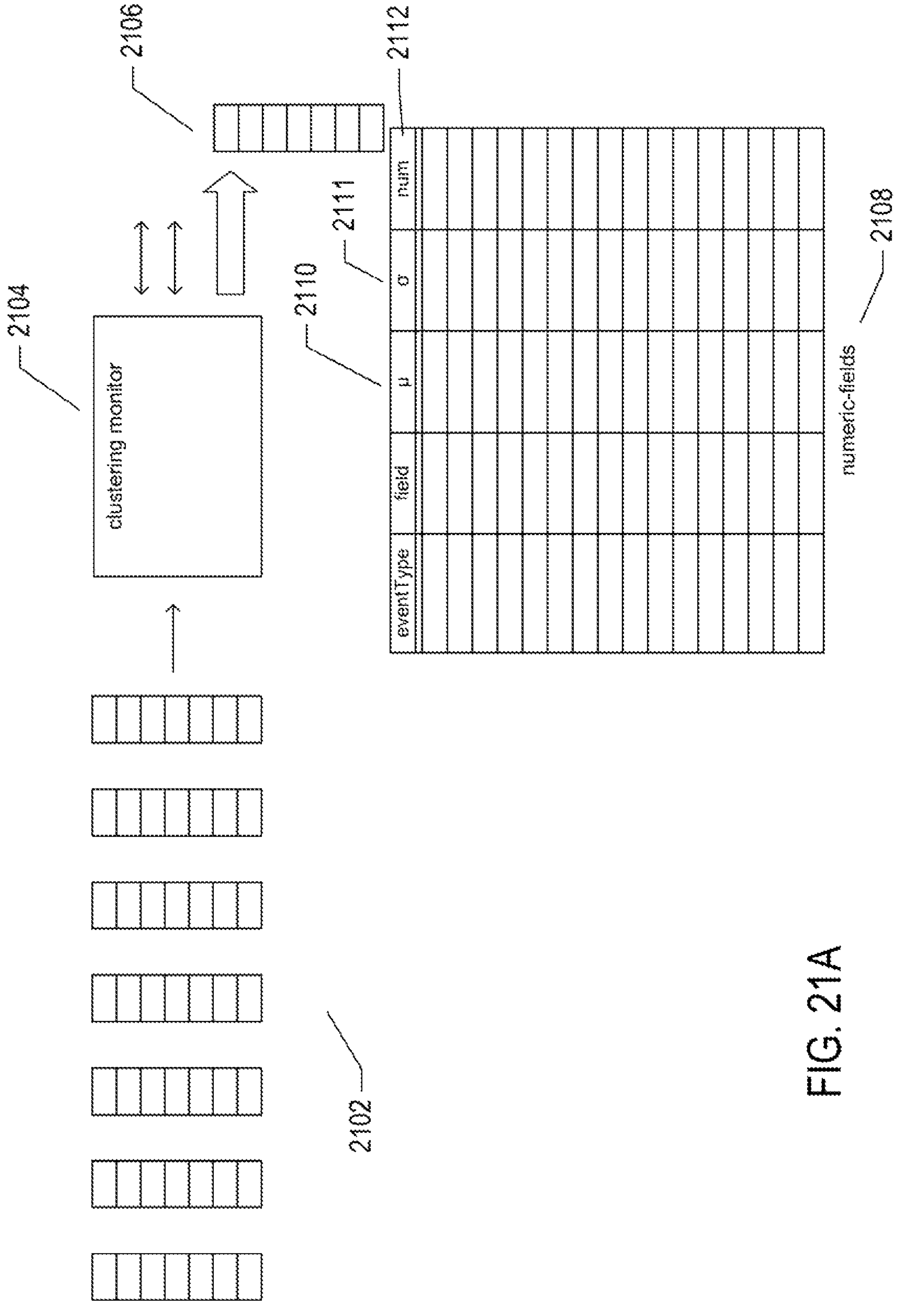
FIGS. 21A-B illustrate a numeric-field-replacement process and method that is used by the clustering-monitor component of the currently disclosed sampler system to lower the variability of event-tuple-form log/event messages in order to facilitate robust clustering for sampling purposes.
Figure 21B:
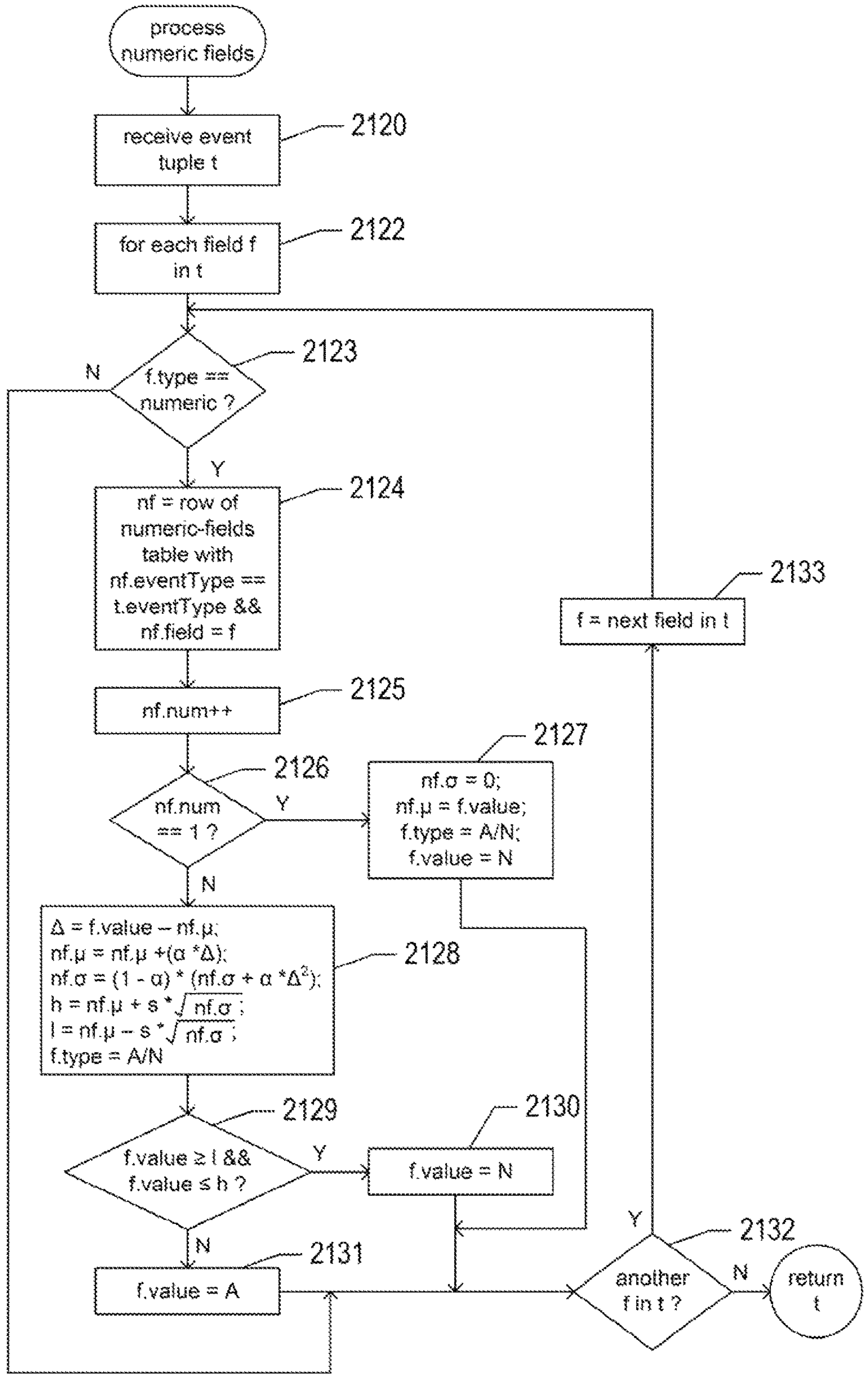

FIGS. 21A-B illustrate a numeric-field-replacement process and method that is used by the clustering-monitor component of the currently disclosed sampler system to lower the variability of event-tuple-form log/event messages in order to facilitate robust clustering for sampling purposes. As shown in FIG. 21A, the stream of event-tuple-form log/event messages 2102 are processed by the clustering-monitor component 2104 to generate non-numeric event-tuple-form log/event messages 2106 using numeric-field statistical data 2108. In a non-numeric event-tuple-form log/event message, each numeric field value is replaced by one of the two transformed-numeric-field categories: (1) N, indicating that the numeric value of the original numeric field falls within a normal range of values for the field; and (2) A, indicating that the numeric value falls outside of the normal range of values for the field and is therefore abnormal. In the representations shown in FIG. 21A, the statistical data is maintained in tabular form in table numeric_fields 2108. The clustering-monitor component maintains, for each type of field in each different type of event/log message, a running mean 2110, a running variance 2111, and number of observations 2112. Thus, each row in the table numeric_fields contains statistics for a different vent-type/field-type pair.

FIG. 21B provides a control-flow diagram for a routine "process numeric fields." In step 2120, the routine "process numeric fields" receives a log/event message in event-tuple form, event tuple t. In the for-loop of steps 2122-2133, each field f in event tuple t is considered. Note that the event type is not considered as a field by the routine "process numeric fields." If the type of field is non-numeric, as determined in step 2123, control flows to step 2132, where the routine "process numeric fields" determines whether there are any additional fields f in event tuple t to consider. Otherwise, in step 2124, the routine "process numeric fields" selects the row nf of the numeric-fields table that contains statistics for the currently considered numeric field f. In step 2125, the number-of-observations field in row nf is incremented. When, following step 2125, the number-of-observations field in row nf has the value 1, as determined in step 2126, then, in step 2127, row nf is initialized by setting the running-variance field in row nf to 0 and the running-average field to the value of field f. In addition, the field type is set to "A/N" and the value for field f is set to N, or normal, after which control flows to step 2132. When the number-of-observations field in row of has a value greater than 1, as determined in step 2126, the routine "process numeric fields" updates the running average nf.μ and the running variance nf.σ in row nf, sets the type of field f in event tuple t to "A/N," and determines a range of numeric values [h,l] corresponding to normal values for the field based on the current average and variance. When the value of the currently considered field f of event tuple t falls within this range, as determined in step 2129, the value of field f of event tuple t is set to N, in step 2130, and, otherwise, the value of field f of event tuple t is set to A, in step 2131. Control then flows to step 2132. When there is another field f in event tuple t to consider, f is set to that field in step 2133 before control flows back to step 2123. Otherwise, the routine "process numeric fields" terminates, returning updated non-numeric event-tuple-form log/event message t.

Figure 22A:
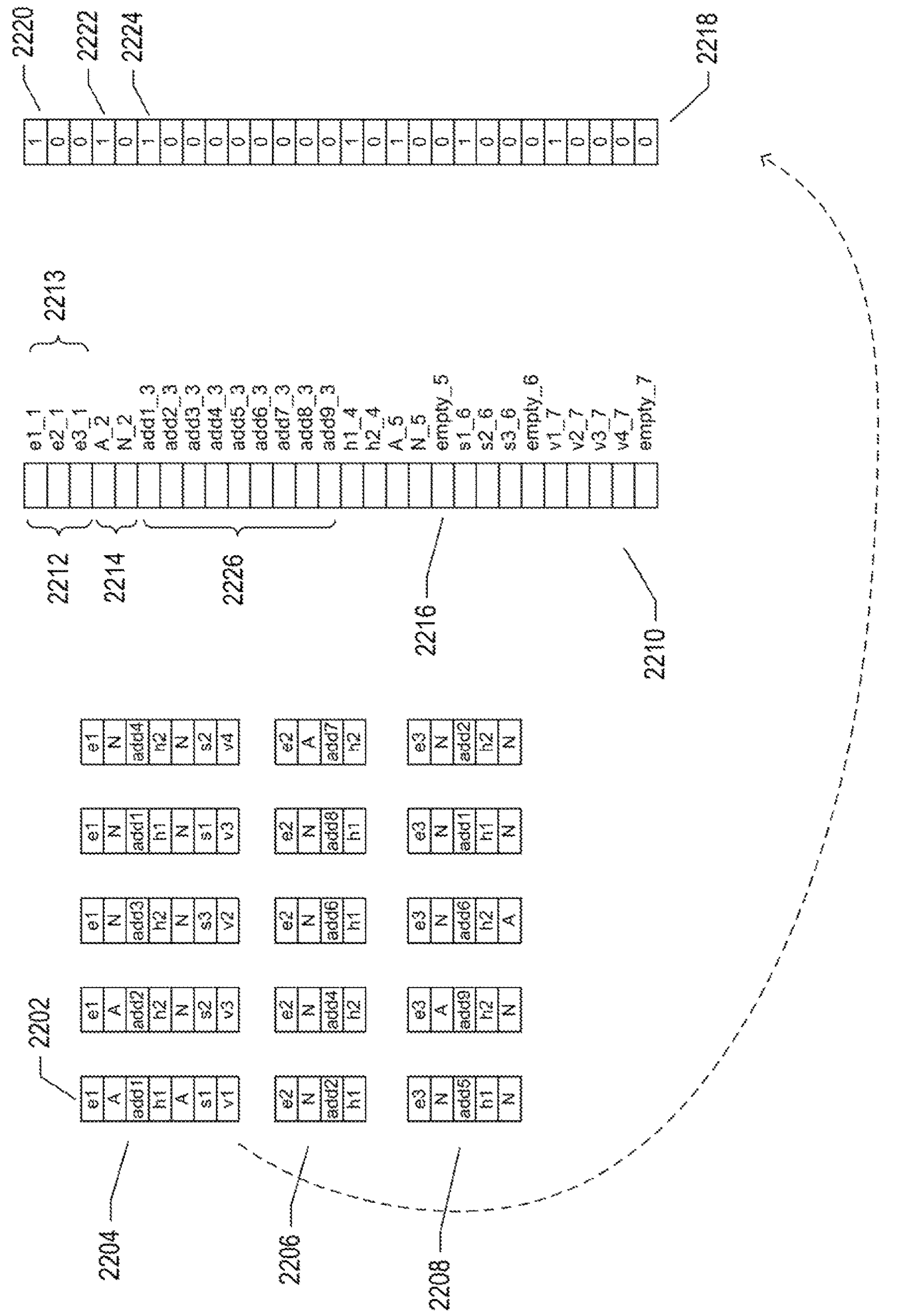
FIGS. 22A-B illustrate conversion of a non-numeric event-tuple-form log/event message into a feature vector.
Figure 22B:
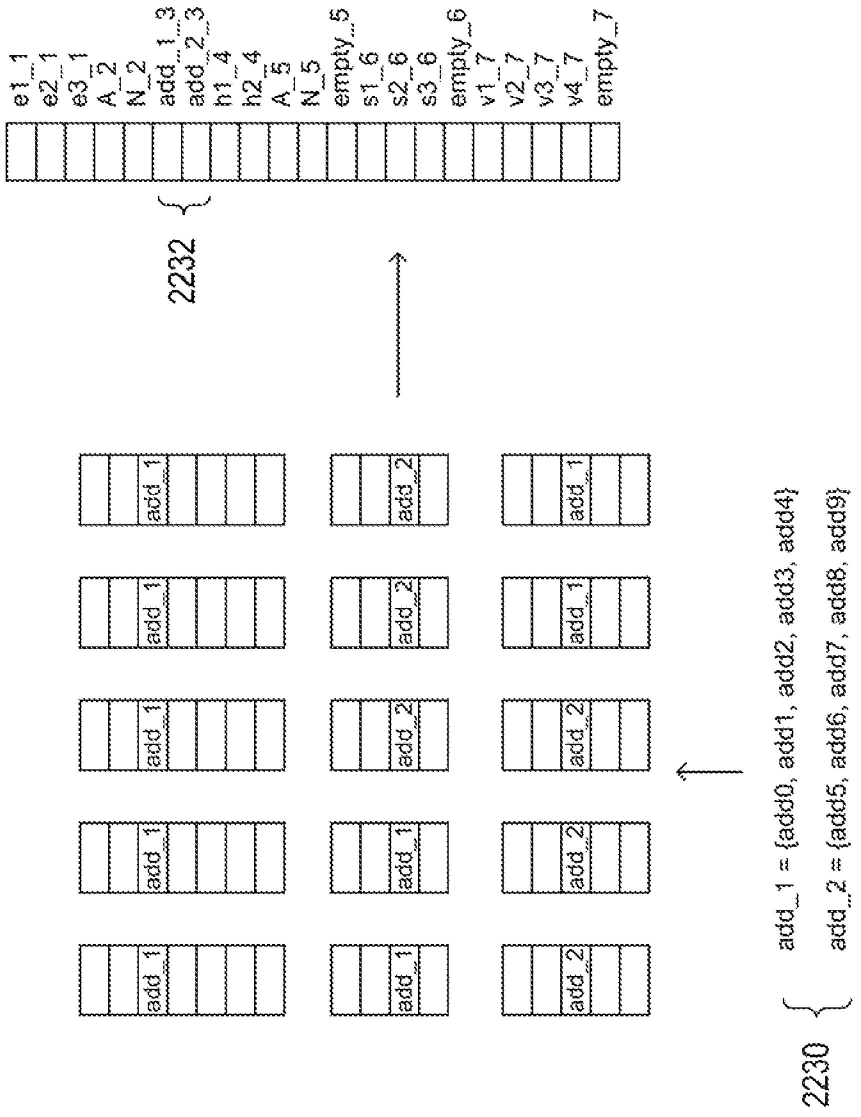

FIGS. 22A-B illustrate conversion of a non-numeric event-tuple-form log/event message into a feature vector. The left-hand portion of FIG. 22 a shows a set of 15 non-numeric event-tuple-form log/event messages, referred to below as "event tuples," including event tuple 2202. The event tuples in a first row 2204 of the set of event tuples all have event type e1. The event tuples in a second row 2206 of the set of event tuples all have event type e2 and the event tuples in a third row 2208 of the event tuples all have event type e3. A feature-vector template 2210 for the set of event tuples includes a cell or slot for each different unique field value in the set of event tuples. For example, the first field in all of the event tuples contains the event type, and, therefore, there are three different event types e1, e2, and e3. The first three cells 2212 in the feature-vector template correspond to the three different possible values for the first field of all of the event tuples, as indicated by the names of the fields 2213 shown to the right of the fields. The second field of all of the event tuples is of type "A/N," and therefore the next two cells 2214 of the feature-vector template correspond to the two possible values of this field, A and N. In this particular encoding, the fields common to all of the tuples are represented first, the feature-vector template, followed by fields common to subsets of event-tuple types, and then fields particular to a single event-tuple type. The fields common to subsets of event-tuple types and fields particular to a single event-tuple type include a cell corresponding to a padding value, such as padding value "empty_5." There are other approaches to transforming a set of event tuples into feature-vectors, including methods that include a cell in the feature-vector template for every possible event-type/field/field-value triple. Different approaches can be used depending on the amount of information about event tuples available prior to feature-vector generation.

Each event tuple in the set of event tuples can be represented by a feature vector in which each element has either the value "0," to indicate that the field/field-value pair corresponding to that element is not present in the event tuple, or the value "1," to indicate that the field/field-value pair corresponding that element is present in the event tuple. For example, the first event tuple 2202 in the set of event tuples is represented by feature vector 2219. The value "1" in the first element 2220 of the feature vector 2218 indicates that the first-field/field-value pair represented by the first cell in the feature-vector template is present in event tuple 2202. The value "1" in the fourth element 2222 of the feature vector 2218 indicates that the field/field-value pair represented by the fourth cell in the feature-vector template is present in event tuple 2202. The value "1" in the sixth element of the feature vector 2224 indicates that the field/field-value pair represented by the sixth cell in the feature-vector template is present in event tuple 2202. Because a feature vector contains only values "0" and "1," it is computationally efficient to compute the results of various vector operations carried out on pairs of features, such as the dot product.

The fact that there is an element in a feature vector for every field/field-value pair that occurs in the set of event tuples represented by a set of corresponding feature vectors may be viewed as potentially computationally inefficient, particularly in the case that a particular event-tuple field can have many different values. However, this problem is easily addressed, as shown in FIG. 22B. The same set of event-tuples shown in FIG. 22A is again shown in FIG. 22B. However, the 10 different fields values add0, add1, add2, add3, add4, add5, add6, add7, add8, and add9 that occur in third fields of the event tuples are partitioned into two groups {add0, add1, add2, add3, add4} and {add5, add6, add7, add8, add9}, with the first group assigned the group value add_1 and the second group assigned the group value add_2 (2230 in FIG. 22B). Now, rather than having 10 different cells of the feature-vector template devoted to possible values of the third field (2226 in FIG. 22A), only two cells 2232 are needed in feature vector 2234. Therefore, a field that has many different possible values can easily be efficiently represented by partitioning those values into groups and assigning cells in the feature-vector template to the group identifiers, rather than to the individual field values.

To prevent improperly classifying, as numeric-valued fields, fields that appear to have numeric values, but that instead represent category values, the values of such numeric-valued-appearing fields are transformed to contain string values representing category values prior to carrying out numeric-field processing, as discussed above with reference to FIGS. 21A-B. As one example, many log/event-messages include fields that contain status values, such as "400," "401," "402," etc. In these cases, the numeric-appearing values are logically character strings, rather than numbers, since they do not imply ordering or numerical magnitudes, but instead are simply identifiers for different categorical status values. In this case, the numeric-appearing field values are replaced by character strings, such as "Status_400," "Status_401," "Status_402," etc. Thus, there are a variety of different transformations that are carried out on event-tuple-form log/event messages, including replacing fields with constant-valued string, deleting fields altogether, transforming numeric-appearing values to string values, condensing large sets of values for a particular field into a smaller number of groups with associated group-identifier values, and replacing numeric fields with one of the two value A and N. Once these transformations have been carried out, the transformed event-tuple-form log/event messages are then finally transformed into feature vectors with elements having either the value "0" or "1."

Figure 23:
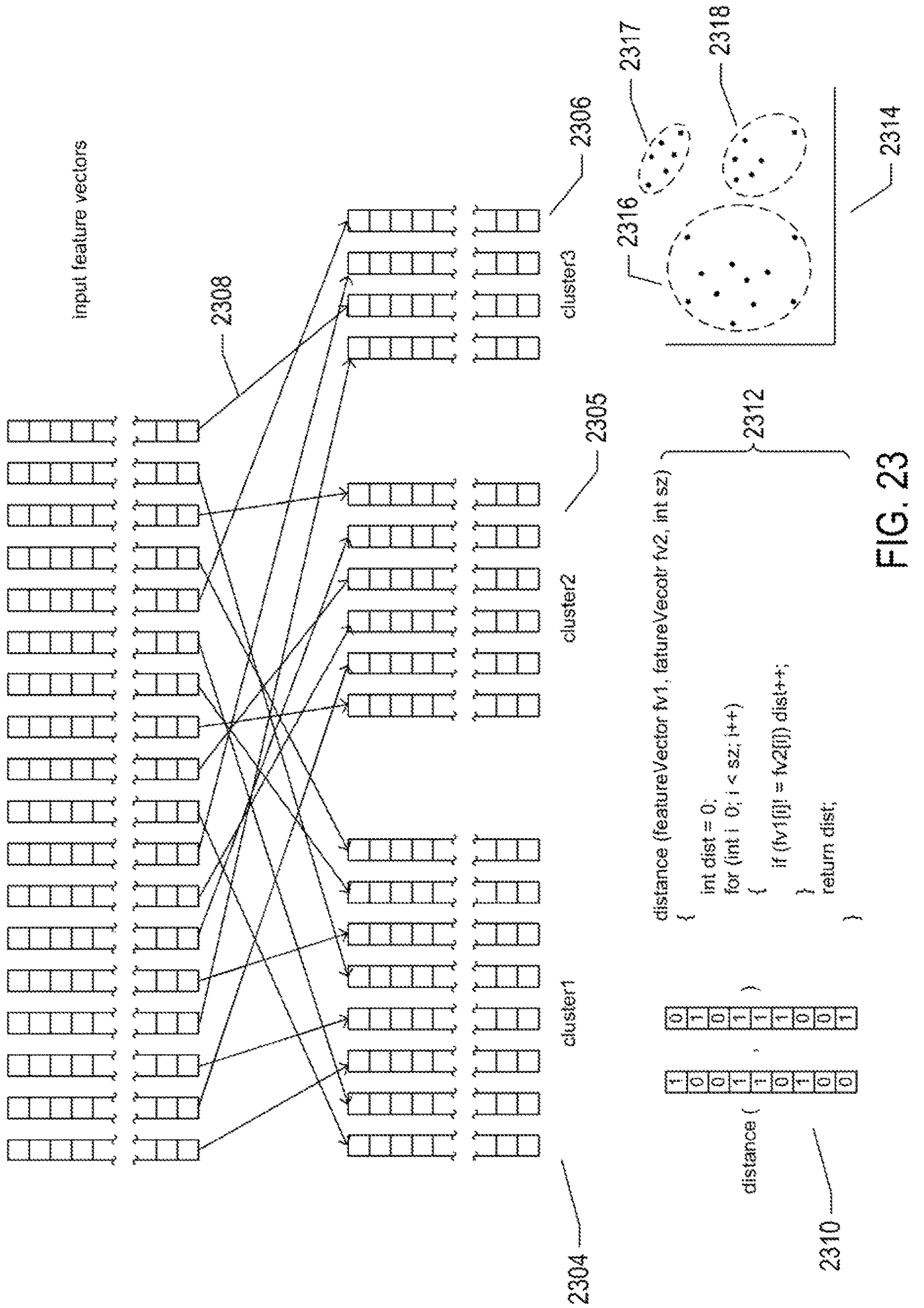
FIG. 23 illustrates feature-vector clustering.

FIG. 23 illustrates feature-vector clustering. A set of feature vectors 2302 corresponding to input log/event messages is clustered into three different clusters 2304-2306. Each input feature vector is assigned to a particular cluster, as indicated by arrows, such as arrow 2308, pointing from an input feature vector to the same feature vector that is a member of a particular cluster. There are many different types of clustering and many types of metrics that can be used carry out clustering so that the clusters represent related feature vectors. One method for clustering feature vectors uses a variation of k-means clustering in which a distance metric is used to compare pairs of feature vectors, as illustrated by expression 2310, which represents a distance function that takes two feature vectors as arguments. In this case, the distance function returns an integer value, computed by the small C-like routine 2312 shown in the lower portion of FIG. 23. The computed distance metric is the Hamming distance between the two feature vectors. When the feature vectors are contained in computer-memory words with lengths equal to the fundamental length of a machine-instruction operand, the Hamming distance can be quickly computed using an XOR operation and a series of bit-rotation and addition operations. The variant k-means clustering process is discussed, below, with reference to FIGS. 25A-D. When the vectors are viewed as points in a space, such as the points plotted in two-dimensional plot 2314 in FIGS. 23, the variant k-means clustering process partitions the points into groups 2316-2318 in which each point in a group is closer to the spatial center of the group then to the spatial centers of any of the other groups to which the point does not belong. In the case of feature vectors, the groups into which a set of feature vectors is partitioned by the variant k-means clustering process represent groups of feature vectors with related values.

Many implementations of k-means clustering assume that all of the vectors that are being clustered have the same dimension. This is, however, not a terribly limiting constraint because feature vectors can be padded with terminal padding values without adversely affecting the clustering process. In this fashion, even though the number of cells needed for feature-vector representations of different types of event tuples may differ, depending on the number of different field/field-value pairs that occur in the different types of event tuples, a sufficiently large dimension can be selected for the feature-vector representations to accommodate an expected variation in the number of different field/field-value pairs needed for feature-vector representations of different types of event-tuple. In the currently described implementation, therefore, the fixed feature-vector dimension is assumed, and is large enough to accommodate any of the types of event tuples that are to be transformed to feature vectors and then clustered by the variant k-means clustering process.

Figure 24A:
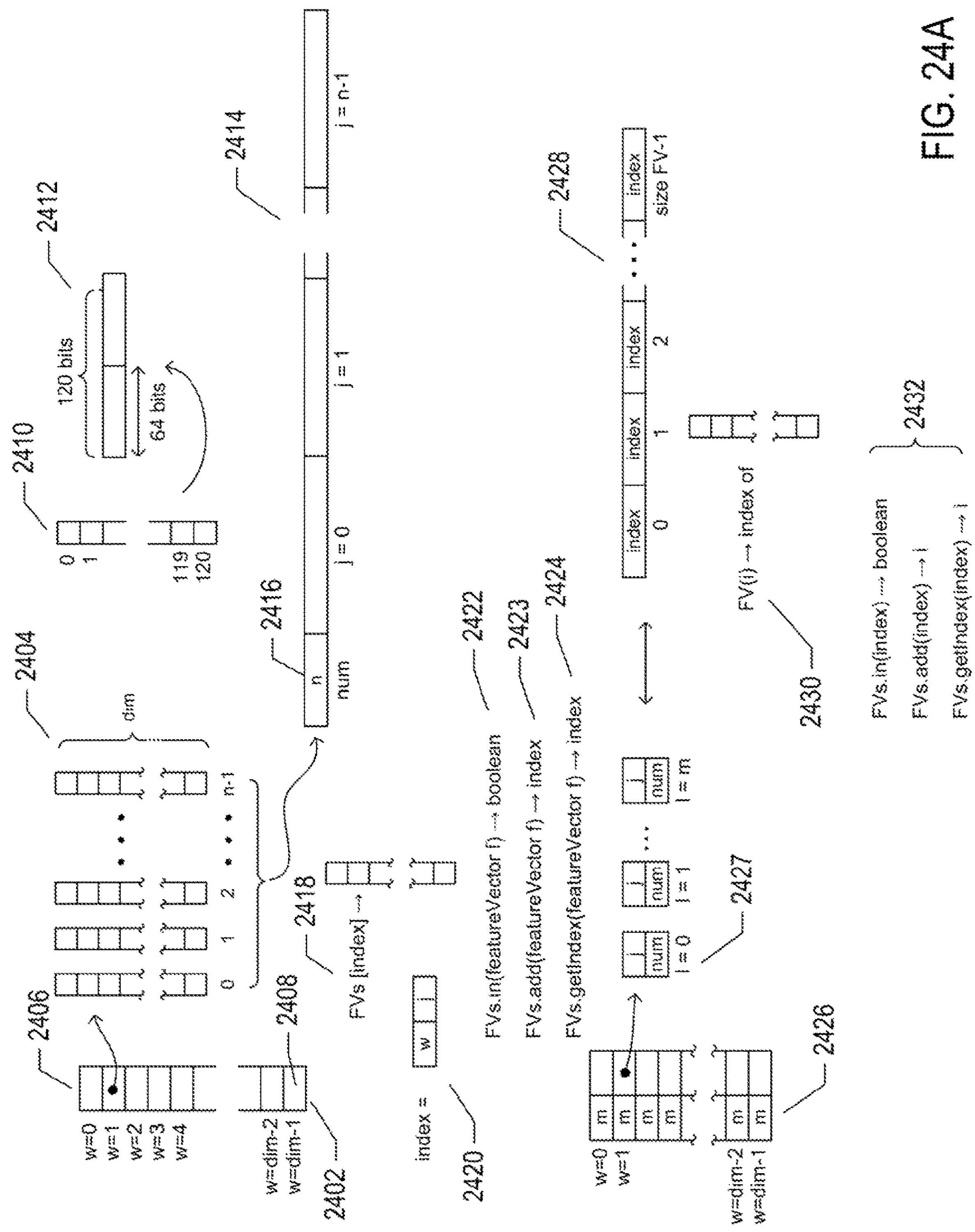
FIGS. 24A-B illustrate various data structures used in one implementation of the currently disclosed sampler system.
Figure 24B:
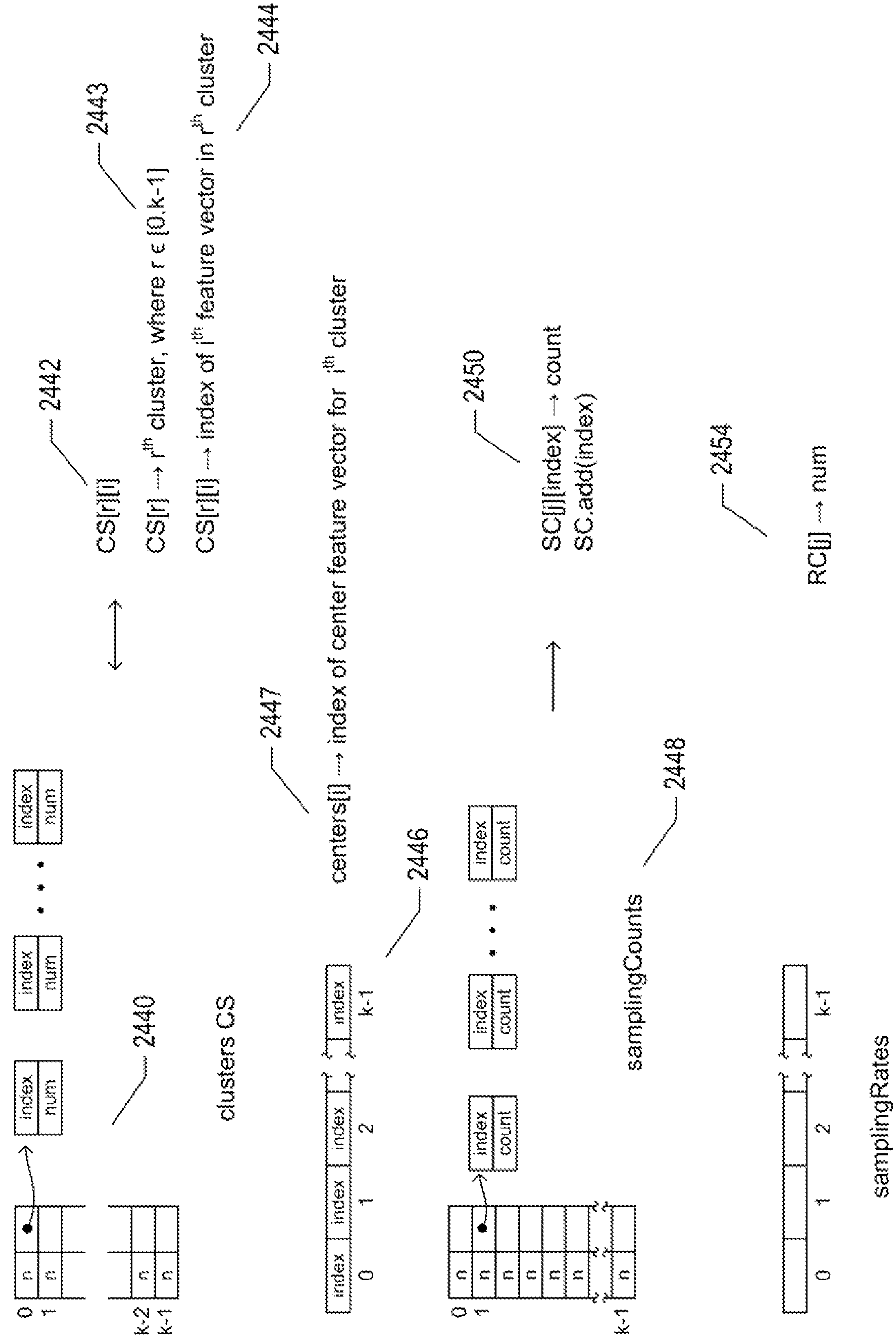

FIGS. 24A-B illustrate various data structures used in one implementation of the currently disclosed sampler system. It should be noted, at the onset, that there are many different alternative possible data structures and groups of data structures that can be used to implement the currently disclosed sampler system, each having different advantages and disadvantages. The first data structure, shown at the top of FIG. 24A and referred to as "FVs" below, is an indexed catalog of all of the different feature vectors observed during a period of sampling-system operation. A first component of this data structure is a vector 2402 of pointers to lists or arrays of feature vectors, such as the list of feature vectors 2404. The vector of pointers 2402 is indexed by feature-vector weight, which is equal to the number of "1" values in a feature vector. There is one feature vector with weight 0 and one feature vector with a maximum weight equal to the number of dimensions of the feature vectors, and thus the first 2406 and final 2408 elements of the vector of pointers can contain Boolean values rather than pointers to lists of feature vectors. As discussed above, all the feature vectors are assumed to have the same dimension, dim. As also mentioned above, a feature vector, such as feature vector 2010, can be stored in a one or more consecutive computer words in memory 2412. In this case, feature vector 2410 has 121 elements and can thus be stored in a consecutive pair of 64-bit words. Thus, the list of feature vectors 2404 pointed to by each entry in the pointer vector 2402 can be implemented as an array 2414 with a first element 2416 storing the number of feature vectors and the remaining elements storing the indicated number of feature vectors in consecutive groups of computer words. The data structure FVs can be programmatically treated as an array of feature vectors 2418, each indexed by a two-part index 2420. The first part of the index, w, is the weight of the feature vector and the second part of the index, j, is the index of the feature vector in the list or array of feature vectors of that weight stored in FVs. An instance of the data structure FVs is associated with numerous functions, including a function “in” 2422, which receives a feature vector as an argument and returns a Boolean value indicating whether or not the feature is present in the FVs data structure, a function “add” 2423, which enters a feature vector, supplied as an argument, to the FVs data structure and returns an index for that feature vector, and a function “getIndex” 2424, which returns the index of a feature vector specified in the argument. The data structure FVs allows feature vectors to be represented by indexes rather than by bit arrays. Of course, feature-vector weights are unlikely to be uniformly distributed, and a more uniform indexing method is possible, but weights are used as indexes, in the current implementation, for simplicity of explanation and illustration. In alternative implementations, multiple indexes may be used to facilitate rapid access to feature vectors stores in the catalog of feature vectors FVs.

A next type of data structure used in the described implementation of the currently disclosed sampler system is referred to as “FV,” and is shown in the lower portion of FIG. 24A. The data structure FV is used to store a set of feature vectors. It is implemented using an array of two-part data structures 2426. The first part of the two-part data structures indicates the number of entries in a list of feature vectors and the second part of the two-part data structures contains a pointer to a list of feature vectors. The array of two-part data structures 2426 is indexed by feature-vector weight, just as the FVs data structure is indexed. Each element of each list of feature vectors, such as element 2427, includes the second portion of the index, j, of the feature vector in the FVs data structure and an indication of the number of this particular feature vector in the set of feature vectors represented by the instance of the FV data structure. An instance of the FV data structure can be programmatically treated as an array 2428 of indexes that is indexed by integers 2430 corresponding to the ordinal numbers of the feature vectors in the ordered set of feature vectors represented by the instance of the FV data structure. An instance of the FV data structure is also associated with functions 2432 similar to the functions associated with the FVs data structure.

Turning to FIG. 24B, the data structures used in the currently described implementation of the currently disclosed sampler system further includes a clusters data structure, CS, 2440 which represents a cluster of feature vectors. This data structure is similar to the FV data structure, described above. However, the clusters data structure is programmatically treated as a two-dimensional array 2442, with the first dimension corresponding to a cluster index 2443 in the range [0, k-1] and the second dimension corresponding to the ordinal position of the feature vector in the cluster 2444. A simple array of indexes 2446 implements the centers data structure 2447, instances of which store the central feature vector for each cluster. A samplingCounts data structure 2448 stores the counts of each feature vector in each cluster observed during a period of time by the sampler system. This data structure is programmatically treated as a two-dimensional array 2450 of counts that is indexed by a cluster number and a feature-vector index of a feature in the cluster indicated by the cluster-number index. Finally, the samplingRates data structure 2452 is an array of integers representing sampling rates for each cluster. A sampling rate is indicated by a number log/event messages corresponding to a particular feature vector that need to be received in order for a single sample of that log/event message type to be output by the sampler system. This data structure is programmatically treated as an array of integers indexed by cluster number 2454.

FIGS. 25A-D provide control-flow diagrams for a routine “k-means clustering,” which carries out the variant k-means clustering process introduced above with reference to FIG. 23. In step 2502, the routine “k-means clustering” receives a set of feature vectors F, an indication of the number s of feature vectors in the set, an indication of the dimension of the feature vectors d, and the constant k, which is the number of clusters that the set of feature vectors is to be partitioned into. In other types of clustering methods, the method itself determines the number of clusters into which the input set members are to be partitioned. These types of methods may also alternatively be used to implement the currently disclosed sampler system. However, for simplicity and clarity of exposition, the variant k-means clustering approach provides a basis for an effective and robust implementation of the currently disclosed sampler system. In step 2503, two clusters data structures cs1 and cs2 and a centers data structure c are allocated. In addition, local pointer variables currentCS and nextCS are initialized to point to clusters cs1 and cs2, respectively. The local variable bestD is set to a large number, the local variable bestEx is initialized to 0, and the local variable numIter is initialized to a constant value representing the number of different clustering iterations that are to be carried out in order to find a hopefully near-optimal clustering of the feature-vector members of the set F. There is no guarantee that an optimal clustering is found by this method, but, in general, it can be hoped that at least a local optimal clustering is produced. Each iteration of the while-loop of steps 2504-2517 produces a next clustering of the feature vectors in the set F. In step 2505, a local set variable iFV is set to contain the indexes of the feature vectors in the set F. In the for-loop of steps 2506-2509, a central feature vector is randomly selected from the indexes contained in local variable iFV for each of k clusters and stored in the array c of cluster centers. In step 2507, a next central feature vector is selected and, in step 2508, the selected feature vector is added to the centers array c and removed from the contents of the local set variable iFV. In step 2510, a routine “cluster” is called to cluster the feature vectors in the set F with respect to the randomly selected feature-vector centers of the k clusters. The routine “cluster” iteratively assigns each feature vector in the set F to the cluster with central feature-vector closest, in distance, to the feature vector and then shifts the cluster centers as close as possible to the centroid of the clusters obtained, as described below. The routine “cluster” returns a sum D of the distances between the feature vectors and the central feature vectors of the clusters to which they are assigned and a sum exD of the distances of each feature vector to the central feature vector of the closeness external cluster to which the feature vector does not belong. When D is less than bestD, as determined in step 2511, control flows to step 2515, described below. Otherwise, control flows to step 2512, in which a local variable diff1 set to the difference between bestD and D. In step 2513, local variable diff2 is set to the difference between bestEx and exD. In step 2514, the routine “k-means clustering” determines whether the contents of diff1 is less than a first threshold value and the contents of diff2 is greater than a second threshold value. This test indicates that, although the sum of the distances between the feature vectors and their cluster centers for the most recently carried out clustering is not less than that for the best clustering so far observed, the sum of the distances of the feature vectors from the nearest central feature-vector of an external cluster is greater than for the best clustering so far observed, in which case the most recently carried out clustering is viewed as more optimal. In other words, there are two main goals: (1) finding a clustering in which the sum of the distances of the feature vectors to their cluster centers is minimized; and (2) finding a clustering in which the sum of the distances the feature vectors to the cluster centers of the closest external clusters is maximized. When either the most recently carried out clustering satisfies the first goal or satisfies a combination of the first and second goals, control flows to step 2515, where the local variables bestD and bestEx are updated to the values returned by the routine "cluster," in step 2510, and the pointers currentCS and nextCS are switched, so that the pointer currentCS points to the most recent clustering. In step 2516, the local variable numIter is decremented. When the value contained in numIter is greater than 0, as determined in step 2517, control flows back to step 2505 for a next iteration of the while-loop of steps 2504-2517. Otherwise, one of the allocated clusters data structures is deallocated, in step 2518, and the other allocated clusters data structure along with the allocated centers data structure are returned as a result of k-means clustering.

Figure 25A:
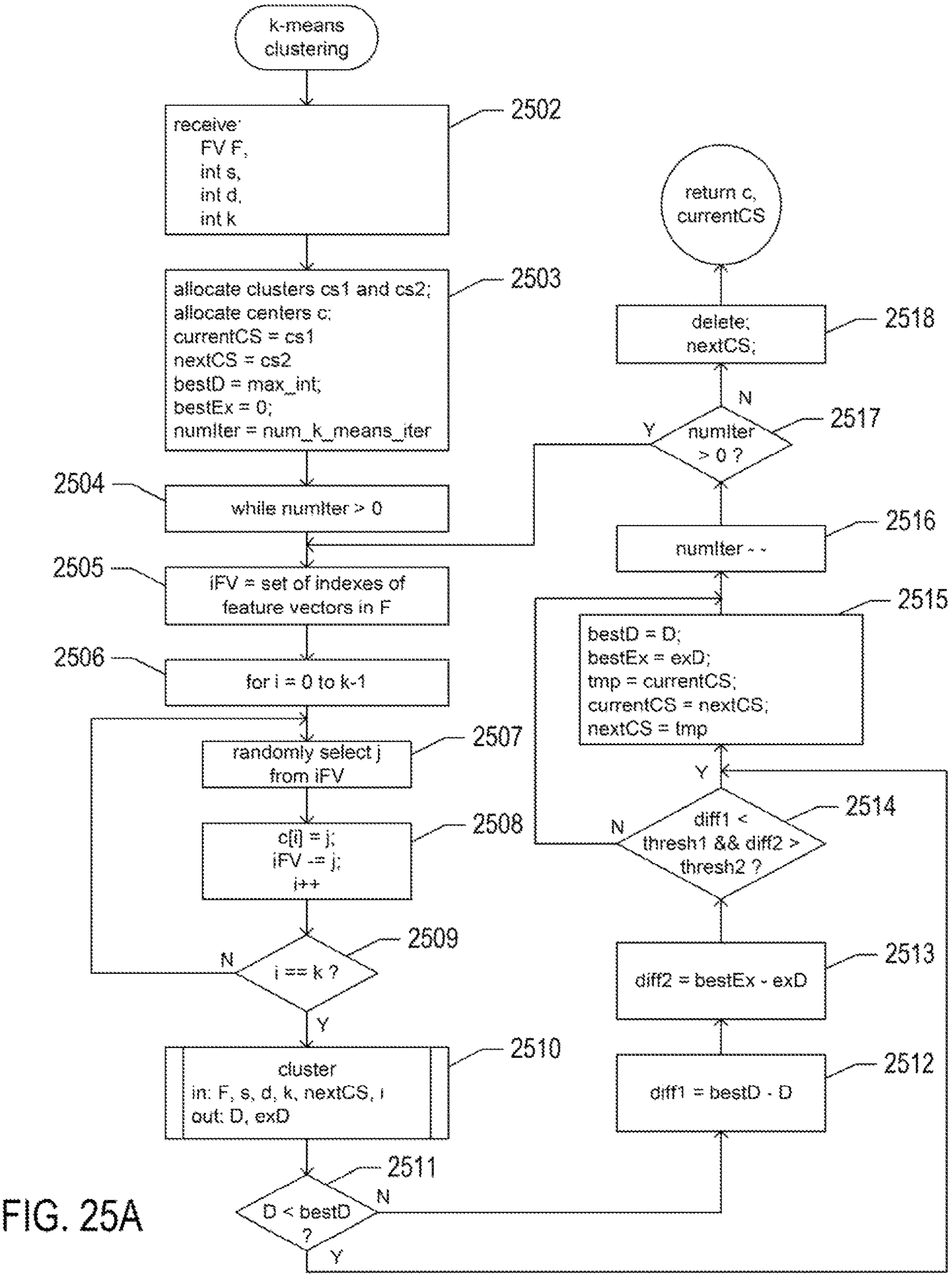
FIGS. 25A-D provide control-flow diagrams for a routine "k-means clustering," which carries out the variant k-means clustering process introduced above with reference to FIG. 23.
Figure 25B:
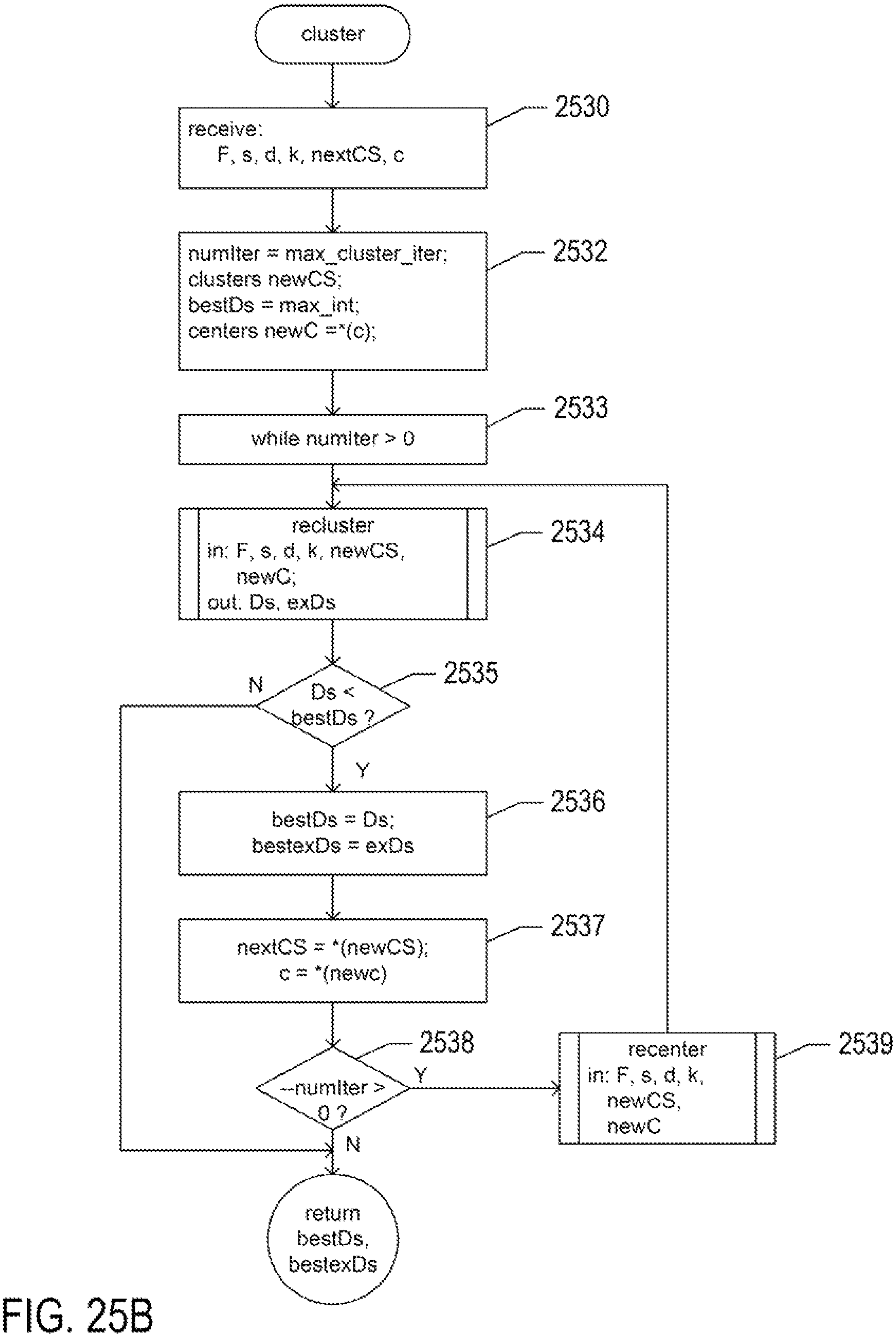

FIG. 25B provides a control-flow diagram for the routine "cluster," called in step 2510 of FIG. 25A. In step 2530, the routine "cluster" receives a set of feature vectors F, an indication of the number s of feature vectors in the set, an indication of the dimension of the feature vectors d, the constant k, which is the number of clusters that the set of feature vectors should be partitioned into, a pointer nextCS to a clusters data structure, and a pointer c to a centers data structure. In step 2532, local variable numIter is initialized to the maximum number of iterations to be carried out during clustering, a local clusters data structure newCS is declared, the local variable bestDs is initialized to a large number, and a local centers data structure newC is initialized to contain the same feature-vector centers as contained in the centers data structure reference by the received pointer c. Note that a shorthand notation for this final operation is used. Then, in the while-loop of steps 2533-2539, the routine "cluster" iteratively reclusters the feature vectors in the set of feature vectors F and recomputes central feature vectors for the clusters produced by reclustering. The while-loop of steps 2533-2539 terminates either when a next reclustering produces a larger sum of distances between the feature vectors and the centers of their respective clusters or when the number of iterations numIter has been carried out. In step 2534, the routine "recluster" is called to cluster the feature vectors in the set of feature vectors F according to the central feature vectors for k clusters stored in local centers data structure newC. When the sum of the distances from feature vectors to the central feature vectors of their respective clusters in the new clustering is less than the contents of local variable bestDs, as determined in step 2535, local variables bestDs and bestexDs are updated, in step 2536, to reflect the results of the reclustering as being the best results so far observed. Then, in step 2537, the reclustering is stored in the clusters data structure pointed to by nextCS and the central feature vectors are stored in the centers data structure pointed to by c. In step 2538, local variable numIter is decremented and, when the contents of numIter are greater than 0, a routine "recenter" is called, in step 39, to compute new central feature vectors for the clusters produced by reclustering in step 2534. When the sum of the distances from feature vectors to the central feature vectors of their respective clusters in the new clustering is greater than or equal to the contents of local variable bestDs, as determined in step 2535, or when the contents of local variable numIter is 0 following the decrement operation, as determined in step 2538, the while-loop of steps 2533-2539 terminates and the routine "cluster" returns the contents of local variables bestDs and bestexDs. Note that the best clustering and the central feature vectors for the best clustering or implicitly returned since the data structures pointed to by the received pointers nextCS and c are updated by the routine "cluster" in step 2537.

Figure 25C:
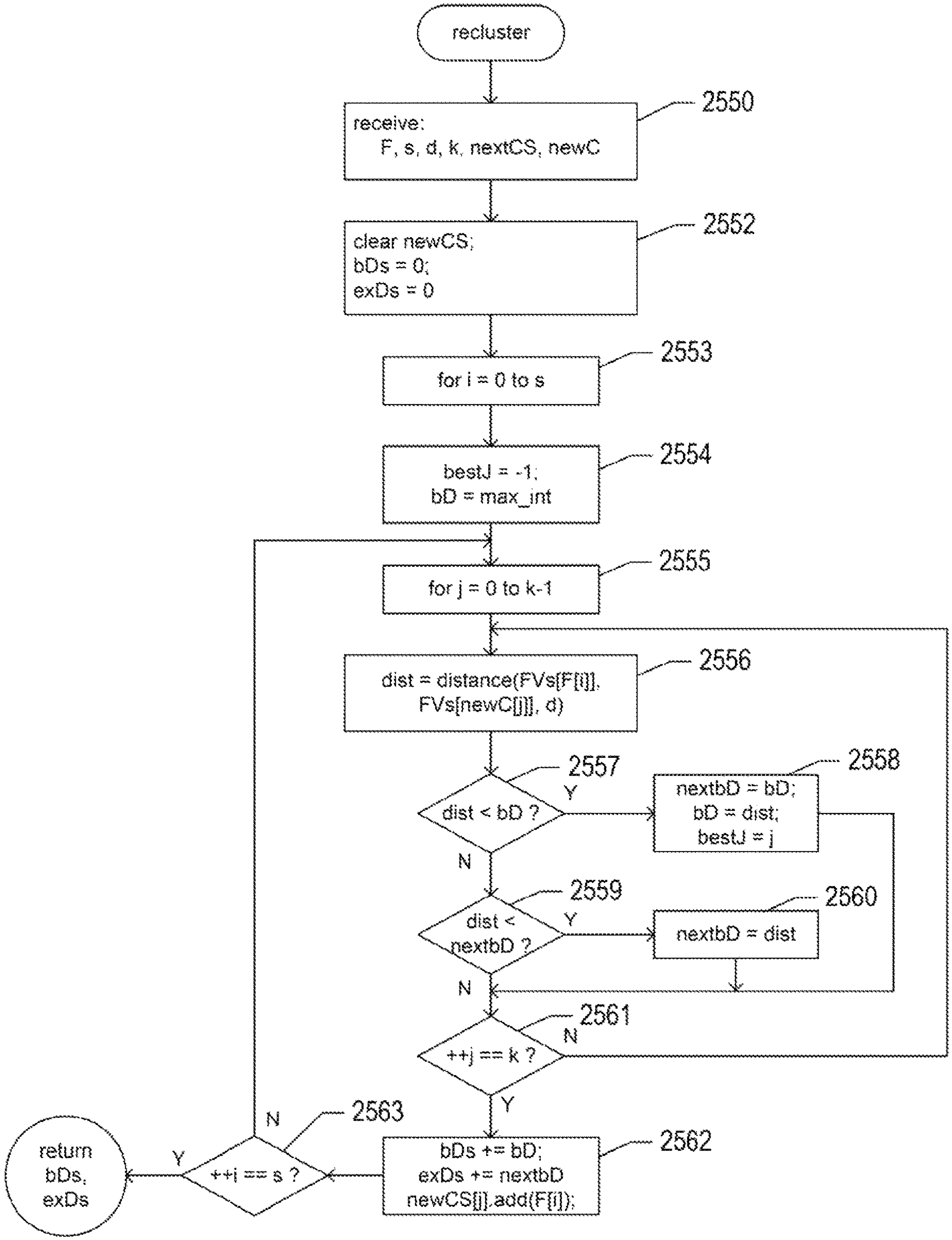

FIG. 25C provides a control-flow diagram for the routine "recluster," called in step 2534 of FIG. 25B. In step 2550, the routine "recluster" receives a set of feature vectors F, an indication of the number s of feature vectors in the set, an indication of the dimension of the feature vectors d, the constant k, which is the number of clusters that the set of feature vectors should be partitioned into, a pointer newCS to a clusters data structure, and a pointer newC to a centers data structure. In step 2552, the routine "recluster" clears the contents of the clusters data structure reference by newCS, sets local variable bDs to 0, and sets local variable exDs to 0. In the outer for-loop of steps 2553-2563, all of the feature vectors in the set F are considered. In step 2554, local variable bestJ is set to −1 and local variable bD is set to a large number. In the inner for-loop of steps 2555-2561, each of the k clusters with feature-vector centers stored in the centers data structure pointed to by newC is considered. In step 2556, the distance between the currently considered feature vector of the set F and the central feature vector of the currently considered cluster j is determined. When this distance is less than the value stored in bD, as determined in step 2557, the local variable nexbD is set to the contents of bD, bD is set to contain the distance computed in step 2556, and local variable bestJ is set to the index j of the currently considered cluster in order to record the fact that the currently considered cluster has a central feature vector closest to the currently considered feature vector from the set F so far observed in the for-loop of steps 2555-2561. Otherwise, in step 2559, the local routine "recluster" determines whether or not the distance computed in step 2556 is less than the contents of local variable nexbD and, if so, sets local variable nexbD to that distance in step 2560. Local variable nexbD thus stores the minimum distance between the currently considered feature vector and the central feature vector of the closest external cluster. In step 2561, the cluster index j is updated and then compared to the constant k. When the updated index is equal to the constant k, the inner for-loop of steps 2555-2561 terminates. Otherwise, control flows back to step 2556 for a next iteration of the inner for-loop of steps 2555-2561. Following completion of the inner for-loop, local variable bDs is incremented by the contents of local variable bD, local variable exDs is incremented by the contents of local variable nexbD, and the currently considered feature vector is added to cluster j. The variable i is incremented, in step 2563, and compared to the contents of received value s. When the contents of variable i is equal to the contents of s, the outer for-loop of steps 2553-2563 terminates and the routine "recluster" returns the sum of the distances between the feature vectors and the central feature vectors of their respective clusters, bDs, and the sum of the distances between the feature vectors and the central feature vectors of the closest external clusters to them, exDs.

Figure 25D:
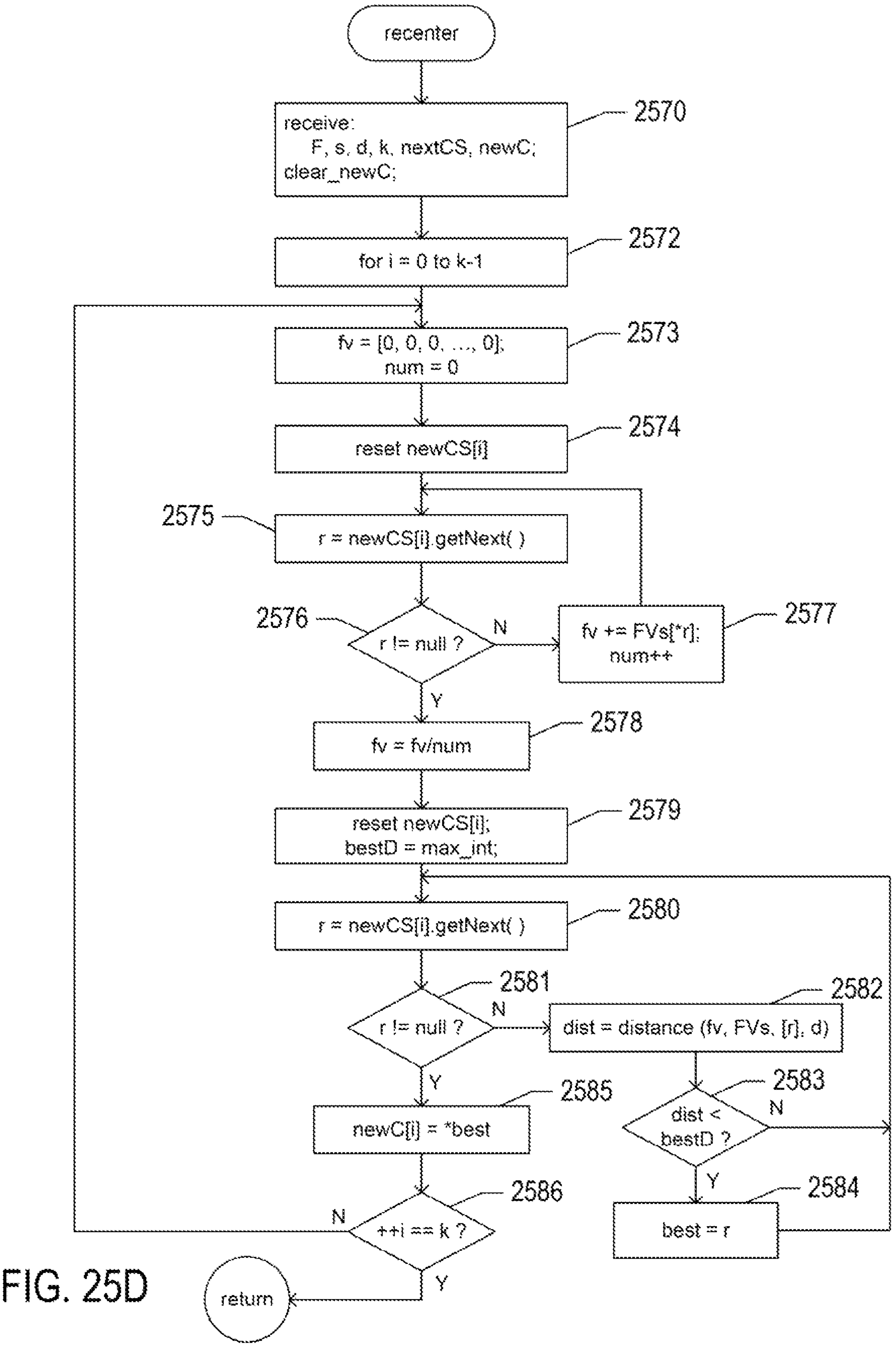

FIG. 25D provides a control-flow diagram for the routine "recenter," called in step 2539 of FIG. 25B. In step 2570, the routine "recluster" receives a set of feature vectors F, an indication of the number s of feature vectors in the set, an indication of the dimension of the feature vectors d, the constant k, which is the number of clusters that the set of feature vectors should be partitioned into, a pointer newCS to a clusters data structure, and a pointer newC to a centers data structure. Additionally, the routine "recluster" clears the contents of the centers data structure pointed to by newC. In the for-loop of steps 2572-2586, the routine "recluster" considers each cluster. In step 2573, a feature vector fv is set to the all-0 feature vector and local variable num is set to 0. In step 2574, the $i^{th}$ cluster in the clusters data structure pointed to by newCS is reset for successive access to the feature-vector indexes in the $i^{th}$ cluster. In step 2575, a pointer to the next feature-vector index is retrieved from the $i^{th}$ cluster. When the pointer is non-null, as determined in step 2576, the retrieved feature vector is added to feature vector fv and local variable num is incremented, in step 2577. When the pointer returned in the access of steps 2575 is null, indicating that all feature vectors in the $i^{th}$ cluster have been added to feature vector fv, the elements of feature vector fv are divided by the contents of local variable num to determine the center of the $i^{th}$ cluster. In step 2579, the $i^{th}$ cluster in the clusters data structure pointed to by newCS is again reset for successive access to the feature-vector indexes in the $i^{th}$ cluster and the local variable bestD is set to a large number. In step 2580, a pointer to the next feature-vector index is retrieved from the $i^{th}$ cluster. When the pointer is non-null, as determined in step 2581, the distance between the retrieved feature vector and feature vector fv representing the center of the $i^{th}$ cluster is computed, in step 2582 and, when this distance is less than the contents of local variable bestD, as determined in step 2583, local variable best is set to point to the index of the currently considered feature-vector index pointed to by pointer r. When the pointer returned in the access of step 2580 is null, indicating that all feature vectors in the $i^{th}$ cluster have been considered, the new feature-vector center for the $i^{th}$ cluster is set to the feature-vector index pointed to by the contents of local variable best, in step 2585. In step 2586, loop variable i is incremented and then compared to constant k. When loop variable i is equal to constant k, all of the clusters have been considered, the for-loop of steps 2572-2586 terminates, and the routine "recenter" returns.

FIG. 26 shows a number of constants and variables used in the control-flow diagrams that follow. The integers dim 2602 and k 2604 are the dimension of the feature vectors and the number of clusters into which feature vectors are clustered in order to compute sampling rates. The indexed repository of feature vectors FVS 2606 is an instance of the data structure discussed with reference to FIG. 24A, which stores feature vectors encountered during operation of the sampler system so that the different feature vectors can be referenced by feature-vector indexes. Feature-vector-set data structures f1 and f2 2608-2609 store sets of feature vectors. These data structures are also discussed with reference to FIG. 24A. The pointer curF is initially set to reference feature-vector set f1 2610 and pointer nxtF is initially set to reference feature-vector set f2 2612. Two pointers to clusters data structures curCS and nxtCS and two pointers to centers data structures curC and nxtC are declared 2614. The clusters data structure and centers data structure are both discussed above with reference to FIG. 24B. Two samplingCounts data structures sc1 and sc2 and two samplingRates data structures sr1 and sr2 are declared 2616. The samplingCounts and samplingRates data structures are both discussed above with reference to FIG. 24B. Two pointers curSC and nxtSC are initialized to point to the samplingCounts data structures sc1 and sc2 and two pointers curSR and nxtSR are initialized to point to the two samplingRates data structures sr1 and sr2.

Figure 27A:
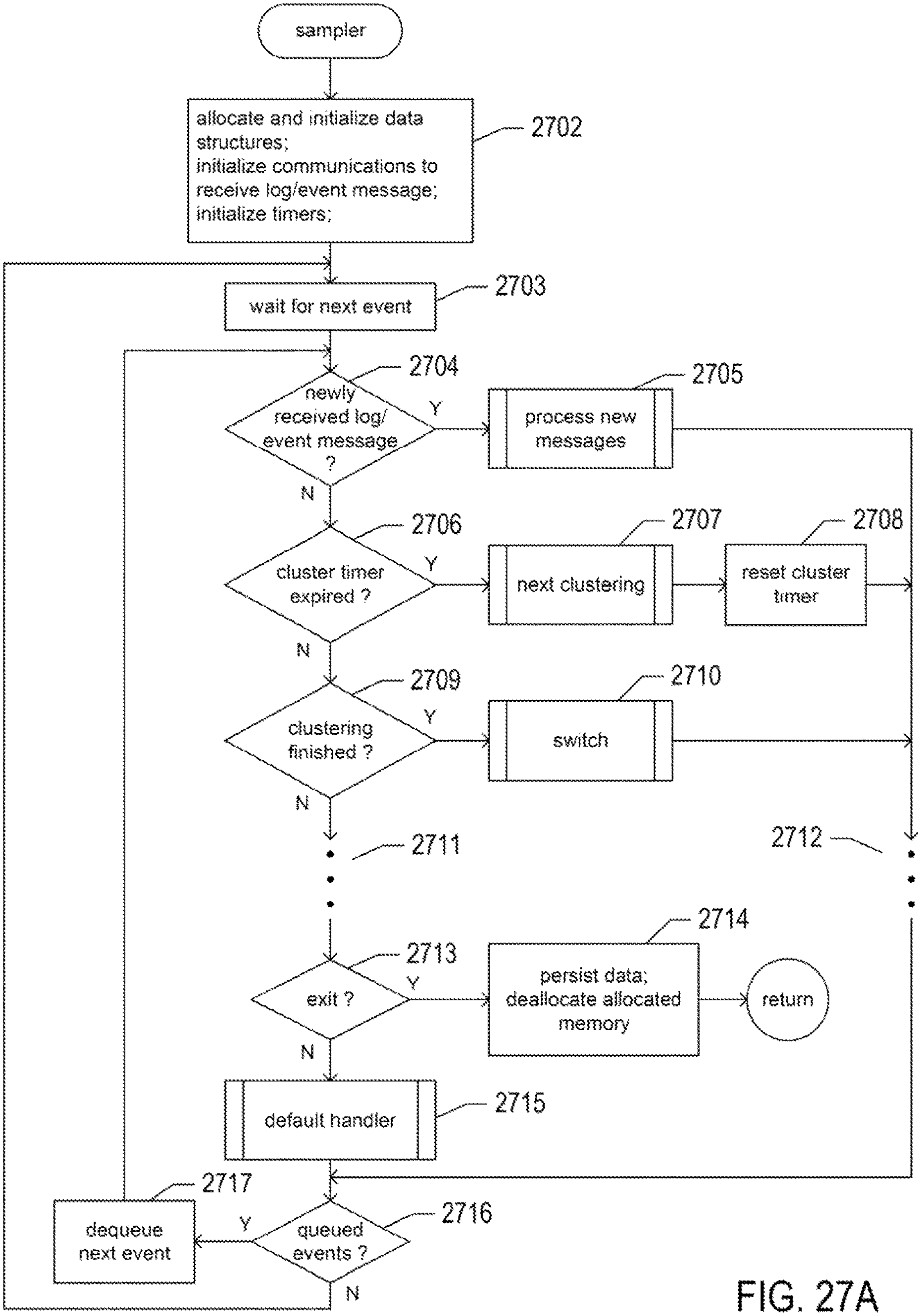
FIGS. 27A-G provide control-flow diagrams that illustrate one implementation of the currently disclosed sampler system.

FIGS. 27A-G provide control-flow diagrams that illustrate one implementation of the currently disclosed sampler system. FIG. 27A shows the highest-level control-flow diagram for the sampler system. It shows an event handler that handles various different types of events that occur during sampler system operation. In step 2702, the sampler system is initialized by allocating and initializing various data structures, initializing communications interfaces to allow the sampler system to receive log/event messages and to output log/event messages, and initializing timers. In step 2703, the event loop represented by the routine "sampler" waits for a next event to occur. When the next occurring event corresponds to reception of a new log/event message, as determined in step 2704, a routine "process new messages" is called, in step 2705, to handle any newly received log/event messages. The routine "process new messages" records a feature vector corresponding to the new message and decides whether or not to forward the new message in the output stream to downstream processing components of the log/event-message system or to discard the new message. The routine "process new messages" thus represents the sampler component (2018 in FIG. 20A) of the sampler system (2002 in FIG. 20A). When the next occurring event represents expiration of a cluster timer, as determined in step 2706, a routine "next clustering" is called in step 2707 and the cluster timer is reset in step 2708. The routine "next clustering" clusters the feature vectors corresponding to log/event messages received in the most recent time period of operation of the sampler system in order to compute new sampling rates for log/event messages. The routine "next clustering" executes asynchronously with respect to the routine "sampler." Clustering is carried out at regular intervals, controlled by the cluster timer. When the next occurring event is an indication that the routine "next clustering" has finished clustering recently received feature vectors, as determined in step 2709, the routine "switch" is called, in step 2710, to switch numerous pointers to data structures, discussed above with reference to FIG. 26, so that the newly generated sampling rates are used for processing subsequently received log/event messages. Ellipses 2711-2712 represent the fact that many additional types of events may be handled by the event loop represented by a routine "sampler." When the next occurring event is an indication that the sampler system should terminate, as determined in step 2713, any data that needs to be persisted is persisted and allocated memory is deallocated, in step 2714, before the event loop terminates. A default handler is called, in step 2715, for any rare or unexpected events. When more events have been queued for handling, as determined in step 2716, a next event is dequeued in step 2717 and control returns to step 2704. Otherwise, control returns to step 2703, where the event loop waits for the occurrence of a next event. Thus, the sampler system continuously samples the input log/event-message stream while periodically recomputing new sampling rates for sampling.

Figure 27B:
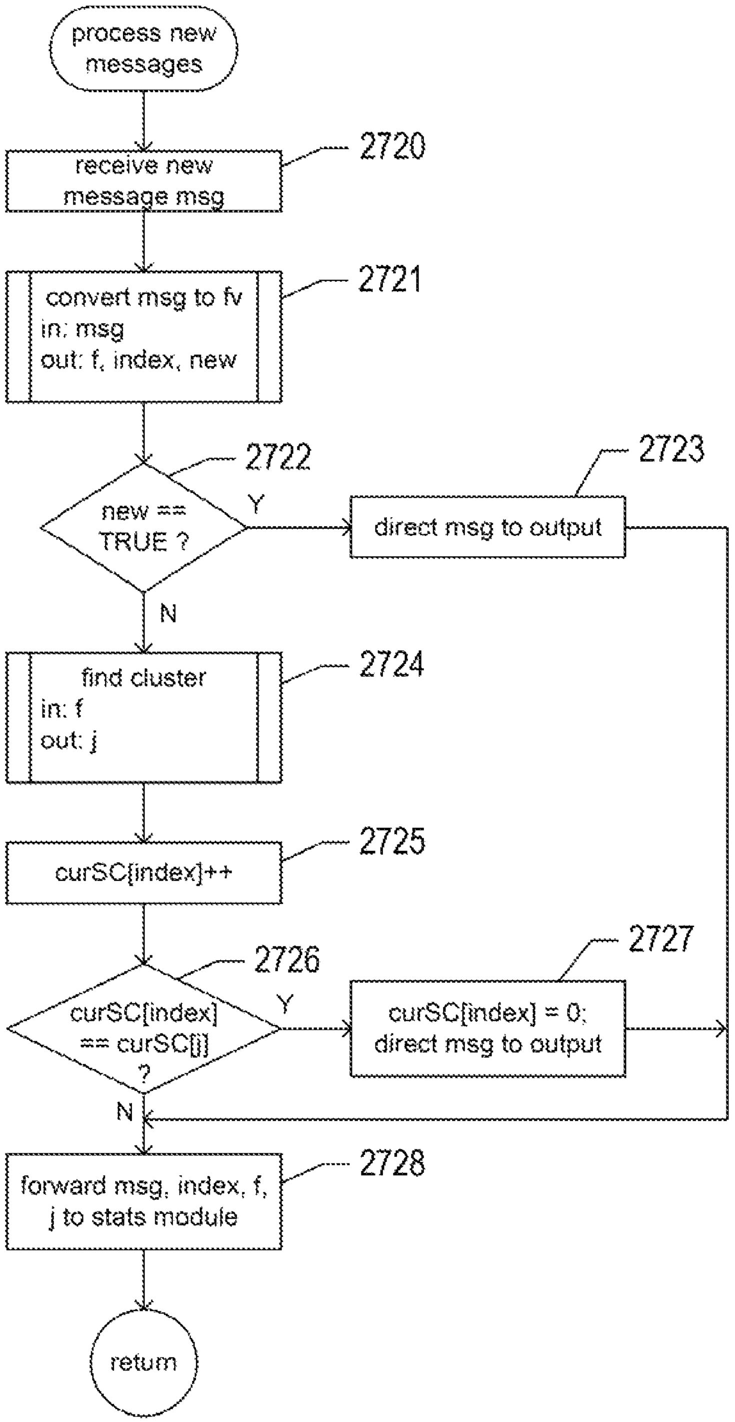

FIG. 27B provides a control-flow diagram for the routine "process new messages," called in step 2705 of FIG. 27A. In step 2720, the routine "process new messages" receives a new log/event message referenced by the pointer msg. In step 2721, the routine "process new messages" calls a routine "convert msg to fv" to convert the received message to a feature vector f and a feature-vector index index. The routine "convert msg to fv" also returns a Boolean value new to indicate whether or not the feature vector had been previously observed by the sampler system. When the returned Boolean value is TRUE, as determined in step 2722, the received log/event message is directed to output of the sampler system, in step 2723. In alternative implementations, newly received feature vectors may be added to a supplementary cluster for newly received feature vectors that is associated with a sampling rate for newly received feature vectors. However, for simplicity, the currently described implementation simply outputs any log/event messages with corresponding feature vectors that have not yet previously been observed by the sampler system, since such feature vectors have high likelihoods of being significant for monitoring and analysis purposes. When the feature vector was previously observed, as determined in step 2722, then, in step 2724, the routine "process new messages" calls a routine "find cluster" to identify a cluster to which the feature vector belongs. This is a cluster with a central feature vector closest of all central feature vectors for all cluster to feature vector f. In step 2725, the sampling count for the feature vector f is incremented. When the sampling count has reached a value equal to the sampling rate for the cluster to which the feature vector f belongs, as determined in step 2726, the sampling rate for feature vector f is set to 0 and the received log/event message is output by the sampler system, in step 2727. Thus, every time the observed number of occurrences of a the feature vector corresponding to the received log/event message is equal to a multiple of the sampling rate for the cluster to which it belongs, the log/event message associated with the feature vector is output. Otherwise, the log/event messages dropped. Finally, in step 2728, in an optional step, the pointer to the log/event message is forwarded to a statistics module which keeps track of the total counts of different types of log/event messages received as well as additional types of aggregate information that may be useful for downstream-processing components of the log/event-message system.

Figure 27C:
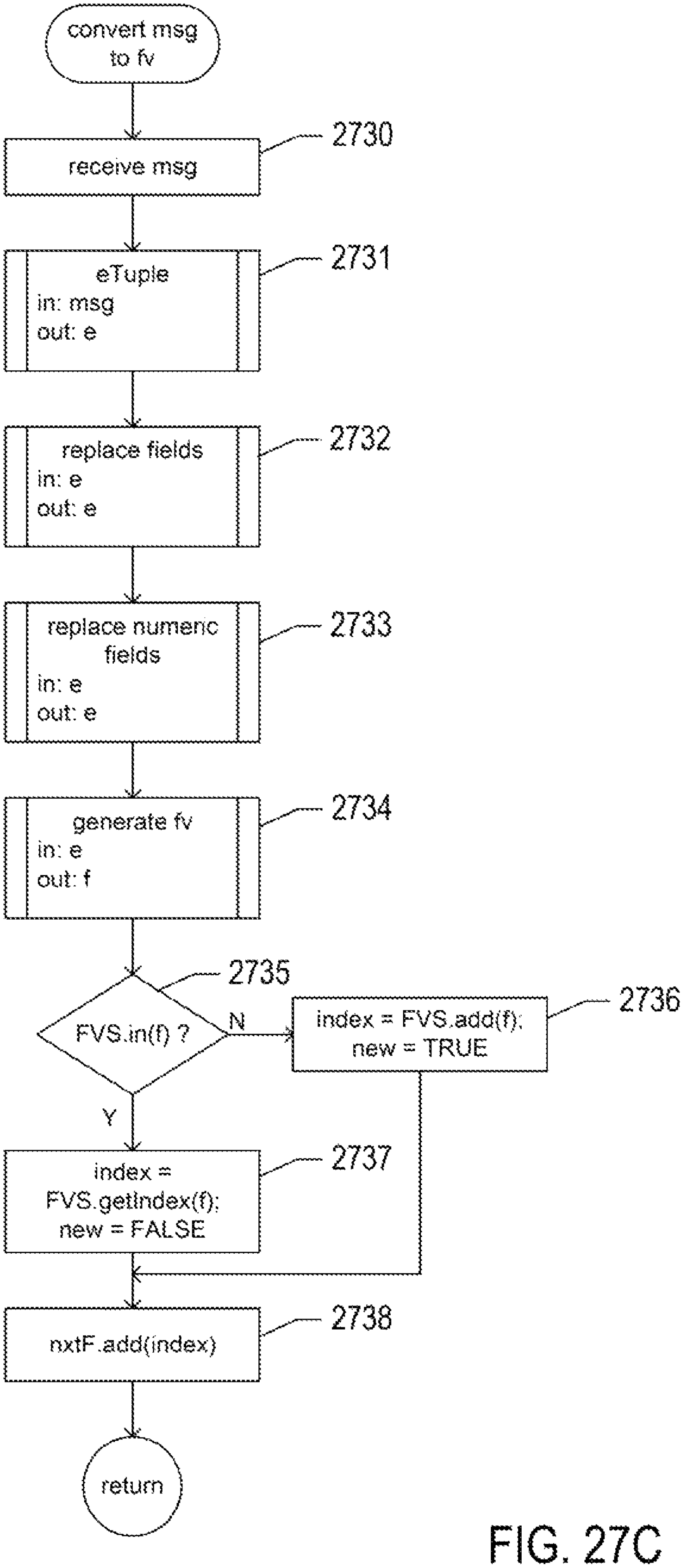

FIG. 27C provides a control-flow diagram for the routine "convert msg to fv" called in step 2721 of FIG. 27B. In Step 2730, the routine "convert msg to fv" receives a pointer msg to a log/event message. In step 2731, the routine "convert msg to fv" calls a routine "eTuple" to convert the log/event message pointed to by msg to an event tuple reference by a pointer e. In step 2732, the routine "convert msg to fv" calls a routine "replace fields" to replace field values that appear to be numeric, but which are not, with replacement string values. In addition, the routine "replace fields" may replace field values of fields known to include many different values with smaller sets of aggregate values. Certain fields may be eliminated entirely, or replaced by a constant string value. In step 2733, the routine "convert msg to fv" calls a routine "replace numeric fields" to replace numeric fields in the event tuple referenced by pointer e with one of the two values A and N, as discussed above with reference to FIGS. 21A-B. In step 2734, the routine "convert msg to fv" calls a routine "generate fv" to generate a feature vector f from the transformed event tuple referenced by pointer e. When the feature vector has not been previously observed, as determined in step 2735, the feature vector is added to the feature-vector repository FVS, which returns an index for the feature vector, and a return value is set to TRUE, in step 2736. Otherwise, in step 2737, the index for the feature vector is retrieved from the feature-vector repository FVS and the return variable is set to FALSE. Finally, in step 2738, the routine "convert msg to fv" adds the index of the feature vector corresponding to the received log/event message to the feature-vector set pointed to by the pointer nxtF. The feature vectors added to this feature-vector set will be clustered, at the next clustering time point indicated by expiration of the cluster timer, in order to recalculate sampling rates for subsequently received feature vectors.

Figure 27D:
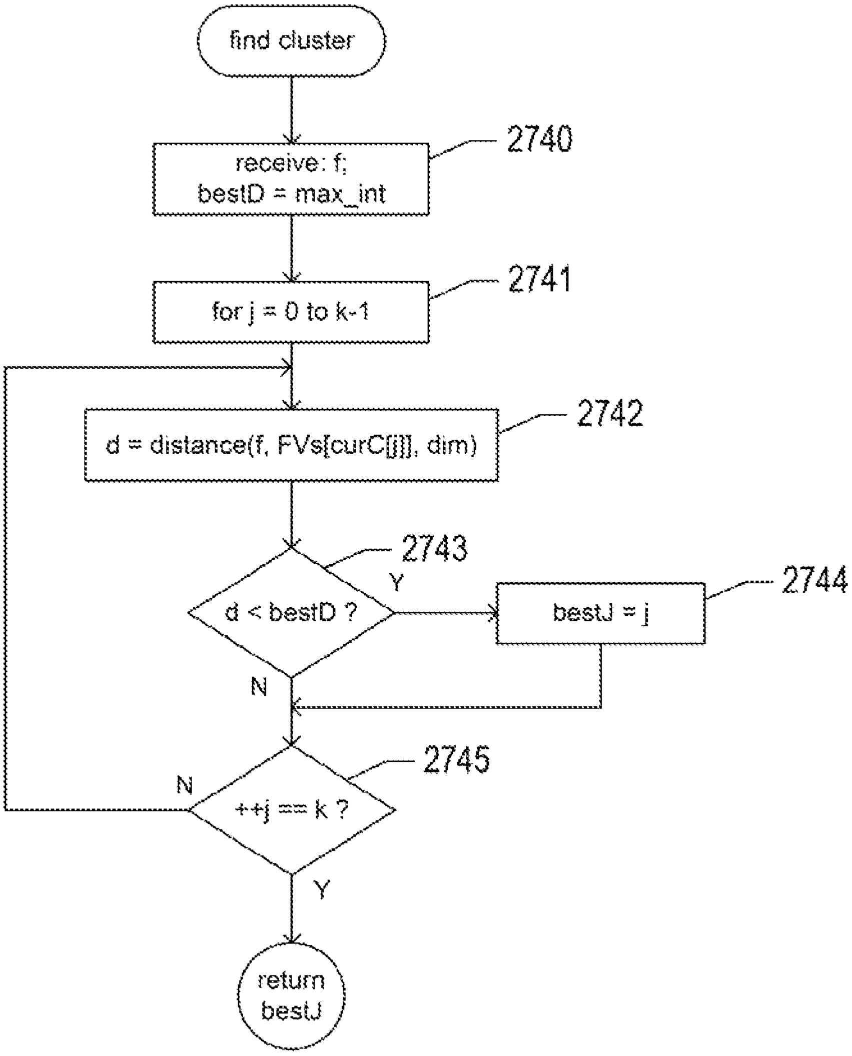

FIG. 27D provides a control-flow diagram for the routine "find cluster," called in step 2724 of FIG. 27B. In step 2740, the routine "find cluster" receives a feature vector f and sets a local variable bestD to a large number. Then, in the for-loop of steps 2741-2745, the routine "find cluster" identifies the cluster, indexed by bestJ, to the central feature vector to which the feature vector f is closest and returns the index of the cluster.

Figure 27E:
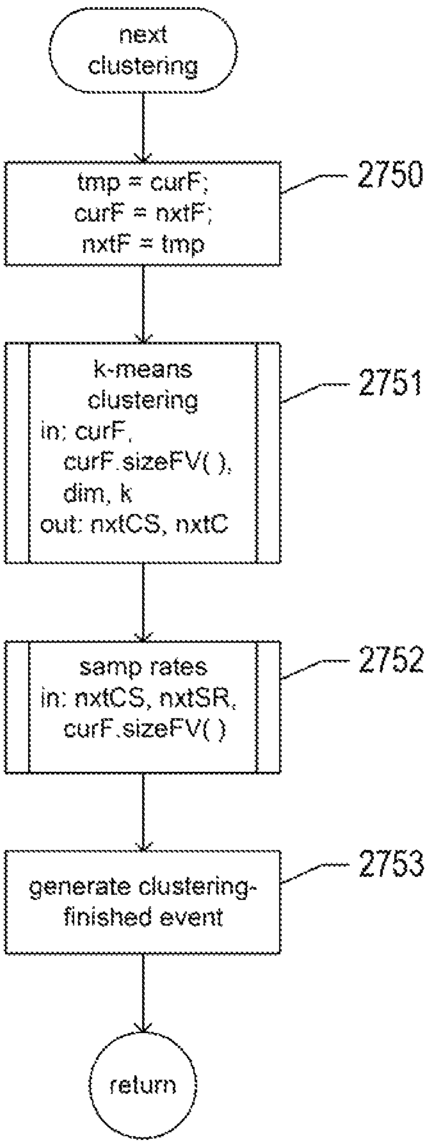

FIG. 27E provides a control-flow diagram for the routine "next clustering," called in step 2707 of FIG. 27A. In step 2750, the routine "next clustering" switches the feature-vector-set pointers curF and nxtF in order to begin clustering the most currently stored feature vectors now pointed to by pointer curF while collecting subsequently received feature vectors in the feature-vector set now pointed to by nxtF. In step 2751, the routine "next clustering" calls the routine "k-means clustering," discussed above with reference to FIGS. 25A-D, to cluster the features in the feature-vector set pointed to by pointer curF. In step 2752, the routine "next clustering" calls a routine "samp rates" to compute new sampling rates based on the clustering generated in step 2751. Finally, in step 2753, the routine "next clustering" generates a clustering-finished event, detected by the event handler in step 2709 in FIG. 27A.

Figure 27F:
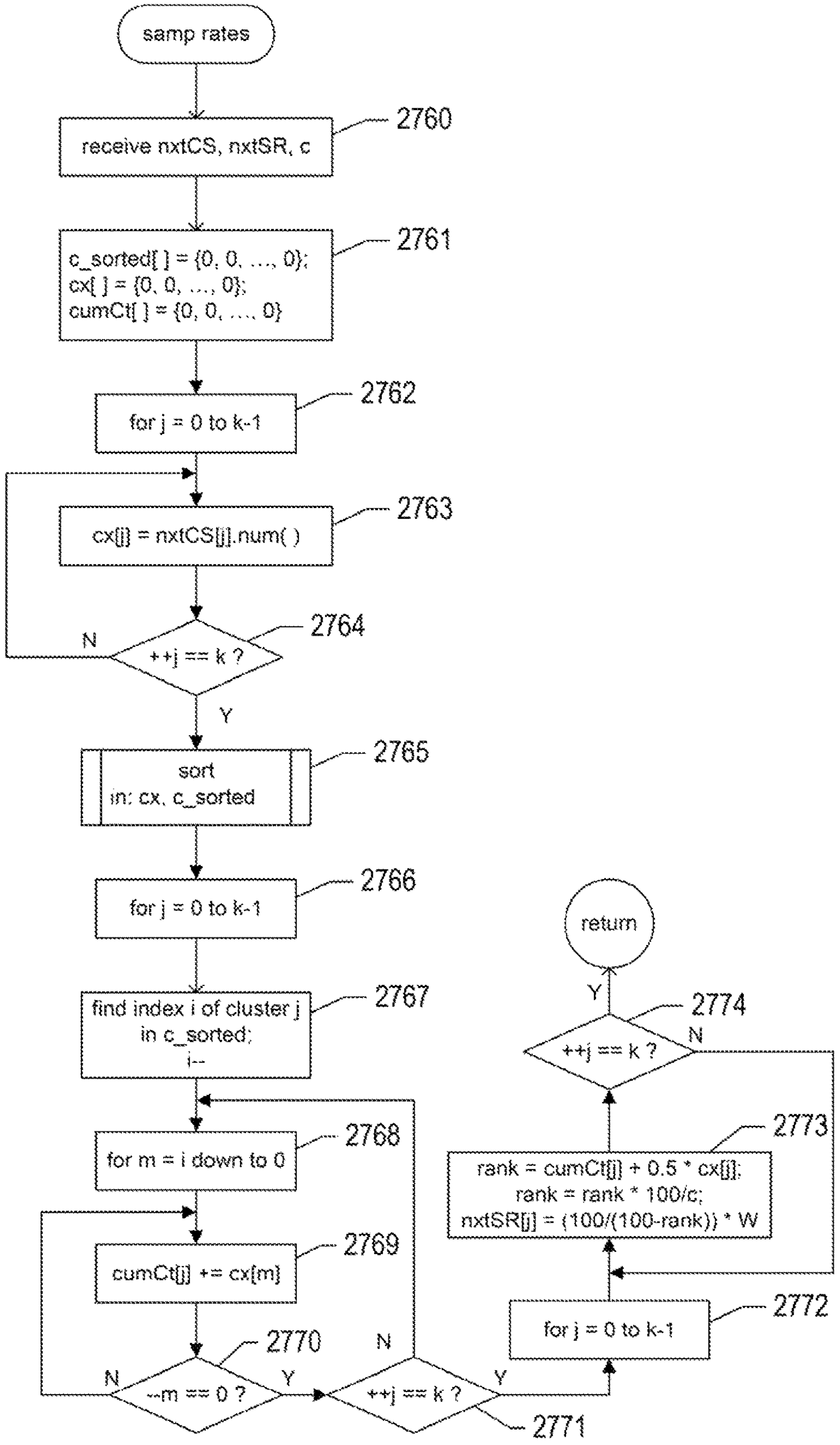

FIG. 27F provides a control-flow diagram for the routine "samp rates," called in step 2752 of FIG. 27E. In step 2760, the routine "samp rates" receives a pointer to a cluster data structure, nxtCS, a pointer to a samplingRates data structure, nxtSR, and the number of feature vectors in the clusters data structure referenced by nxtCS. In step 2761, the routine "samp rates" initializes three local arrays c_sorted, cx, and cumCt to contain all 0 values. The local array c_sorted is used to contain the cluster indexes of the clusters in the data structure referenced by nxtCS sorted, in ascending order, by the number of feature vectors in each cluster. The local array cx is used to store the number of feature vectors for each cluster in the clusters data structure referenced by nxtCS. The local array cumCt stores, at an element indexed by index j, the cumulative total number of feature vectors for all clusters having fewer feature vectors than cluster j. In the for-loop of steps 2762-2764, the counts of the number of feature vectors in each cluster in the data structure referenced by nxtCS are accumulated in the local array cx. In step 2765, the routine "samp rate" calls the routine "sort" to sort the cluster indexes, which are also the indices of local array cx, into a sorted list stored in the local array c_sorted. In the for-loop of steps 2766-2771, the cumulative totals of the number of feature vectors in clusters with fewer feature vectors for each of the clusters in the data structure referenced by nxtCS are calculated and stored in the local array cumCt using the sorted cluster indexes in the local array c_sorted. Finally, in the for-loop of steps 2772-2774, new sampling rates for each cluster are computed. As discussed above, the sampling rate is expressed as a number of messages that need to be received for each message output by the sampler system, in the current implementation. The percentage sampling rate for a cluster is computed as the percentile rank of the cluster subtracted from 100. Thus, if the percentile rank of the cluster is 30, the percentage sampling rate is 70. This means that 70% of the received log/event messages with corresponding feature vectors belonging to the cluster are to be retained and 30% are to be discarded. The percentile rank of a cluster is computed as a ratio, computed as the number of feature vectors in all clusters with fewer members plus 1/2 times the number of feature vectors in the cluster divided by the total number of feature vectors in all of the clusters, multiplied by 100. Thus, if the number of feature vectors in all clusters with fewer members for a particular cluster is 120, the number of feature vectors in the particular cluster is 17, and the total number of feature vectors in all clusters is 237, the percentile rank of the particular cluster would be $$\frac{120 + (17 \times 0.5)}{237} \times 100 = 51.$$

The percentage sampling rate would then be 49%. As another example, consider the case of six clusters with numbers of feature vectors, ordered by magnitude, of {5, 10, 16, 19, 36, 47}. The percentile ranks for the six clusters are then {2, 8, 17, 30, 51, 82}. The percentage sampling rates for the six clusters would be {98, 92, 83, 70, 49, and 18}. In the current implementation, the percentage sampling rates are converted to sampling rates by dividing 100 by the percentage sampling rates. Thus, the sampling rate for the particular example cluster would be 2 and the sampling rate for the example 6 clusters would be {1, 1, 1, 1, 2, 5}. In the current implementation, an extra scaling factor W multiplies the computed sampling rates to produce final sampling rates. Thus, in the example of the six clusters, the final sampling rates would be {W, W, W, W, 2*W, 5*W}.

Figure 27G:
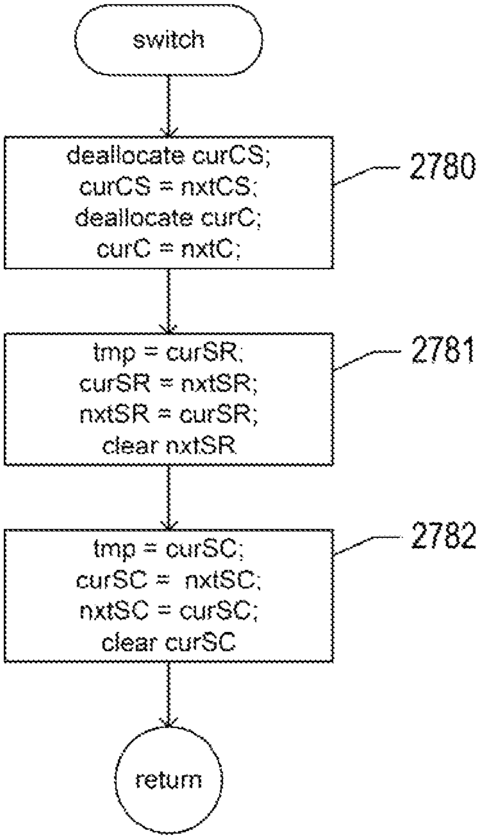

FIG. 27G provides a control-flow diagram for the routine "switch," called in step 2710 of FIG. 27A. The routine "switch," in step 2780, deallocates the clusters data structure pointed to by curCS, sets pointer curCS to point to the clusters data structure pointed to by nxtCS, deallocates the centers data structure pointed to by curC, and sets the pointer curC to point to the centers data structure pointed to by nxtC. In step 2781, the routine "switch" switches the samplingRate data structures pointed to by the pointers curSr and nxtSR. In step 2782, the routine "switch" switches the samplingCount data structures pointed to by the pointers curSC and nxtSC. The routine "switch" redirects the routine "process new messages," called in step 2705 of FIG. 27A, to begin using the most recently computed sampling rates and arranges for the next execution of the routine "next clustering," called in step 2707 of FIG. 27A, to cluster and the subsequently recorded feature vectors.

The present invention has been described in terms of particular embodiments, it is not intended that the invention be limited to these embodiments. Modifications within the spirit of the invention will be apparent to those skilled in the art. For example, any of many different implementations of the sampler system can be obtained by varying various design and implementation parameters, including modular organization, control structures, data structures, hardware, operating system, and virtualization layers, and other such design and implementation parameters. In alternative implementations, the sampling rates may be alternatively computed with more precision in a more complex sampling method can be used for sample at greater precision. Furthermore, different types of sampling-rate calculations may be employed in alternative implementations. There is a wide variety of different possible representations of feature vectors and different types of data structures for storing information needed to sample log/event messages based on an iteratively recomputed sampling rate. In the above-described implementation, feature vectors are accumulated, over successive time periods and then used to intermittently generate new sampling rates, while passing through sampled log/error messages without delay. In an alternative implementation, log/event messages may be accumulated and released at periodic intervals, so that the sampling rates computed from log/event messages can be used to sample the accumulated log/event messages. This provides the most relevant sampling rates at the cost of delaying propagation of log/event messages.

What is claimed is:

1. An improved log/event-message system, within a distributed computer system, that collects log/event messages from log/event-message sources within the distributed computer system, stores the collected log/event messages, and provides query-based access to the stored log/event-messages, the log/event-message system comprising:

one or more message-ingestion-and-processing systems, incorporated within one or more computer systems, which each receives data from one or more message collectors, and stores the received data in a database; and multiple message collectors, incorporated within one or more computer systems, which each receives log/event messages from the log/event-message sources, and forwards the log/event messages to one or more of one or more message-ingestion-and-processing systems; and one or more sampler systems that sample log/event messages for downstream processing and storage and that periodically automatically regenerates sampling rates that control log/event-message sampling.

2. The log/event-message system of claim 1 wherein log/event-message sources include: message-generation-and-reporting components of hardware components of the distributed computer system, including network routers and bridges, network-attached storage devices, network-interface controllers, and other hardware components and devices; and message-generation-and-reporting components within computer-instruction-implemented components of the distributed computer system, including virtualization layers, operating systems, and applications running within servers and other types of computer systems.

3. The log/event-message system of claim 1 wherein log/event-messages include text, alphanumeric values, and/or numeric values that represent various types of information, including notification of completed actions, errors, anomalous operating behaviors and conditions, various types of computational events, and warnings.

4. The log/event-message system of claim 1 wherein each of the one or more sampler systems is incorporated in a different message collector of the multiple message collectors.

5. The log/event-message system of claim 1 wherein each of the one or more sampler systems is incorporated in a different message-ingestion-and-processing system of the one or more message-ingestion-and-processing systems.

6. The log/event-message system of claim 1 wherein each of the one or more sampler systems receives an input stream of log/event messages and outputs a sampled output stream of log/event messages.

7. The log/event-message system of claim 6 wherein the sampler system, for each log/event message in the stream of log/event messages, generates a feature vector corresponding to the log/event message, identifies a feature-vector cluster closest to the feature vector, and applies a sampling rate associated with the identified feature-vector cluster to determine whether or not to output the log/event message in the sampled output log/event-message stream.

8. The log/event-message system of claim 7 wherein the sampler system generates a feature vector corresponding to a log/event message by:

transforming the log/event message into an event tuple that includes an event type and values of selected fields, transforming the event tuple, and rendering the transformed event tuple as a feature vector that includes multiple elements, each having one of the two values "0" and "1."

9. The log/event-message system of claim 8 wherein the sampler system transforms an event tuple by one or more of:

removing one or more field values;

replacing one or more field values with replacement values;

replacing apparent numeric field values with category field values; and replacing numeric field values with one of the two category values, the first category value representing an abnormal numeric field value and the second category value representing a normal numeric field value.

10. The log/event-message system of claim 7 wherein the sampler system counts the number of received log/event messages corresponding to each different feature vector in counts maintained for each different feature vector; and wherein the sampler system applies the sampling rate associated with the identified feature-vector cluster to the count for the feature vector corresponding to the log/event message to select determine whether or not to output the log/event message in the sampled output log/event-message stream.

11. The log/event-message system of claim 7 wherein the sampler system stores indications of the feature vectors generated for received log/event messages over a time period in order to generate a next set of sampling rates.

12. The log/event-message system of claim 9 wherein the sampling rates are generated by:

clustering the feature vectors into clusters of related feature vectors, and generating a sampling rate for each cluster that is inversely related to the number of feature vectors in the cluster.

13. A method, carried out by a sampler system that samples log/event messages within a log/event-message system, incorporated in a distributed computer system, that collects log/event messages from log/event-message sources within the distributed computer system, stores the collected log/event messages, and provides query-based access to the stored log/event-messages, the log/event-message system, the method comprising:

receiving an input stream of log/event messages;

sampling the input stream of log/event messages to generate a sampled output stream of log/event messages; and periodically automatically regenerating sampling rates that control log/event-message sampling.

14. The method of claim 13 further including:

for each log/event message in the stream of log/event messages, generating a feature vector corresponding to the log/event message, identifying a feature-vector cluster closest to the feature vector, and applying a sampling rate associated with the identified feature-vector cluster to determine whether or not to output the log/event message in the sampled output log/event-message stream.

15. The method of claim 14 wherein generating a feature vector corresponding to the log/event message further comprises:

transforming the log/event message into an event tuple that includes an event type and values of selected fields, transforming the event tuple, and rendering the transformed event tuple as a feature vector that includes multiple elements, each having one of the two values "0" and "1."

16. The method of claim 15 wherein transforming the event tuple further comprises:

removing one or more field values;

replacing one or more field values with replacement values;

replacing apparent numeric field values with category field values; and replacing numeric field values with one of the two category values, the first category value representing an abnormal numeric field value and the second category value representing a normal numeric field value.

17. The method of claim 14 further including:

counting the number of received log/event messages corresponding to each different feature vector in counts maintained for each different feature vector; and applying the sampling rate associated with the identified feature-vector cluster to the count for the feature vector corresponding to the log/event message to select determine whether or not to output the log/event message in the sampled output log/event-message stream.

18. The method of claim 14 further including:

storing indications of the feature vectors generated for received log/event messages over a time period in order to generate a next set of sampling rates.

19. The method of claim 18 wherein the sampling rates are generated by:

clustering the feature vectors into clusters of related feature vectors, and generating a sampling rate for each cluster that is inversely related to the number of feature vectors in the cluster.

20. A physical data-storage device that stores computer instructions that, when executed by processors within a computer system that executes a log/event-message system within a distributed computer system, control a sampling system implemented in the computer system to:

receive an input stream of log/event messages;

sample the input stream of log/event messages to generate a sampled output stream of log/event messages; and periodically automatically regenerate sampling rates that control log/event-message sampling.

* * * * *